(12) United States Patent
Ullah et al.

(10) Patent No.: US 11,618,006 B2
(45) Date of Patent: Apr. 4, 2023

(54) METHOD FOR REMOVING A POLLUTANT FROM AQUEOUS SOLUTION WITH A CROSSLINKED POLYMER

(71) Applicant: KING FAHD UNIVERSITY OF PETROLEUM AND MINERALS, Dhahran (SA)

(72) Inventors: Nisar Ullah, Dhahran (SA); Abdul Waheed, Dhahran (SA); Muhammad Mansha, Dhahran (SA); Izzat Wajih Kazi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/834,608

(22) Filed: Jun. 7, 2022

(65) Prior Publication Data
US 2022/0305459 A1  Sep. 29, 2022

Related U.S. Application Data

(62) Division of application No. 16/679,730, filed on Nov. 11, 2019, now Pat. No. 11,351,520.

(51) Int. Cl.
*B01J 20/26* (2006.01)
*C08G 61/12* (2006.01)
(Continued)

(52) U.S. Cl.
CPC ....... *B01J 20/267* (2013.01); *B01J 20/28004* (2013.01); *B01J 20/28016* (2013.01);
(Continued)

(58) Field of Classification Search
None
See application file for complete search history.

(56) References Cited

U.S. PATENT DOCUMENTS

| 2,759,913 A | 8/1956 | Hulse |
| 4,396,760 A | 8/1983 | Kelley |
| (Continued) |

FOREIGN PATENT DOCUMENTS

| CN | 101721981 A | 6/2010 |
| CN | 101724112 A | 6/2010 |
| JP | 11-92435 A | 4/1999 |

OTHER PUBLICATIONS

Ting Zhang, et al., "Tunable synthesis of the polar modified hyper-cross-linked resins and application to the adsorption", Journal of Colloid and Interface Science, vol. 505, Nov. 1, 2017, pp. 383-391 (Abstract only).
(Continued)

*Primary Examiner* — Chester T Barry
(74) *Attorney, Agent, or Firm* — Oblon, McClelland, Maier & Neustadt, L.L.P.

(57) ABSTRACT

A crosslinked resin made up of polymerized units of a linear polyamine with at least 3 primary and/or secondary amine functionalities and a bisacrylamide. The crosslinked polymers are porous spherical particles with a BET surface area in the range of 50-120 m²/g. A method of the synthesizing the crosslinked polymer is specified. A method for using the crosslinked resin as an adsorbent material in removing pollutants including organic dyes (e.g. Congo red, Rhodamine B) and heavy metals from an aqueous solution or an industrial wastewater sample is also described.

19 Claims, 26 Drawing Sheets

(51) Int. Cl.
*B01J 20/28* (2006.01)
*C02F 1/28* (2023.01)
*C02F 1/00* (2023.01)
*C02F 101/20* (2006.01)
*C02F 101/30* (2006.01)
*C02F 101/22* (2006.01)

(52) U.S. Cl.
CPC .............. *C02F 1/004* (2013.01); *C02F 1/285* (2013.01); *C08G 61/127* (2013.01); *C02F 2101/203* (2013.01); *C02F 2101/206* (2013.01); *C02F 2101/22* (2013.01); *C02F 2101/308* (2013.01); *C08G 2261/12* (2013.01); *C08G 2261/132* (2013.01); *C08G 2261/312* (2013.01)

(56) References Cited

U.S. PATENT DOCUMENTS

| | | |
|---|---|---|
| 5,332,435 A | 7/1994 | Wright |
| 2009/0030125 A1 | 1/2009 | Vedage et al. |
| 2018/0201721 A1 | 7/2018 | Panchenko et al. |
| 2020/0346185 A1 | 11/2020 | Al Hamouz |

OTHER PUBLICATIONS

Abdul Waheed, et al., "Synthesis of a novel 3,5-diacrylamidobenzoic acid based hyper-cross-linked resin for the efficient adsorption of Congo Red and Rhodamine B", Journal of Hazardous Materials, vol. 369, 2019, pp. 528-538.

J. Lux, A.G. White, M. Chan, C. J. Anderson, A. Almutairi, Nanogels from metal-chelating crosslinkers as versatile platforms applied to copper-64 PET imaging of tumors and metastases, Theranostics 5 (2015) 277-288 (Year: 2015).

Fig. 2. Solid $^{13}$C NMR of APEADA.

METHOD FOR REMOVING A POLLUTANT FROM AQUEOUS SOLUTION WITH A CROSSLINKED POLYMER

CROSS-REFERENCE TO RELATED APPLICATIONS

The present application is a Divisional of U.S. application Ser. No. 16/679,730, now filed on Nov. 11, 2019, now U.S. Pat. No. 11,351,520.

STATEMENT OF ACKNOWLEDGEMENT

The inventors acknowledge the support provided by King Fand University of Petroleum and Minerals (KFUPM) under Project number NUS15103.

STATEMENT REGARDING PRIOR DISCLOSURE BY THE INVENTORS

Aspects of this technology are described in an article "Synthesis of a novel 3,5-diacrylamidobenzoic acid based hyper-cross-linked resin for the efficient adsorption of Congo Red and Rhodamine B" published in Journal of Hazardous Materials, 2019, 369, 528-538, on Feb. 16, 2019, which is incorporated herein by reference in its entirety.

BACKGROUND OF THE INVENTION

Technical Field

The present disclosure relates to a crosslinked polymer produced from a polymerization reaction of a linear polyamine and a bisacrylamide monomer, methods of preparing the crosslinked polymer, and a method of removing pollutants, such as organic dyes and heavy metals from aqueous solutions by adsorbing the pollutants with the crosslinked polymer.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Dyes are important industrial materials widely used as coloring agents in the production of plastic, leather, textile, food, paper, and many other industries [K. Cui, B. Yan, Y. Xie, H. Qian, X. Wang, Q. Huang, Y. He, S. Jin, H. Zeng, Regenerable urchin-like $Fe_3O_4$@PDA-Ag hollow microspheres as catalyst and adsorbent for enhanced removal of organic dyes, J. Hazard. Mater. 350 (2018) 66-75]. More than 100,000 different kinds of dyes are commercially available [L. Bulgariu, L. B. Escudero, O. S. Bello, M. Iqbal, J. Nisar, K. A. Adegoke, F. Alakhras, M. Kornaros, I. Anastopoulos, The utilization of leaf-based adsorbents for dyes removal: a review, J. Mol. Liq. 276 (2019) 728-747]. Untreated industrial effluent containing toxic organic dyes is a major cause of water pollution [A. Kausar, M. Iqbal, A. Javed, K. Aftab, Z.-H. Nazli, H. N. Bhatti, S. Nouren, Dyes adsorption using clay and modified clay: a review, J. Mol. Liq. 256 (2018) 395-407; and A. C. Sophia, T. Arfin, E. C. Lima, Recent developments in adsorption of dyes using graphene based nanomaterials, in: M. Naushad (Ed.), A New Generation Material Graphene: Applications in Water Technology, Springer International Publishing, 2019, pp. 439-471].

Various techniques including chemical/physical purification (e.g., electrodegradation, photodegradation, membrane filtration, chemical coagulation and adsorption) and biological remediation (e.g., microbial degradation) have been implemented to remove organic dyes from wastewater [N. Ghaemi, P. Safari, Nano-porous SAPO-34 enhanced thin-film nanocomposite polymeric membrane: simultaneously high water permeation and complete removal of cationic/anionic dyes from water, J. Hazard. Mater. 358 (2018) 376-388; and Y. Fang, Q. Huang, P. Liu, J. Shi, G. Xu, Easy-separative $MoS_2$-glue sponges with high-efficient dye adsorption and excellent reusability for convenient water treatment, Colloids Surf. A Physicochem. Eng. Asp. 540 (2018) 112-122, each incorporated herein by reference in their entirety]. Adsorption is a preferred treatment for wastewater contaminated with organic dyes that are practically non-degradable [J. Nasiria, E. Motamedib, M. R. Naghavia, M. Ghafoori, Removal of crystal violet from water using β-cyclodextrin functionalized biogenic zero-valent iron nanoadsorbents synthesized via aqueous root extracts of *Ferula persica*, J. Hazard. Mater. 367 (2019) 325-338, incorporated herein by reference in its entirety]. Moreover, adsorption is efficient, inexpensive, readily implemented, and causes minimal sludge formation [I. Ali, New generation adsorbents for water treatment, Chem. Rev. 112 (2012) 5073-5091; and G. Z. Kyzas, P. I. Siafaka, E. G. Pavlidou, K. J. Chrissafis, D. N. Bikiaris, Synthesis and adsorption application of succinyl-grafted chitosan for the simultaneous removal of zinc and cationic dye from binary hazardous mixtures, Chem. Eng. J. 259 (2015) 438-448, each incorporated herein by reference in their entirety].

A wide range of functional materials including hyper-cross-linked polymer, activated carbon, and graphene-based materials have been studied for their efficacy as adsorbents for wastewater treatment [N. P. Raval, P. U. Shah, N. K. Shah, Adsorptive amputation of hazardous azo dye Congo red from wastewater: a critical review, Environ. Sci. Pollut. Res. 23 (2016) 14810-14853; and S. Bai, X. Shen, X. Zhong, Y. Liu, G. Zhu, X. Xu, K. Chen, One-pot solvothermal preparation of magnetic reduced graphene oxide-ferrite hybrids for organic dye removal, Carbon N. Y. 50 (2012) 2337-2346, each incorporated herein by reference in their entirety]. However, the existing adsorbents have several limitations. For example, production of activated carbon consumes energy, whereas other adsorbents are not reusable, have slow adsorption rates, and require high doses for dye removal [G. O. El-Sayed, M. M. Yehia, A. A. Asaad, Assessment of activated carbon prepared from corncob by chemical activation with phosphoric acid, Water Resour. Ind. 7-8 (2014) 66-75, incorporated herein by reference in its entirety]. Therefore, there is a need to design and develop more effective adsorbents for dye removal from wastewater systems.

In view of the forgoing, one objective of the present invention is to provide a crosslinked resin built on polymerization of a linear polyamine and a bisacrylamide monomer. Another objective of the present disclosure is to provide a method for removing pollutants including organic dyes and heavy metals from an aqueous solution by employing the crosslinked resin.

BRIEF SUMMARY OF THE INVENTION

According to a first aspect, the present disclosure relates to a crosslinked polymer, containing reacted units of a first monomer of formula (I)

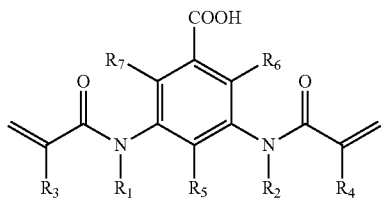

or a salt thereof, a solvate thereof, a tautomer thereof, a stereoisomer thereof, or a mixture thereof, and a second monomer of formula (II)

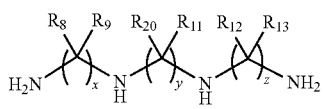

or a salt thereof, a solvate thereof, a stereoisomer thereof, or a mixture thereof, wherein (i) $R_1$, $R_2$, $R_3$, and $R_4$ are independently selected from the group consisting of a hydrogen, an optionally substituted alkyl, an optionally substituted cycloalkyl, an optionally substituted arylalkyl, and an optionally substituted aryl, (ii) $R_5$, $R_6$, and $R_7$ are independently selected from the group consisting of a hydrogen, an optionally substituted alkyl, an optionally substituted cycloalkyl, an optionally substituted arylalkyl, a carboxy, a hydroxy, and a halogen, (iii) $R_8$, $R_9$, $R_{10}$, $R_{11}$, $R_{12}$, and $R_{13}$ are independently selected from the group consisting of a hydrogen, an optionally substituted alkyl, an optionally substituted cycloalkyl, an optionally substituted arylalkyl, and an optionally substituted aryl, and (iv) x, y, and z are independently an integer in a range of 1-6.

In one embodiment, $R_1$, $R_2$, $R_3$, and $R_4$ are independently a hydrogen, or an optionally substituted $C_1$-$C_6$ alkyl.

In one embodiment, $R_1$, $R_2$, $R_3$, and $R_4$ are hydrogen.

In one embodiment, $R_5$, $R_6$, and $R_7$ are hydrogen.

In one embodiment, $R_8$, $R_9$, $R_{10}$, $R_{11}$, $R_{12}$, and $R_{13}$ are hydrogen.

In one embodiment, x and z are 3, and y is 2.

In one embodiment, the first monomer of formula (I) is

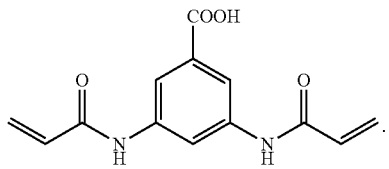 [SMILES: C=CC(=O)Nc1cc(NC(=O)C=C)cc(C(=O)O)c1]

In one embodiment, the second monomer of formula (II) is

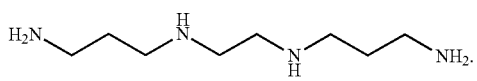 [SMILES: NCCCNCCNCCCN]

In one embodiment, a molar ratio of the first monomer of formula (I) to the second monomer of formula (II) is in a range of 2:1 to 8:1.

In one embodiment, the crosslinked polymer is in the form of spherical particles with an average particle diameter in a range of 2-20 μm.

In one embodiment, the crosslinked polymer is porous with a BET surface area in a range of 50-120 $m^2/g$.

In one embodiment, the crosslinked polymer exhibits a semi-crystalline structure.

According to a second aspect, the present disclosure relates to a method for removing a pollutant from an aqueous solution. The method involves the steps of contacting the aqueous solution having an initial concentration of the pollutant with the crosslinked polymer of the first aspect to form a mixture, and filtering the mixture to obtain an aqueous solution having a reduced concentration of the pollutant compared to the initial concentration.

In one embodiment, the pollutant is an organic dye, a heavy metal, or both.

In a further embodiment, the pollutant is an organic dye, and the organic dye is at least one selected from the group consisting of Congo red, Rhodamine B, methyl orange, and bromophenol blue.

In one embodiment, the aqueous solution has a pH in a range of 2 to 10.

In one embodiment, the initial concentration of the pollutant in the aqueous solution is in a range of 10-1,000 mg $L^{-1}$.

In one embodiment, the crosslinked polymer is present in a concentration ranging from 0.1 to 10 g per liter of the aqueous solution during the contacting.

In one embodiment, the crosslinked polymer is contacted with the aqueous solution at a temperature in a range of 10° C. to 80° C. for 0.1-24 hours.

In one embodiment, greater than 50% of a total mass of the pollutant is removed from the aqueous solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
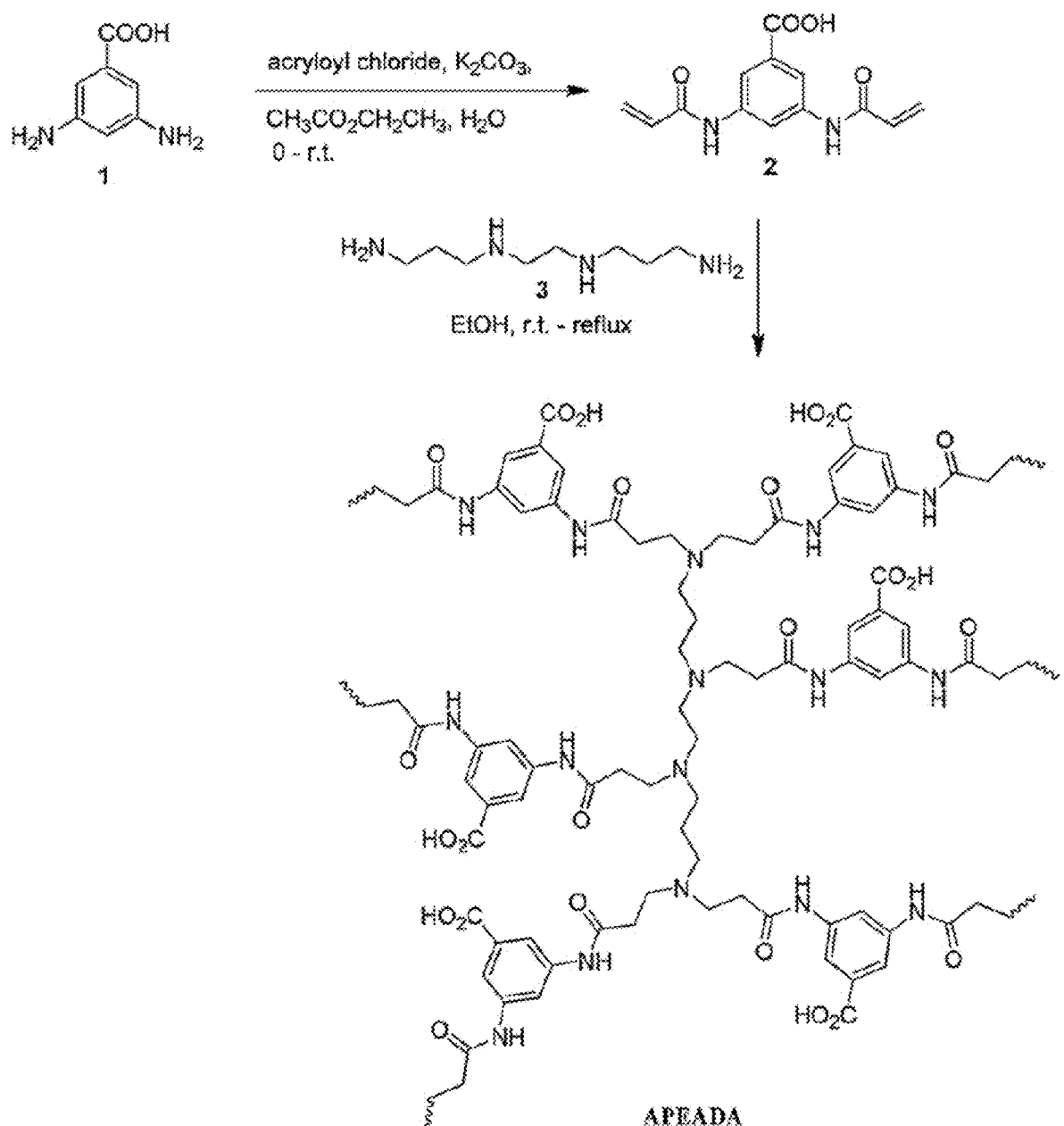
FIG. 1 is a synthetic procedure to form crosslinked polymer APEADA, wherein the first and second monomers are 3,5-diacrylamidobenzoic acid and N,N'-bis(3-aminopropyl)ethylenediamine, respectively.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the term "compound" or "monomer" refers to a chemical entity, whether in a solid, liquid or gaseous phase, and whether in a crude mixture or purified and isolated.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, iso-butanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those skilled in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the ring systems, stereogenic centers, and the like can all be present in the compounds, and all such stable isomers are contemplated in the present disclosure. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

As used herein, the term "alkyl" unless otherwise specified refers to both branched and straight chain saturated aliphatic primary, secondary, and/or tertiary hydrocarbons of typically $C_1$ to $C_{21}$, for example $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "aryl", as used herein, and unless otherwise specified, refers to a substituent that is derived from an aromatic hydrocarbon (arene) that has had a hydrogen atom removed from a ring carbon atom. Aryl includes phenyl, biphenyl, naphthyl, anthracenyl, and the like.

The term "halogen", as used herein, means fluoro, chloro, bromo and iodo. The term "acrylamide", as used herein, and unless otherwise specified, refers to an amide bound to an optionally substituted ethenyl ($CH_2$=$CR_z$—$C(O)NR_xR_y$), where (i) the nitrogen is unsubstituted ($CH_2$=$CR_z$—$C(O)$ $NH_2$), monosubstituted (where $R_x$ is a hydrogen, $R_y$ is an optionally substituted alkyl, an optionally substituted cycloalkyl, an optionally substituted arylalkyl, or an optionally substituted aryl), or disubstituted where $R_x$ and $R_y$ are independently an optionally substituted alkyl, an optionally substituted cycloalkyl, an optionally substituted arylalkyl, or an optionally substituted aryl, and (ii) $R_z$ is a hydrogen, an optionally substituted alkyl, an optionally substituted cycloalkyl, an optionally substituted arylalkyl, or an optionally substituted aryl.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanoylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, unsubstituted amide (i.e. —CONH$_2$), substituted amide (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}$C and $^{14}$C, isotopes of nitrogen include $^{14}$N and $^{15}$N, and isotopes of oxygen include $^{16}$O, $^{17}$O and $^{18}$O. Isotopically labeled compounds of the disclosure can generally be prepared by conventional techniques known to those of ordinary skill in the art or by processes and methods analogous to those described herein, using an appropriate isotopically labeled reagent in place of the non-labeled reagent otherwise employed.

According to a first aspect, the present disclosure relates to a crosslinked polymer, containing reacted units of a first monomer of formula (I)

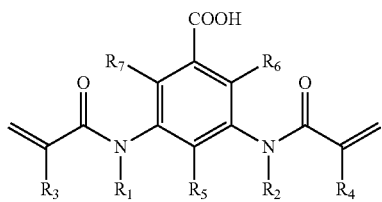

(I)

or a salt thereof, a solvate thereof, a tautomer thereof, a stereoisomer thereof, or a mixture thereof, and a second monomer of formula (II)

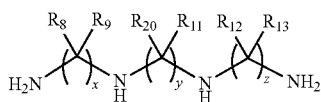

(II)

or a salt thereof, a solvate thereof, a stereoisomer thereof, or a mixture thereof.

$R_1$ and $R_2$ are independently selected from the group consisting of a hydrogen, an optionally substituted alkyl, an optionally substituted cycloalkyl, an optionally substituted arylalkyl, and an optionally substituted aryl. In one or more embodiments, $R_1$ and $R_2$ are independently a hydrogen, an optionally substituted $C_{1-6}$ alkyl, an optionally substituted $C_{2-5}$ alkyl, an optionally substituted $C_{3-4}$ alkyl, an optionally substituted alkylphenyl, or an optionally substituted phenyl. For example, $R_1$ and $R_2$ are independently a hydrogen, a methyl, an ethyl, a n-propyl, an isopropyl, a n-butyl, a tert-butyl, a phenyl, or a benzyl. In one embodiment, $R_1$ and $R_2$ are the same. In another embodiment, $R_1$ and $R_2$ are different. In a preferred embodiment, $R_1$ and $R_2$ are hydrogen.

$R_3$ and $R_4$ are independently selected from the group consisting of a hydrogen, an optionally substituted alkyl, an optionally substituted cycloalkyl, an optionally substituted arylalkyl, and an optionally substituted aryl. In one or more embodiments, $R_3$ and $R_4$ are independently a hydrogen, an optionally substituted $C_{1-6}$ alkyl, an optionally substituted $C_{2-5}$ alkyl, or an optionally substituted $C_{3-4}$ alkyl. For example, $R_3$ and $R_4$ are independently a hydrogen, a methyl, an ethyl, a n-propyl, an isopropyl, a n-butyl, or a tert-butyl. In one embodiment, $R_3$ and $R_4$ are the same. In another embodiment, $R_3$ and $R_4$ are different. In a preferred embodiment, $R_3$ and $R_4$ are hydrogen.

$R_5$, $R_6$, and $R_7$ are independently selected from the group consisting of a hydrogen, an optionally substituted alkyl, an optionally substituted cycloalkyl, an optionally substituted arylalkyl, a carboxy, a hydroxy, and a halogen. For example, $R_5$, $R_6$, and $R_7$ are independently a hydrogen, a methyl, a carboxy, a hydroxy, a chloro, or a bromo. In a preferred embodiment, $R_5$, $R_6$, and $R_7$ are hydrogen.

In a most preferred embodiment, the first monomer of formula (I) is 3,5-diacrylamidobenzoic acid

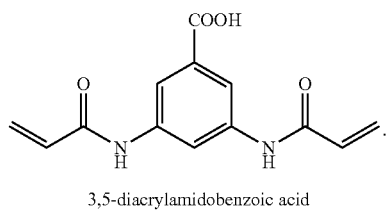 [SMILES: C=CC(=O)Nc1cc(NC(=O)C=C)cc(C(=O)O)c1]

3,5-diacrylamidobenzoic acid $R_8$, $R_9$, $R_{10}$, $R_{11}$, $R_{12}$, and $R_{13}$ are independently selected from the group consisting of a hydrogen, an optionally substituted alkyl, an optionally substituted cycloalkyl, an optionally substituted arylalkyl, and an optionally substituted aryl. In one or more embodiments, $R_8$, $R_9$, $R_{10}$, $R_{11}$, $R_{12}$, and $R_{13}$ are independently a hydrogen, or a methyl. In a preferred embodiment, $R_8$, $R_9$, $R_{10}$, $R_{11}$, $R_{12}$, and $R_{13}$ are hydrogen.

As used herein, the value of x denotes an alkyl chain of —C($R_8$)($R_9$)— groups of the second monomer of formula (II). In one or more embodiments, x is an integer in a range of 1-6, preferably 2-5, preferably 3-4. Most preferably, x is 3.

As used herein, the value of y denotes an alkyl chain of —C($R_{10}$)($R_{11}$)— groups of the second monomer of formula (II). In one or more embodiments, y is an integer in a range of 1-6, preferably 2-5, preferably 3-4. Most preferably, y is 2.

As used herein, the value of z denotes an alkyl chain of —C($R_{12}$)($R_{13}$)— groups of the second monomer of formula (II). In one or more embodiments, z is an integer in a range of 1-6, preferably 2-5, preferably 3-4. Most preferably, z is 3.

In a most preferred embodiment, the second monomer of formula (II) is N,N-bis(3-aminopropyl)ethylenediamine

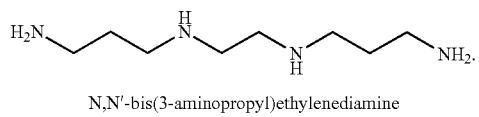 [SMILES: NCCCNCCNCCCN]

N,N'-bis(3-aminopropyl)ethylenediamine

It is equally envisaged that other polyamines containing more than two primary and/or secondary amine functionalities including, but not limited to, bis(3-aminopropyl)amine, diethylenetriamine, bis(hexamethylene)triamine, tetraethylenepentamine, and pentaethylenehexamine may be used in addition to or in lieu of the second monomer of formula (II) for constructing the presently disclosed crosslinked polymer.

As used herein, monomers are molecules which can undergo polymerization, thereby contributing constitutional repeating units to the structures of a macromolecule or polymer. The process by which monomers combine end to end to form a polymer is referred to herein as "polymerization". As used herein, a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc.

As used herein, "crosslinking", "cross-linking", "crosslinked", "cross-linked", a "crosslink", or a "cross-link" refers to polymers and resins containing branches that connect polymer chains via bonds that link one polymer chain to another. The crosslink may be an atom, a group of atoms, or a number of branch points connected by bonds, groups of atoms, or polymer chains. A crosslink may be formed by chemical reactions that are initiated by heat, pressure, radiation, change in pH, etc with the presence of at least one crosslinking monomer having more than two extension points, which is a monomer having more than two reactive sites. The above terms also encompass "hypercrosslinked" or "hyper-cross-linked" polymers and resins which exhibit two-dimensional polymer backbones or three-dimensional resin networks. As used herein, a hypercrosslinked structure may be produced by crosslinking a linear monomer having more than two extension points (e.g. the second monomer of formula (II)) with a bifunctional polymerizable compound (e.g. the first monomer of formula (I)).

In one embodiment, the second monomer of formula (II) having four reactive sites (primary and secondary amine groups) functions as a crosslinking monomer, where each reactive position can act as an extension point and form a crosslink (see FIG. 1). An addition polymerization often involves reactions of unsaturated molecules. This is in contrast to "polycondensation" which refers to a form of step growth polymerization where monomers join together by losing small molecules such as water or methanol as byproducts. In one or more embodiment, the crosslinked polymer disclosed herein comprises an addition polymerization product of a reaction of the first monomer of formula (I) and the second of formula (II) via an addition reaction of N—H bond(s) of primary and secondary amines of the second monomer across the double bond of acrylamides of the first monomer. In certain embodiments, the crosslinked polymer further comprises self-polymerization product of the first monomer via reaction between acrylamides.

In a preferred embodiment, the first monomer of formula (I) is present in a molar excess to the second monomer of formula (II). In one or more embodiments, a molar ratio of the first monomer of formula (I) to the second monomer of formula (II) is in a range of 2:1 to 8:1, preferably 5:2 to 7:1, preferably 3:1 to 6:1, preferably 7:2 to 5:1, preferably 3:1 to 4:1.

The crosslinked polymer of the present disclosure may have a wide molecular weight distribution. In one embodiment, the crosslinked polymer of the present disclosure has a number average molecular weight of 1-200 kDa, preferably 2-175 kDa, preferably 5-150 kDa, preferably 10-100 kDa, preferably 20-75 kDa, preferably 30-70 kDa, preferably 40-65 kDa, preferably 50-60 kDa.

A particle is defined as a small object that behaves as a whole unit with respect to its transport and properties. An average particle diameter (e.g., average particle size) of the particle, as used herein, and unless otherwise specifically noted, refers to the average linear distance measured from one point on the particle through the center of the particle to a point directly across from it. For a circle, an oval, an ellipse, and a multilobe, the term "diameter" refers to the greatest possible distance measured from one point on the shape through the center of the shape to a point directly across from it. For polygonal shapes, the term "diameter", as used herein, and unless otherwise specified, refers to the greatest possible distance measured from a vertex of a polygon through the center of the face to the vertex on the opposite side.

The crosslinked polymer may be present in the form of particles of the same shape or different shapes, and of the same size or different sizes. In one embodiment, the crosslinked polymer is in the form of at least one shape such as a sphere, a rod, a cylinder, a rectangle, a triangle, a pentagon, a hexagon, a prism, a disk, a platelet, a flake, a cube, a cuboid, and an urchin (e.g., a globular particle possessing a spiky uneven surface). In a related embodiment, the crosslinked polymer is in the form of particles with an average particle diameter in a range of 2-40 µm, preferably 3-30 µm, preferably 4-20 µm, preferably 5-10 µm, preferably 6-9 µm, preferably 7-8 µm. In a preferred embodiment, the crosslinked polymer is in the form of spherical particles, or substantially spherical (e.g., oval or oblong shape) particles. In a most preferred embodiment, the crosslinked polymer is in the form of spherical particles, or substantially spherical particles with an average particle diameter in a range of 2-25 µm, preferably 3-20 µm, preferably 4-15 µm, preferably 4.5-10 µm, preferably 5-9 µm, preferably 5.5-8 µm, preferably 6-7.5 µm, preferably 6.5-7 µm, or about 6.8 µm.

In one embodiment, the crosslinked polymer may be clustered together as agglomerates having an average diameter in a range of 40-1,000 µm, 60-750 µm, or 80-500 µm. As used herein, the term "agglomerates" refers to a clustered particulate composition comprising primary particles, the primary particles being aggregated together in such a way so as to form clusters thereof, with at least 50 volume percent of the clusters having a mean diameter that is at least 2 times the mean diameter of the primary particles, and preferably at least 90 volume percent of the clusters having a mean diameter that is at least 5 times the mean diameter of the primary particles. In a preferred embodiment, the particles are well separated from one another and do not form agglomerates. The size and shape of particles may be analyzed by techniques such as dynamic light scattering (DLS), scanning electron microscopy (SEM) and/or atomic force microscopy (AFM).

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In some embodiments, pore diameter, pore volume, and BET surface area are measured by gas adsorption analysis, preferably $N_2$ adsorption analysis (e.g. $N_2$ adsorption isotherms). In one or more embodiments, the crosslinked polymer described herein has a BET surface area in a range of 50-150 $m^2/g$, preferably 55-125 $m^2/g$, preferably 60-100 $m^2/g$, preferably 65-75 $m^2/g$.

The crosslinked polymer disclosed herein in any of its embodiments may be macroporous, mesoporous, or microporous. A porous polymer is one that forms a bulk solid that is porous. The pores exist in the bulk material, not necessarily in the molecular structure of the polymer. The term "microporous" means the pores of the crosslinked polymer have pores with an average pore width (i.e. diameter) of less than 2 nm. The term "mesoporous" means the pores of the crosslinked polymer have an average pore width of 2-50 nm. The term "macroporous" means the pores of crosslinked polymer have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and x-ray computed tomography (XRCT). In a preferred embodiment, the crosslinked polymer has mesopores with an average pore width of 2.01-50 nm, 5-25 nm, or 10-20 nm. In another embodiment, the crosslinked polymer has macropores with an average pore width greater than 50 nm, such as an average pore width of 55-200 nm, 60-150 nm, 75-125 nm, or 90-100 nm. In a further embodiment, the crosslinked polymer has micropores with an average pore width of 0.1-2 nm, 0.5-1.5 nm, or 0.8-1.2 nm.

A polymer may be loosely described as crystalline if it contains regions of three-dimensional ordering on atomic (rather than macromolecular) length scales, usually arising from intramolecular folding and/or stacking of adjacent chains. A degree of crystallinity may be expressed in terms of a weight fraction of volume fraction of crystalline material. The crystallinity of polymers may be characterized by their degree of crystallinity, ranging from zero for a completely amorphous (non-crystalline) polymer to one for a theoretical completely crystalline polymer. Methods for evaluating the degree of crystallinity include, but are not limited to, differential scanning calorimetry (DSC), X-ray diffraction (XRD), infrared (IR) spectroscopy, and nuclear magnetic resonance (NMR) spectroscopy. The distribution of crystalline and amorphous regions of a polymer may be further visualized with microscopic techniques, such as polarized light microscopy and transmission electron microscopy (TEM). The crosslinked polymer described herein may contain both crystalline and amorphous regions. In a preferred embodiment, the crosslinked polymer exhibits a semi-crystalline structure, which has a degree of crystallinity in the range of 0.1-0.8, 0.2-0.6, or 0.3-0.5. Alternatively, the crosslinked polymer is amorphous.

The crosslinked polymer disclosed herein may be prepared via a method involving the steps of (i) mixing the first monomer of formula (I) and the second monomer of formula (II) to form a mixture, and (ii) heating the mixture, thereby forming the crosslinked polymer.

In a preferred embodiment, reacting the first monomer of formula (I) and the second monomer of formula (II) to form the crosslinked polymer is performed in the presence of a solvent, preferably a polar solvent, most preferably ethanol. Exemplary polar solvents that may be used in addition to, or in lieu of ethanol include, but are not limited to, methanol, n-butanol, isopropanol, n-propanol, tetrahydrofuran, acetonitrile, dimethyl sulfoxide, ethyl acetate, acetone, nitromethane, propylene carbonate, and mixtures thereof. It is equally envisaged that the reaction may be adapted to be performed in a non-polar solvent such as pentane, cyclopentane, hexane, cyclohexane, benzene, toluene, 1,4-dioxane, diethyl ether, dichloromethane, and mixtures thereof. In certain embodiments, the reacting is conducted in neat condition (i.e. solvent free).

In a preferred embodiment, the first monomer of formula (I) is present in the mixture at a concentration in the range of 4-400 mM, preferably 8-200 mM, preferably 20-100 mM, preferably 25-50 mM, preferably 30-40 mM, or about 38 mM. In a related embodiment, the second monomer of formula (II) is present in the mixture at a concentration in the range of 2-50 mM, preferably 4-25 mM, preferably 6-20 mM, preferably 8-15 mM, preferably 9-12 mM, or about 9.5 mM.

The mixture containing the first and the second monomers may be subjected to agitation for 0.5-30 minutes, 1-20 minutes, or 5-10 minutes. The agitation may encompass shaking, stirring, rotating, vibrating, sonication and other means of agitating the mixture. The mixture may be heated at a temperature of 30-90° C., 40-80° C., 50-75° C., or 60-70° C. for 0.5-48 hours, 1-24 hours, 3-12 hours, or 6-8 hours. The mixture may be agitated throughout the duration of the reaction by employing a rotary shaker, a magnetic stirrer, a centrifugal mixer, or an overhead stirrer. Alternatively, the mixture is left to stand (i.e. not agitated). The heating of the mixture may be carried out in vacuum, or under an inert gas such as $N_2$, Ar, and He.

In a preferred embodiment, the crosslinked polymer is collected as a solid (e.g. powder) that may be separated (filtered off), soaked and washed in acetone, and then filtered and dried. In one embodiment, the solid may be dried under vacuum at 25-100° C., preferably 50-75° C., or about 60° C. for 0.1-8 hours, 0.5-4 hours, or about 1 hour, or until a constant weight is achieved. In a preferred embodiment, the method disclosed herein has a product yield of at least 75%, preferably at least 80%, preferably at least 85%, preferably at least 90%, preferably at least 92%, preferably at least 95%. The product yield is calculated as (mass of product/(total mass of limiting reactants))×100%.

The present disclosure also relates to a method for removing a pollutant from an aqueous solution. The method involves the steps of contacting the aqueous solution having an initial concentration of the pollutant with the crosslinked polymer disclosed herein in any of its embodiments to form a mixture, and filtering the mixture to obtain an aqueous solution having a reduced concentration of the pollutant compared to the initial concentration. In one or more embodiments, the pollutant is an organic dye, a heavy metal, or both.

The crosslinked polymer used herein may be optionally crushed to form powders of the polymer before contacting the aqueous solution. The crushing process may be carried out by utilizing a grinding method, e.g. mortar and pestle grinding, fluid energy milling, ball milling, wet milling, and cryogenic grinding. An adsorption process may be achieved in a batch or column system. Batch experiments are often carried out to determine the effectiveness of adsorption for the removal of specific adsorbates and to measure the maximum adsorption capacity. On the other hand, continuous adsorption can be carried out in a packed bed column.

Examples of aqueous solutions (i.e. organic dye and/or heavy metal contaminated aqueous solutions), water sources and systems applicable to the present method include, but are not limited to, surface water that collects on the ground or in a stream, aquifer, river, lake, reservoir or ocean, ground water that is obtained by drilling wells, run-off, industrial water (e.g. contaminated water generated by textile industry), public water storage towers, public recreational pools and/or bottled water. Methods for removing organic dyes and/or heavy metals from aqueous solutions according to the present disclosure include contacting the crosslinked polymer of the present disclosure in any of its embodiments with the contaminated water sources and systems. The methods may be carried out in tanks, containers, or small scale applications in both batch mode and fixed-bed or column mode.

Congo red (CR) is a negatively charged diazo dye bearing a symmetric aromatic structure which renders physicochemical, thermal, as well as optical stabilities of the dye. As a result, Congo red shows great resistance towards photo- and bio-degradations [M. M. Galangash, Z. N. Kolkasaraei, A. Ghavidast, M. Shirzad-Siboni, Facile synthesis of methyl propylaminopropanoate functionalized magnetic nanoparticles for removal of acid red 114 from aqueous solution, RSC Adv. 6 (2016) 113492-113502]. Congo red is harmful to human health and aquatic organisms due to its mutagenic and carcinogenic properties. Exposure to Congo red also causes respiratory issues, skin irritation, and allergies [N. P. Raval, P. U. Shah, N. K. Shah, Adsorptive amputation of hazardous azo dye Congo red from wastewater: a critical review, Environ. Sci. Pollut. Res. 23 (2016) 14810-14853; and A. Mittal, J. Mittal, A. Malviya, V. K. Gupta, Adsorptive removal of hazardous an-ionic dye "Congo red" from wastewater using waste materials and recovery by desorption, J. Colloid Interface Sci. 340 (2009) 16-26]. Rhodamine B (RhB) is known for its chronic toxicity, reproductive toxicity, neurotoxicity, carcinogenicity, developmental toxicity, and allergenic properties [K. K. Bera, R. Majumdar, M. Chakraborty, S. K. Bhattacharya, Phase control synthesis of α, β and α/β $Bi_2O_3$ hetero-junction with enhanced and synergistic photocatalytic activity on degradation of toxic dye, Rhodamine-B under natural sunlight, J. Hazard. Mater. 352 (2018) 182-191; and Y. G. Kim, W.-K. Jo, Efficient decontamination of textile industry wastewater using a photochemically stable n-n type $CdSe/Ag_3PO_4$ heterostructured nanohybrid containing metallic Ag as a mediator, J. Hazard. Mater. 361 (2019) 64-72]. Consequently, the use of Rhodamine B has been banned in cosmetics and food industries [G. Muthuraman, T. T. Teng, Extraction and recovery of rhodamine B, methyl violet and methylene blue from industrial wastewater using D2EHPA as an extractant, J. Ind. Eng. Chem. 15 (2009) 841-846].

Exemplary organic dyes that may be removed by the method disclosed herein using the crosslinked polymer include, but are not limited to, methyl green, methylene blue, malachite green, brilliant green, brilliant blue FCF, new methylene blue, methyl blue, methyl purple, thymol blue, rhodamine B, methyl violet 2B, methyl violet 6B, crystal violet, phenol red, acid green 5, basic fuchsin, acid fuchsin, bromophenol blue, patent blue V, pararosaniline, Victoria blue B, Victoria blue FBR, Victoria blue BO, Victoria blue FGA, Victoria blue 4 R, Victoria blue R, and azo dyes such as methyl orange, methyl red, methyl yellow, Congo red, direct blue 1, basic red 18, direct brown 78, trypan blue, disperse orange 1, alizarine yellow R, Sudan III, Sudan IV, Sudan black B, and orange G. The method disclosed herein may remove one or more organic dyes present as the pollutant in the mixture. In at least one embodiment, the method removes an organic dye which is at least one selected from the group consisting of Congo red, Rhodamine B, methyl orange, and bromophenol blue. In a preferred embodiment, the organic pollutant is Congo red, Rhodamine B, or both.

Exemplary metal ions that can be adsorbed by the crosslinked polymer of the present disclosure are of a wide range and include, but are not limited to, ions of Ag, Na, Pb, Mn, Fe, Co, Ni, Cu, Sn, Cd, Hg, Cr, Fe, As, Sb, Cr, Zn, V, Pt, Pd, Rh, Al, and mixtures thereof in various oxidation states such as +1, +2 and +3. Further, these metal ions may be of any oxidation state $M^{+1}$, $M^{+2}$, $M^{+3}$, etc. In a preferred embodiment, the heavy metal applicable to the present method is an ion of at least one heavy metal selected from the group consisting of Cr, Ni, Cu, Sn, and Pb. It is equally envisaged that the crosslinked polymer may be adapted or chemically modified to adsorb, incorporate and/or bind additional metal ions in addition to, or in lieu of the aforementioned heavy metal ions and may bind selectively or collectively. In one embodiment, the additional metal ion may be any ion which is suitably adsorbed by the crosslinked polymer disclosed herein in any of its embodiments. Exemplary additional metal ions include, but are not limited to, ions of an alkali metal (Li, Na, K, etc.), an alkaline earth metal (Mg, Ca, Sr, etc.), a lanthanide metal (La, Ce, Eu, Yb, etc.), an actinide metal (Ac, Th, etc.), a transition metal (Fe, Co, etc.), or a post-transition metal (Al, Sn, In, etc.). Preferably the additional metal ion is a transition metal ion, most preferably a heavy metal ion.

As used herein, adsorption is the adhesion of atoms, ions, or molecules from a gas, liquid, or dissolved solid to a surface. The process creates a film of an adsorbate (i.e., organic dyes, heavy metal ions) on the surface of an adsorbent (i.e., the crosslinked polymer). This process differs from absorption, in which a fluid (the absorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof. In one embodiment, the organic dyes and/or heavy metals are removed by physisorption with the crosslinked polymer of the current disclosure. In another embodiment, the organic dyes may interact with the surface and/or the pores of the crosslinked polymer via hydrogen bonding interactions, van der Waals forces, and/or π-π stacking (for organic dyes containing an aryl group such as phenyl, naphthyl, and indolyl (e.g. Congo red, Rhodamine B)) (see FIGS. 7A-B).

In one or more embodiments, the method for removing the pollutant is carried out in an aqueous solution having a pH in the range of 2 to 10, preferably a pH in the range of 3 to 9, more preferably a pH in the range of 4 to 8, even more preferably a pH in the range of 5 to 7, or a pH of about 6.

In one or more embodiments, the crosslinked polymer described herein in any of its embodiments is present in the aqueous solution in a concentration ranging from 0.1 to 20 grams per liter volume of the aqueous solution during the contacting, preferably 0.2-10 g preferably 0.5-7.5 g $L^{-1}$, preferably 1-5 g $L^{-1}$, preferably 2 to 4 grams per liter volume of the aqueous solution during the contacting.

In one or more embodiments, the crosslinked polymer is effective in adsorbing the pollutant in an aqueous solution within a temperature range of 10-100° C., preferably 20-80° C., preferably 25-60° C., preferably 30-50° C., preferably 35-40° C. In a preferred embodiment, the pollutant is an organic dye (e.g., Congo red, Rhodamine B), and the crosslinked polymer is contacted with the aqueous solution at a temperature in the range of 20-60° C., preferably 25-55° C., preferably 35-45° C.

In a preferred embodiment, the crosslinked polymer is contacted with the aqueous solution for 0.1 to 24 hours, preferably 0.25-12 hours, preferably 0.5-10 hours, preferably 1.0-8.0 hours, preferably 1.5-6.0 hours, preferably 2.0-5.0 hours, preferably 2.5-4.0 hours.

In one or more embodiments, the pollutant adsorption capacity of the crosslinked polymer of the present disclosure increases as the initial concentration of the pollutant (e.g., organic dyes, heavy metals) in aqueous solution increases. In a preferred embodiment, the crosslinked polymer is effective in removing the pollutant from aqueous samples wherein the initial concentration of the pollutant, preferably Congo red and/or Rhodamine B, in the aqueous solution is in the range of 10-5,000 mg $L^{-1}$, preferably 50-1,000 mg $L^{-1}$, preferably 100-800 mg $L^{-1}$, preferably 200-600 mg $L^{-1}$, preferably 300-400 mg $L^{-1}$.

In one embodiment, the crosslinked polymer of the present disclosure has an adsorption capacity of at least 250 mg of Congo red per gram of the crosslinked polymer, preferably at least 275 mg $g^{-1}$, preferably at least 280 mg $g^{-1}$, preferably at least 300 mg $g^{-1}$, preferably at least 400 mg $g^{-1}$ of Congo red per gram of the crosslinked polymer. In another embodiment, the crosslinked polymer of the present disclosure has an adsorption capacity of at least 17 mg of Rhodamine B per gram of the crosslinked polymer, preferably at least 19 mg $g^{-1}$, preferably at least 25 mg $g^{-1}$, preferably at least 30 mg $g^{-1}$, preferably at least 40 mg $g^{-1}$ of Rhodamine B per gram of the crosslinked polymer.

In one or more embodiments, greater than 50% of a total mass of the pollutant is removed from the aqueous solution at the end of the adsorption process following contacting, preferably greater than 55%, preferably greater than 60%, preferably greater than 65%, preferably greater than 70%, preferably greater than 80%, preferably greater than 90%, preferably greater than 92%, preferably greater than 94%, preferably greater than 96%, preferably greater than 97%, preferably greater than 98%, preferably greater than 99% of a total mass of the pollutant is removed from the aqueous solution at the end of the adsorption process following contacting.

Adsorption is a key mechanism of removing the pollutant in the present disclosure, which requires contact between the adsorbent material (crosslinked polymer) and the target adsorbate (e.g., organic dyes, heavy metals). There is generally an increase in the removal efficiency with increasing agitation speed until a certain level. In certain embodiments, the method further comprises agitation of the aqueous solution before, during, and/or after the contacting. The agitation may encompass shaking, stirring, rotating, vibrating, sonication and other means of increasing contact between the crosslinked polymer of the current disclosure and the pollutant. Further, the agitation can be performed manually or mechanically. In one embodiment, the treatment and contacting process may be enhanced by mechanical shaking or agitation, preferably by a bath shaker at a speed of up to 1000 rpm, preferably up to 750 rpm, preferably up to 500 rpm, preferably 50-450 rpm, preferably 75-375 rpm, preferably 100-300 rpm in order to increase contact between the crosslinked polymer and the pollutant.

In a preferred embodiment, the method further comprises recovering and reusing a pollutant loaded crosslinked polymer after the contacting and filtering steps. In certain embodiments, the pollutant loaded crosslinked polymer may be obtained from the aqueous solution with methods including, but not limited to, filtration, centrifugation, evaporation, heated evaporation and the like, preferably filtration or centrifugation, most preferably filtration. In certain embodiments, the obtained pollutant loaded crosslinked polymer may be washed several times with an appropriate solvent to remove all materials present after each round of pollutant absorption before being regenerated and reused and/or recycled in another round of removal of pollutant from an aqueous solution.

In one embodiment, the organic dye (e.g., Congo red, Rhodamine B) removal or adsorption process by the crosslinked polymer is an exothermic process, as indicated by a negative ΔH value, preferably less than −6 kJ/mol, preferably less than −8 kJ/mol, preferably less than −10 kJ/mol, preferably less than −13 kJ/mol, preferably less than −15 kJ/mol, preferably greater than −20 kJ/mol. In one embodiment, the organic dye (e.g., Congo red, Rhodamine B) removal or adsorption process by the crosslinked polymer is a spontaneous process as indicated by a negative ΔG° value, preferably −40 to −20 kJ/mol, preferably −30 to −25 kJ/mol, preferably −29 to −26 kJ/mol, preferably −28 to −27 kJ/mol.

The examples below are intended to further illustrate procedures for preparing and characterizing the crosslinked polymer of the present invention, and assessing the method for pollutant removal using the crosslinked polymer. They are not intended to limit the scope of the claims.

Example 1

Materials and General Methods

Chemicals were purchased from Sigma-Aldrich and were used as received. All of the experiments were carried out in distilled deionized water. X-ray powder diffraction (PXRD) patterns were acquired from Ultima IV x-ray diffractometer (Rigaku, Japan) with a CuKa radiation for crystalline phase identification (k=0.15405 nm for CuKa) with a scan rate of 1 deg/min. The scanning of the sample was from 5 to 60°. Perkin-Elmer spectrometer (16F PC FTIR, PerkinElmer Inc. USA) was used to obtain IR spectra. TGA analysis was done on TGA thermal (SDT Q600, V20.9 Build 20) with the following settings: (i) heating rate of 10° C./min, and (ii) flow rate of nitrogen atmosphere of 50 mL/min. The specific surface area and pore size distribution were determined using the methods of Brunauer-Emmett-Teller (BET) and Barrett-Joyner-Halenda (BJH), respectively, at 77K. Scanning electron microscopy (SEM) images and energy-dispersive X-ray (EDX) spectra were obtained on TESCAN LYRA 3 (model X-Max) equipped with EDX detector. $^1H$ and $^{13}C$-NMR spectra were measured on a JEOL spectrometer (JNM-LA 500 MHz, JEOL USA Inc.). Solid-state $^{13}C$ cross-polarization magic angle spinning (CP-MAS) NMR spectra were acquired on a Bruker spectrometer (400 MHz, H-1 frequency) at a spinning rate of 8 kHz and CP contact time of 2 ms with a delay time of 2 s.

Example 2

Synthesis of Bisacrylamide 2

Figure 14:
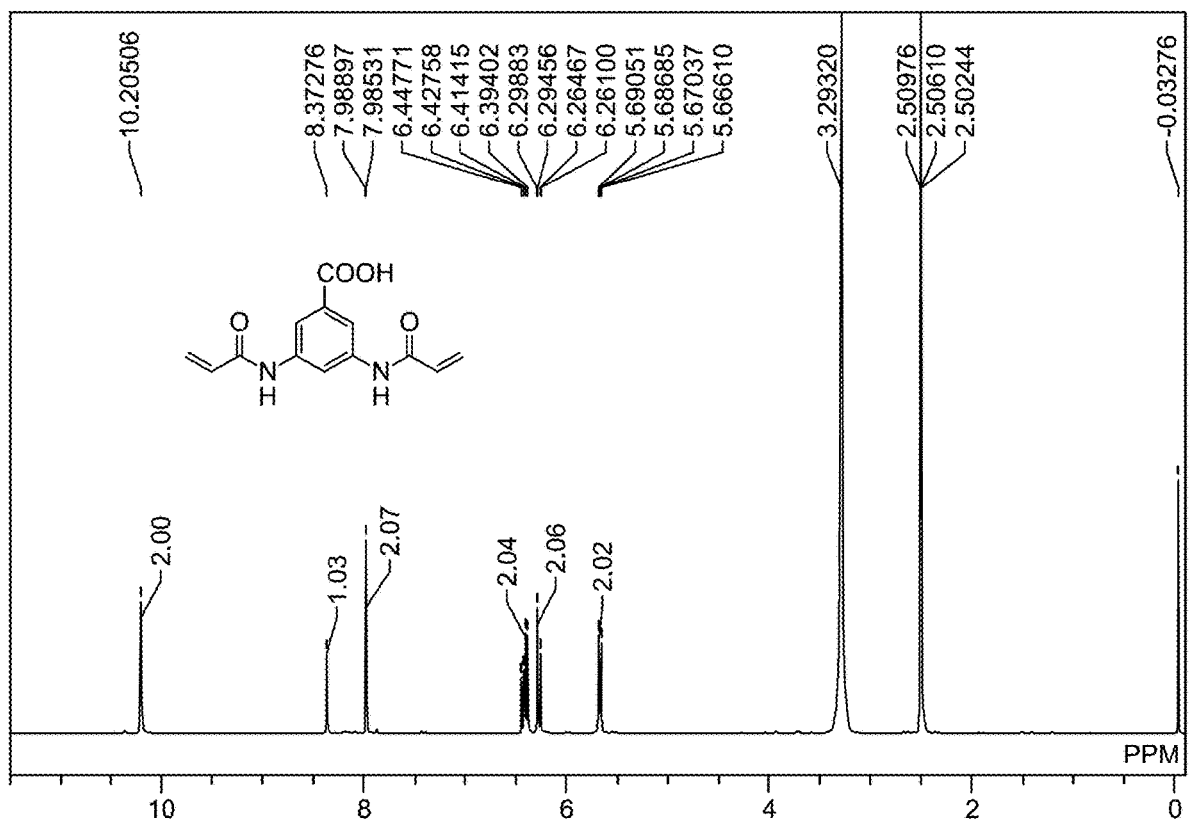
FIG. 14 is a $^1H$ NMR spectrum of 3,5-diacrylamidobenzoic acid in DMSO-$d_6$.
Figure 15:
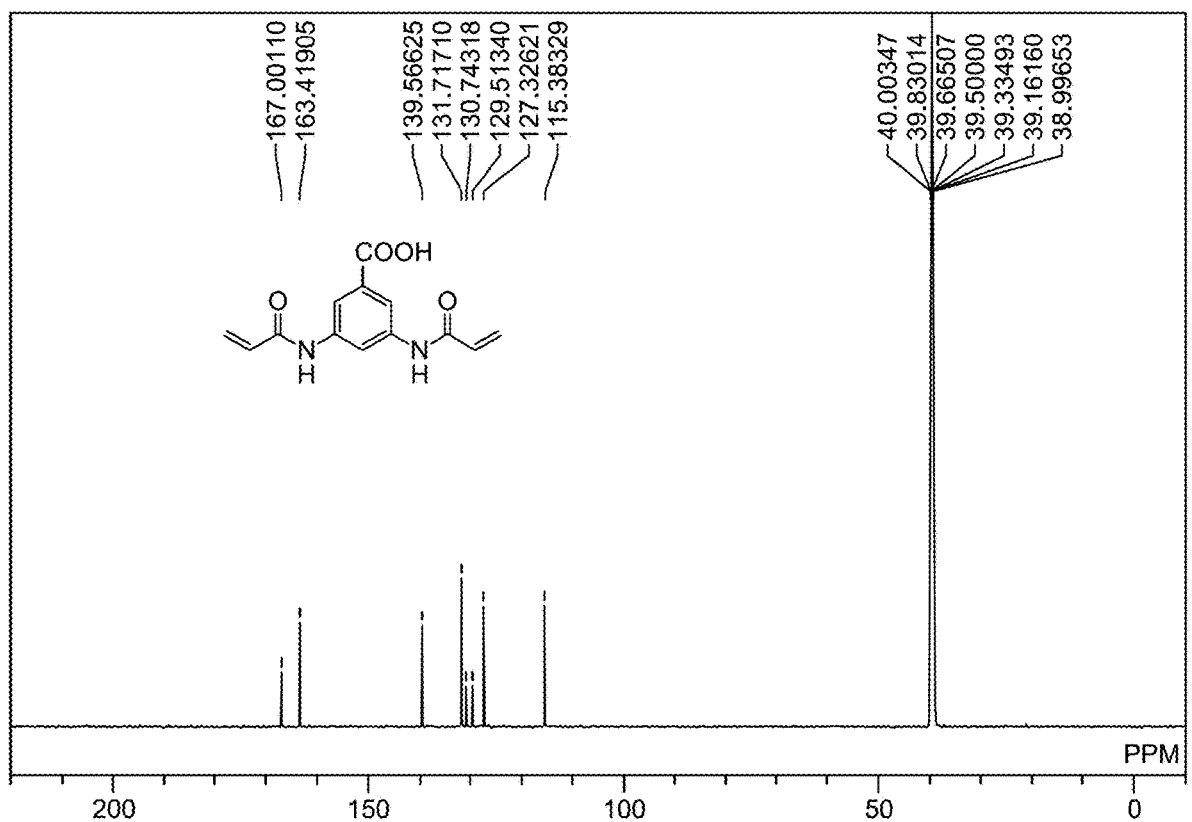
FIG. 15 is a $^{13}C$ NMR spectrum of 3,5-diacrylamidobenzoic acid in DMSO-$d_6$.

To a suspension of 3,5-diaminobenzoic acid 1 (4.0 g, 26.3 mmol) in EtOAc (160.0 mL) at 0° C., a solution of $K_2CO_3$ (72.0 g, 521.0 mmol) in water (160 mL) was added. After 10 minutes of vigorous stirring, acryloyl chloride (8.0 mL, 96.0 mmol) was carefully added in a dropwise manner into the reaction mixture, leading to the formation of a light brown viscous mass which was stirred further for 1 h at room temperature. Once the reaction was deemed completed (TLC analysis), the reaction mixture was allowed to stand until the aqueous layer was partitioned, which was then separated and acidified to pH 3 with 5% HCl. The organic layer was discarded while the aqueous layer was extracted with EtOAc (50.0 mL×2), and the obtained organic layer was washed with brine (30.0 mL) which was dried with $Na_2SO_4$ and volatiles were dried under reduced pressure leading to the target compound 2 as light brown solid (5.5 g, 73%). $^1$H-NMR (500 MHz, DMSO-$d_6$): δ 9.30 (s, 1H), 8.94 (s, 2H), 7.37 (2H, dd, J=17 Hz, 10.5 Hz), 7.22 (2H, d, J=17 Hz), 6.71 (2H, d, J=10.5 Hz) (FIG. 14). $^{13}$C-NMR (125.7 MHz, DMSO-$d_6$): 167.00, 163.42, 139.57, 131.71, 130.74, 129.33, 127.33, 115.33 (FIG. 15). Anal. Calcd for $C_{13}H_{12}N_2O_4$: C, 60.00; H, 4.65; N, 10.76. Found: C, 59.97; H, 4.81; N, 10.65.

Example 3

Synthesis of Resin (APEADA)

To a solution of tetramine 3 (1.04 mL 0.57 mmol) in ethanol (60.0 mL) at 0° C., bisacrylamide 2 (5 g, 2.3 mmol) was added portion-wise and the reaction temperature was raised to 45° C. whereby a light brownish solid started to appear. After heating at 45° C. for 30 minutes, the mixture was heated at reflux for 6 hours and then cooled to room temperature. The solvent was removed under vacuum and the obtained solid was washed with acetone 50 mL (3 times) and dried under vacuum at 60° C. for 1 hour to afford resin APEADA (5.7 g) as brown solid, which was grounded into fine powder by mortar and pestle for adsorption studies.

Example 4

Surface Oxygen Groups

The surface oxygen groups have been characterized by Boehm's titration where 0.20 g of the APEADA were dissolved in 25 mL of 0.1 mol·L$^{-1}$ NaOH, 0.1 mol·L$^{-1}$ NaHCO$_3$ and 0.05 mol·L$^{-1}$ Na$_2$CO$_3$ (for oxygen containing acidic groups), and 0.1 mol. HCl (for determining basic groups), respectively, in 50 mL polypropylene vessels and capped tightly. All mixtures were shaken for 24 h at 298.6 K at a speed of 150 rpm. The APEADA resin was separated by centrifugation and 10 mL of each of the supernatants were collected and the excess acid and base was titrated against 0.1 mol. NaOH and 0.1 mol. L$^{-1}$ HCl, respectively. The number of acidic sites was determined by assuming that NaOH neutralized all phenolic, carboxylic, and lactonic; Na$_2$CO$_3$ neutralized carboxylic and lactonic, and NaHCO$_3$ only neutralized carboxylic group. The number of basic sites was determined by calculating the amount of HCl that reacted with APEADA [A. Pawlicka, B. Doczekalska, Determination of surface oxygen functional groups of active carbons according to the Boehm's titration method, For. Wood Technol. 14 (2013) 11-14; and R. B. Fidel, D. A. Laird, M. L. Thompson, Evaluation of Modified Boehm Titration Methods for Use with Biochars, J. Environ. Qual. 42 (2013) 1771]. All of the experiments were repeated twice and the mean values were determined.

Example 5

Point of Zero Charge (PZC)

The point of zero charge was determined by salt addition method to ascertain surface zero charge of APEADA resin in aqueous phase at different pH values. In a series of 50 mL polypropylene vessels, 40 mL of 0.1 mol·L$^{-1}$ solution of NaCl was added. The pH values of the solutions were adjusted by 0.1 mol. L$^{-1}$ HCl and 0.1 mol. NaOH in the pH range of 2, 3, 4, 5, 6, 7, 8, 9, 10, 11, and 12. 0.10 g of APEADA was added to each of the above solutions and the pH of the supernatant was measured by pH meter and denoted as pH$_i$, the mixtures were then shaken for 24 h and the pH of the supernatant was measured again and denoted as pH$_f$. The PZC was determined by plotting pH$_f$ vs. pH$_i$ by finding out the point where two curves cross each other. All of the measurements were repeated twice and the mean values were determined [E. N. Bakatula, D. Richard, C. M. Neculita, G. J. Zagury, Determination of point of zero charge of natural organic materials, Environ. Sci. Pollut. Res. 25 (2018) 7823-7833].

Example 6

Particle Size Distribution

Figure 17:
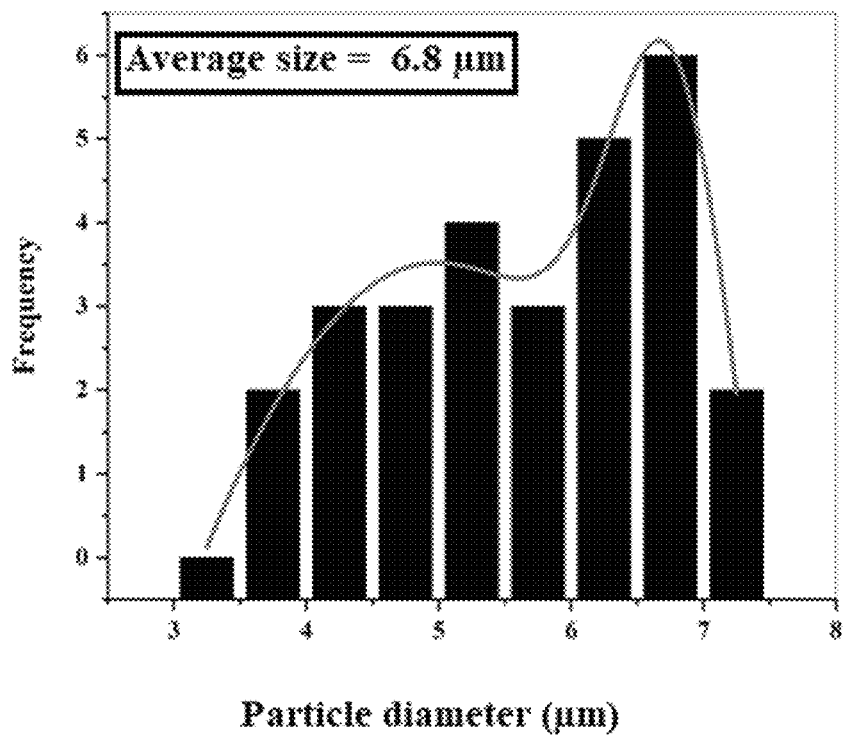
FIG. 17 shows particle size distribution of crosslinked polymer APEADA.

The particle size distribution of the APEADA resin was calculated using FESEM images of the APEADA via imageJ software. The particles diameters of the resin were calculated for 30 particles which were then used to draw histograms with Gaussian distribution by Origin Pro 2018 (FIG. 17).

Example 7

Batch Adsorption Experiment

The batch experiments were carried out by mechanically agitating 20.0 mL solution of dye in a buffer of specific pH with a specified sorbent dose at 150.0 rpm while maintaining temperature at 25° C. The resultant solution mixture was then centrifuged after 24 h. Then the amount of the remaining dye was estimated by analyzing the supernatant by UV-vis spectrophotometer. The conditions for adsorption capacity (q) of resin were optimized by varying adsorption parameters of (i) pH values ranging from 2 to 10, using buffer solution, and (ii) sorbent dosage ranging between 0.2 to 10.0 g L$^{-1}$. The optimized conditions from the preliminary studies were then utilized to investigate resin's adsorption capacity of dyes. Solution of dyes (20 mL) with initial concentrations of 50.0 mg L$^{-1}$ (RhB) and 100 mg L$^{-1}$ (CR), with sorbent dose of 0.05 g (RhB) and 0.025 g (CR) at pH 5.01 (RhB) and pH 8.14 (CR), respectively, were mechanically agitated at 150.0 rpm at 25° C. Then, samples were collected at time intervals between 5 to 1440 min. Dye concentration at equilibrium or any time t in supernatant solutions was determined using UV-vis spectrophotometer at $\lambda_{max}$ ($\lambda_{max}$=554 nm for RhB, $\lambda_{max}$=661 nm for CR). Analysis was performed based on the calibration curve method. The mass balance relationship was employed to calculate the amount of dye adsorbed ($q_e$) in mg per gram of resin (mg dye/g dry resin).

$$q_e = (C_e - C_0) \times \frac{V}{M} \qquad (1)$$

Where V=volume of dye solutions in L, $q_e$=adsorption capacity of resin in mg/g, while M=mass of the resin in g.

The efficiency of removing dye (% adsorption) is given by the following relation:

$$\% \text{ Adsorption} = \frac{C_e - C_0}{C_0} \times 100 \qquad (2)$$

Where $C_e$=concentration of the dye at equilibrium, and $C_0$=initial concentration of dye in mg/L. The average of three replicates was reported for a single adsorption experiment. All adsorption measurements were reproducible within ±10%. Same set of experiments were carried out to investigate the removal of both dyes by resin. The experimental data of dyes adsorption onto resin was examined by non-linear method of four widely employed isotherm models, namely Langmuir, Freundlich, Dubinin-Radushkevich, and Temkin models. A non-linear curve fitting option was used in OriginPro 2018 to find the best fit.

Example 8

Effect of Real Water Matrix on Removal Efficiency of APEADA

In order to study the effects of real water matrix on adsorption efficiency of APEADA resin, a polluted waste water sample consisting of four synthetic dyes, namely methyl orange, bromophenol blue, rhodamine B, and CR was prepared and its detailed composition is given in Table 6 [A. J. B. Leite, E. C. Lima, G. S. Dos Reis, P. S. Thue, C. Saucier, F. S. Rodembusch, S. L. P. Dias, C. S. Umpierres, G. L. Dotto, Hybrid adsorbents of tannin and APTES (3-aminopropyltriethoxysilane) and their application for the highly efficient removal of acid red 1 dye from aqueous solutions, J. Environ. Chem. Eng. 5 (2017) 4307-4318].

Example 9

Characterizations of the Resin

Figure 2:
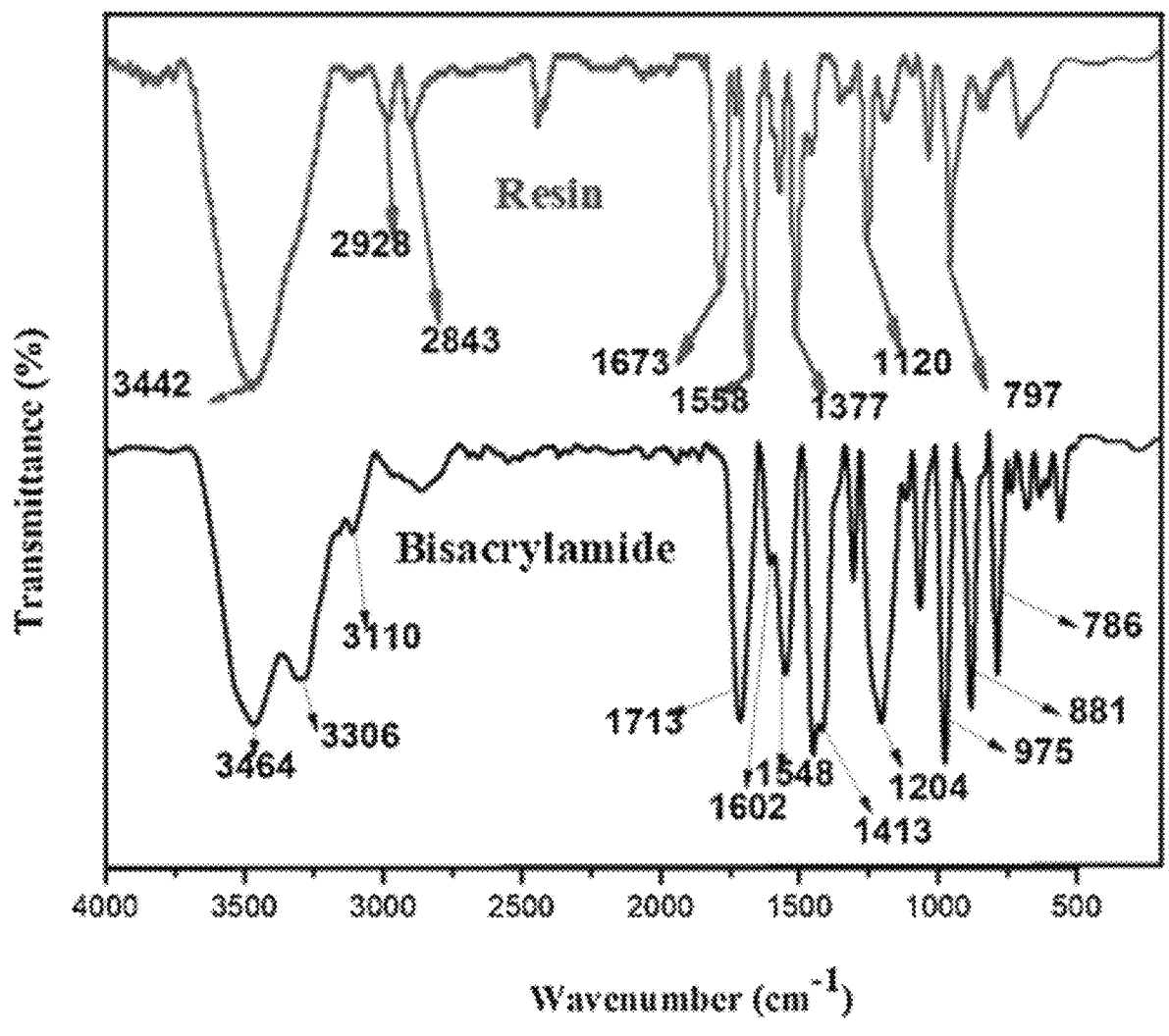
FIG. 2 is an overlay of Fourier transform infrared (FT-IR) spectra of 3,5-diacrylamidobenzoic acid, and crosslinked polymer APEADA, respectively.

As discussed above, the resin was synthesized from a conjugate addition of bisacrylamide (2) [J. Lux, A. G. White, M. Chan, C. J. Anderson, A. Almutairi, Nanogels from metal-chelating crosslinkers as versatile platforms applied to copper-64 PET imaging of tumors and metastases, Theranostics 5 (2015) 277-288, incorporated herein by reference in its entirety] with N,N-bis(3-aminopropyl)ethylenediamine (3) (FIG. 1). The chemical structure of the resin was established with the aid of IR and solid-state $^{13}C$ (CP-MAS) NMR. The IR spectrum of the resin displayed a lower energy absorption at 1673 $cm^{-1}$ due to the presence of C=O and peaks for $CH_2$ stretching vibrations at 2843 and 2928 $cm^{-1}$. In addition, broad peak of 2 at 3464 $cm^{-1}$ was shifted to 3442 $cm^{-1}$. These all indicated the formation of resin (FIG. 2).

Figure 3:
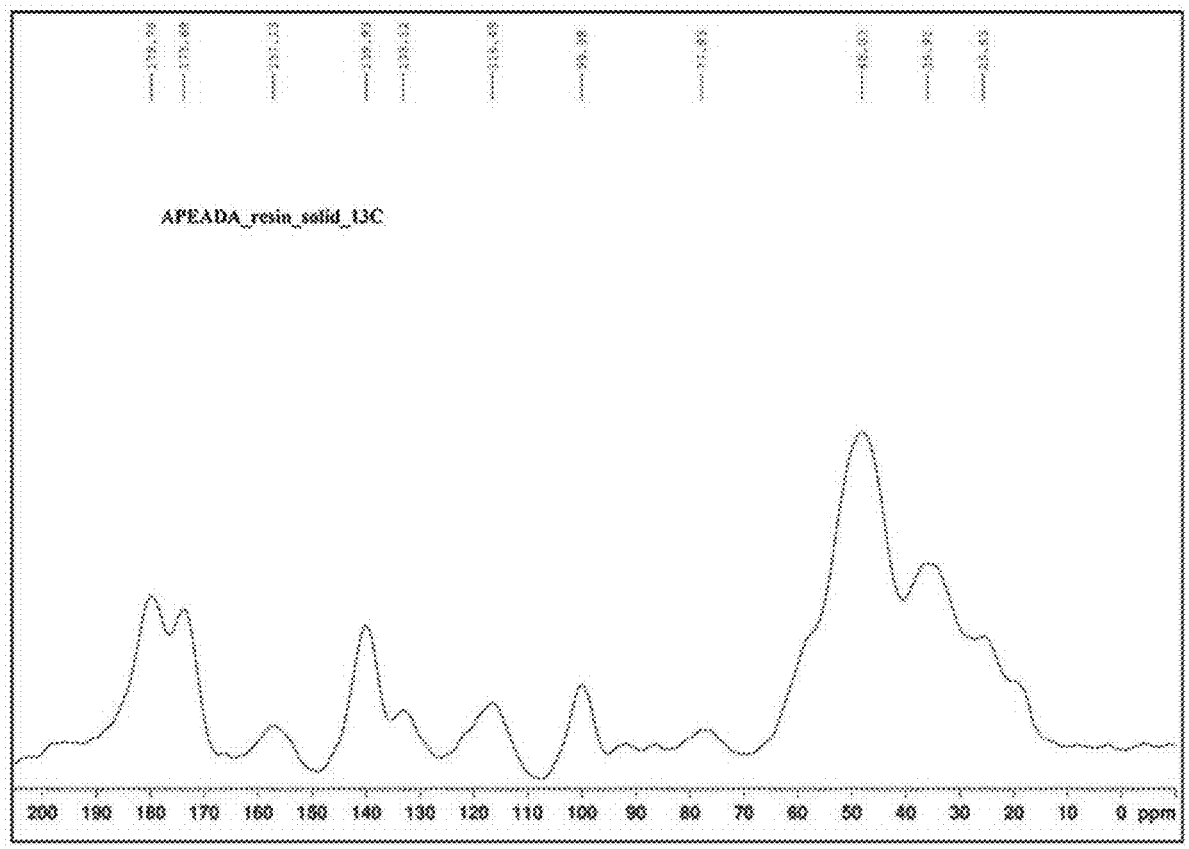
FIG. 3 is a solid-state $^{13}C$ nuclear magnetic resonance (NMR) spectrum of crosslinked polymer APEADA.

Likewise, peaks in the aliphatic region between 25 to 48 ppm observed in the solid-state $^{13}C$ (CP-MAS) NMR of APEADA (FIG. 3) indicated the existence of aminopropylethylenediamine moiety. In addition, the downfield shift of carbonyl carbon of α,β-unsaturated amide of 2 from 163.42 ppm to 173.69 ppm clearly demonstrated the presence of amidobenzoic acid function.

Figure 16:
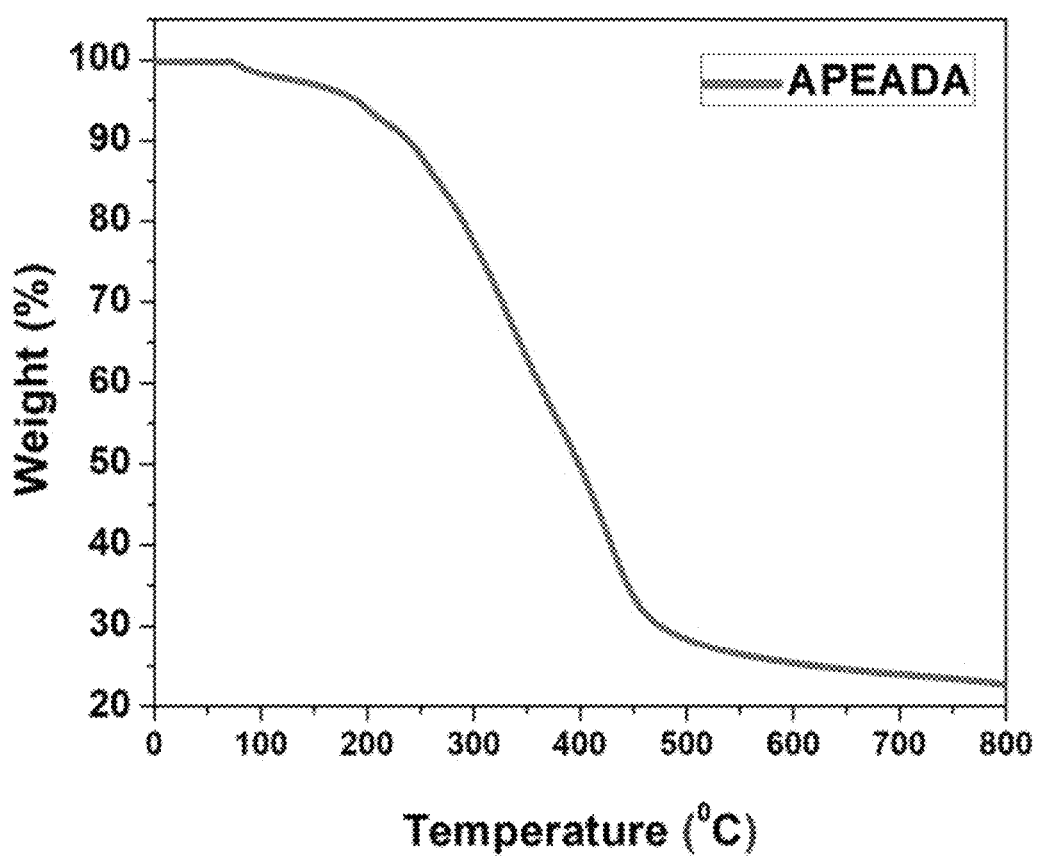
FIG. 16 shows thermogravimetric analysis (TGA) of crosslinked polymer APEADA.

To examine the thermal stability of the resin, thermogravimetric analysis (TGA) was performed under oxygen atmosphere at a heating rate of 10° C. $min^{-1}$. As indicated in FIG. 16, the resin was found to be stable even at high temperature, with no appreciable loss of mass at up to 200° C. However, above the thermal decomposition temperature (Td) of 200° C., an abrupt decomposition with a sharp weight loss of resin was observed (FIG. 16).

Figure 4A:
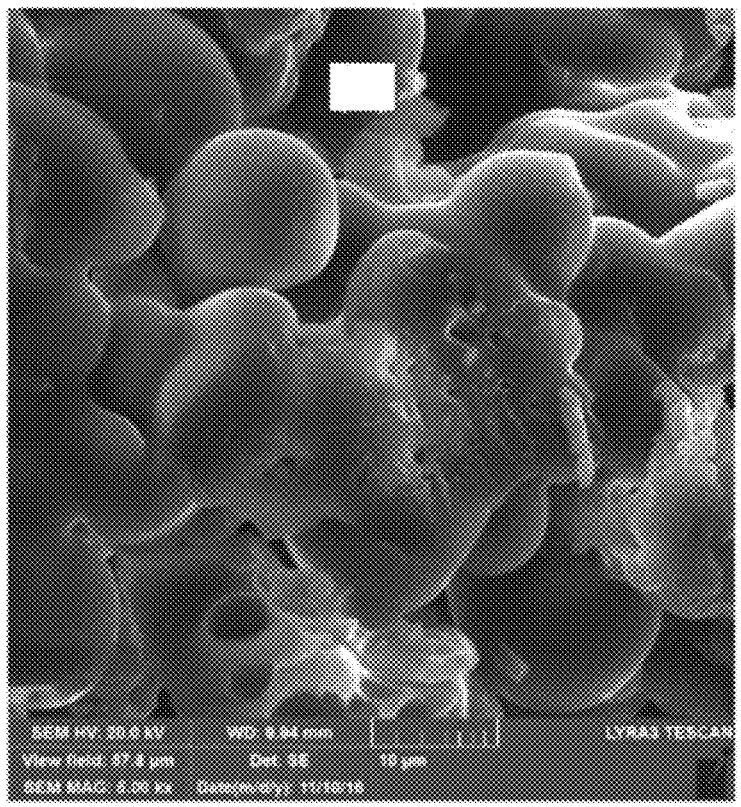
FIG. 4A is a field emission scanning electron microscope (FESEM) micrograph (scale bar: 10 μm) of crosslinked polymer APEADA.
Figure 4B:
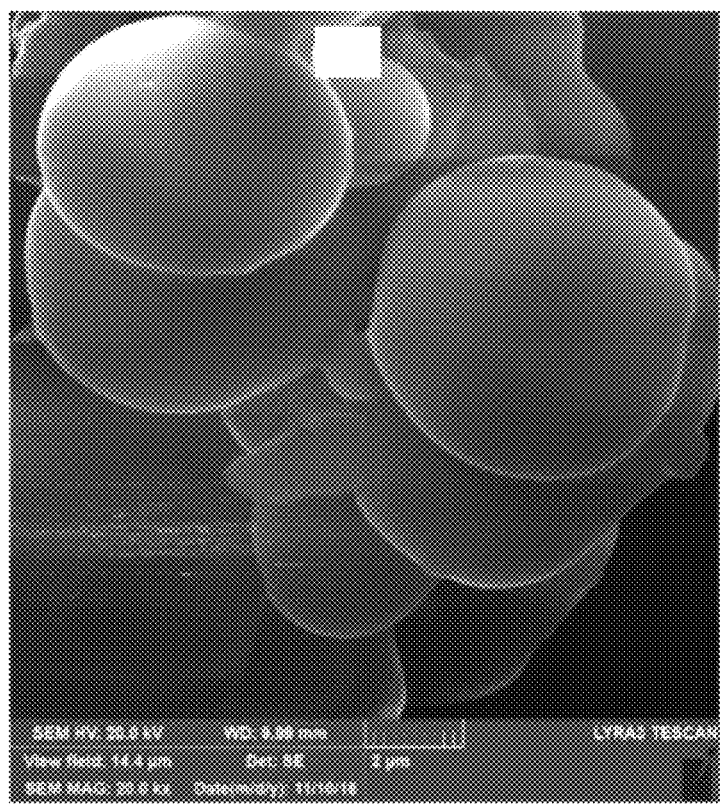
FIG. 4B shows a magnified view of the sample in FIG. 4A (scale bar: 2 μm).
Figure 4C:
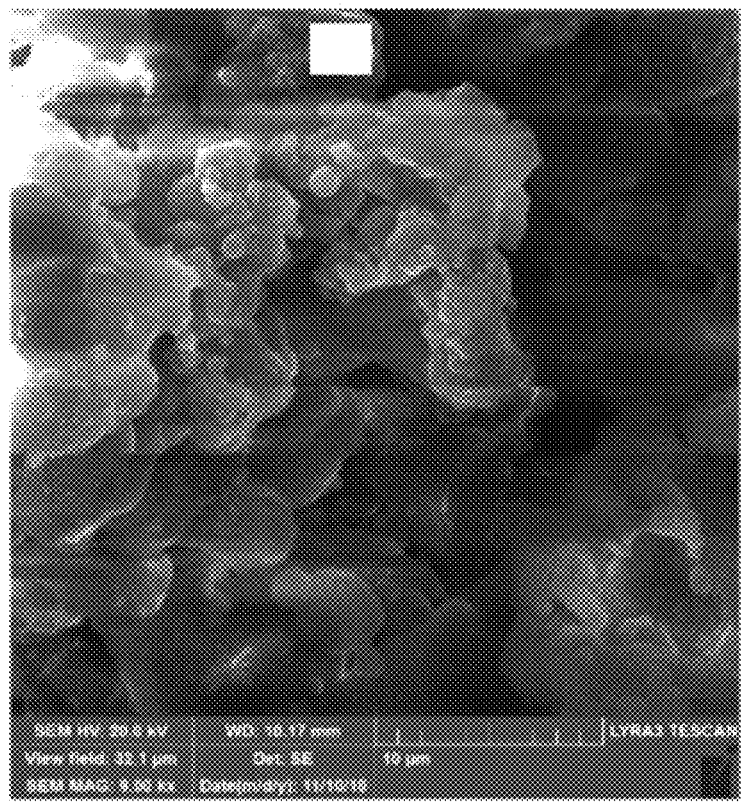
FIG. 4C is a FESEM micrograph (scale bar: 10 μm) of crosslinked polymer APEADA after its adsorption of Congo red.
Figure 4D:
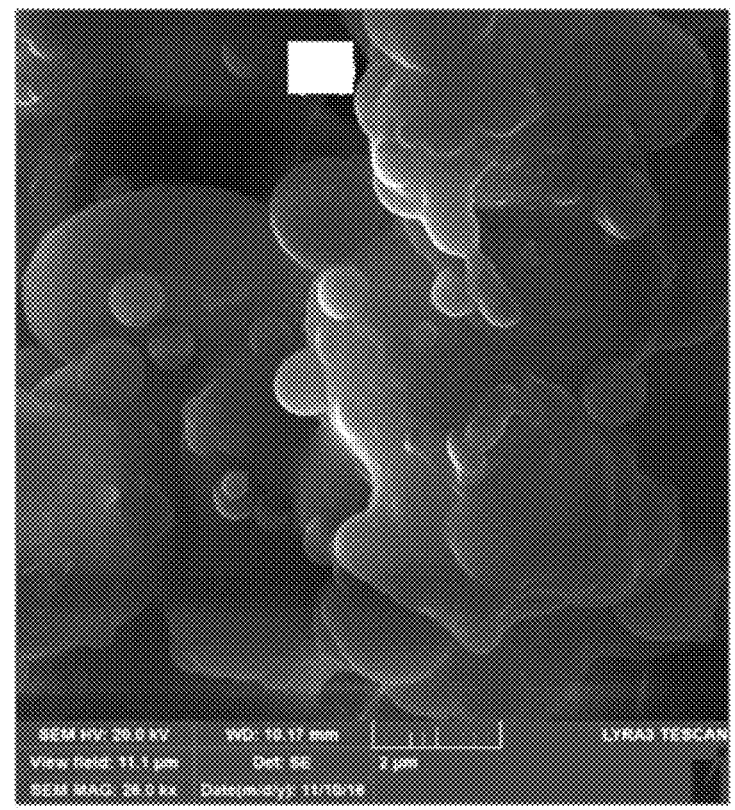
FIG. 4D shows a magnified view of the sample in FIG. 4C (scale bar: 2 μm).
Figure 4E:
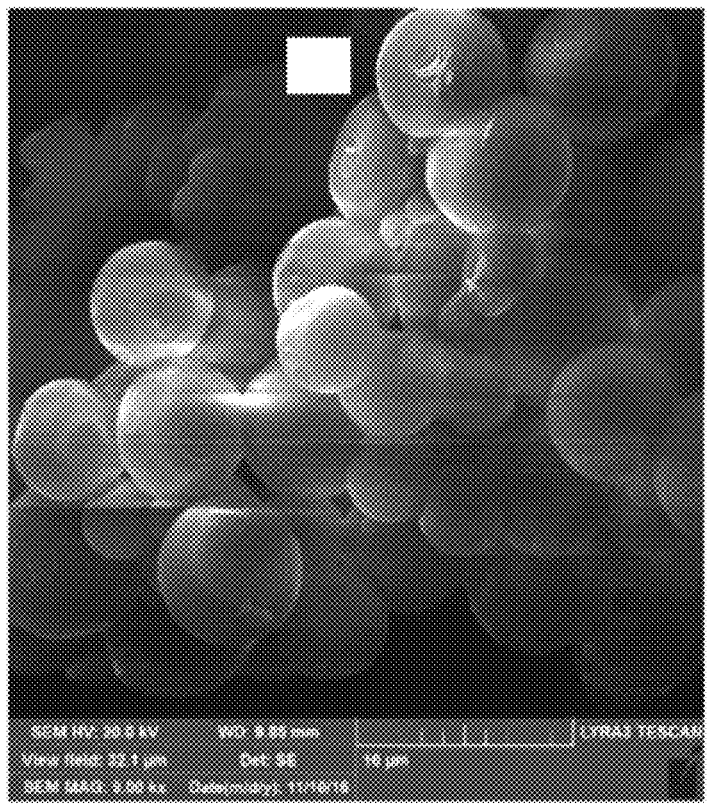
FIG. 4E is a FESEM micrograph (scale bar: 10 μm) of crosslinked polymer APEADA after its adsorption of Rhodamine B.
Figure 4F:
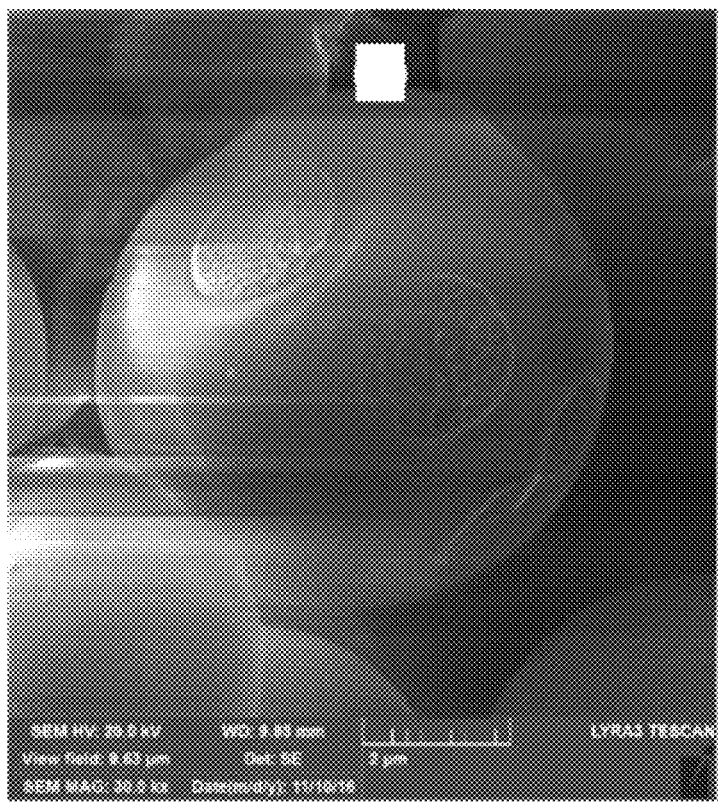
FIG. 4F shows a magnified view of the sample in FIG. 4E (scale bar: 2 μm).

The surface morphologies of resin were studied before and after adsorption by field emission scanning electron microscope (FESEM) (FIGS. 4A-F). As illustrated in FIG. 4A, the surface of conjugate resin contains scattered beads, giving it an agglomerated texture. The magnified image of the resin before adsorption (FIG. 4B) indicated that beads possessed a smooth surface. However, images after adsorption of RhB and CR (FIGS. 4C and 4E) revealed that the original smooth and fine surface of the resin transformed to blurred and enormously covered by the masses of dyes adsorbed, which led to roughness of the surface. As indicated by FIGS. 4D and 4F, the extents of adsorption of these dyes were not equal, i.e. the adsorption of CR was higher than RhB. Nevertheless, an interesting net like pattern of adsorption of RhB can be seen clearly on the beads (FIG. 4F).

Figure 5:
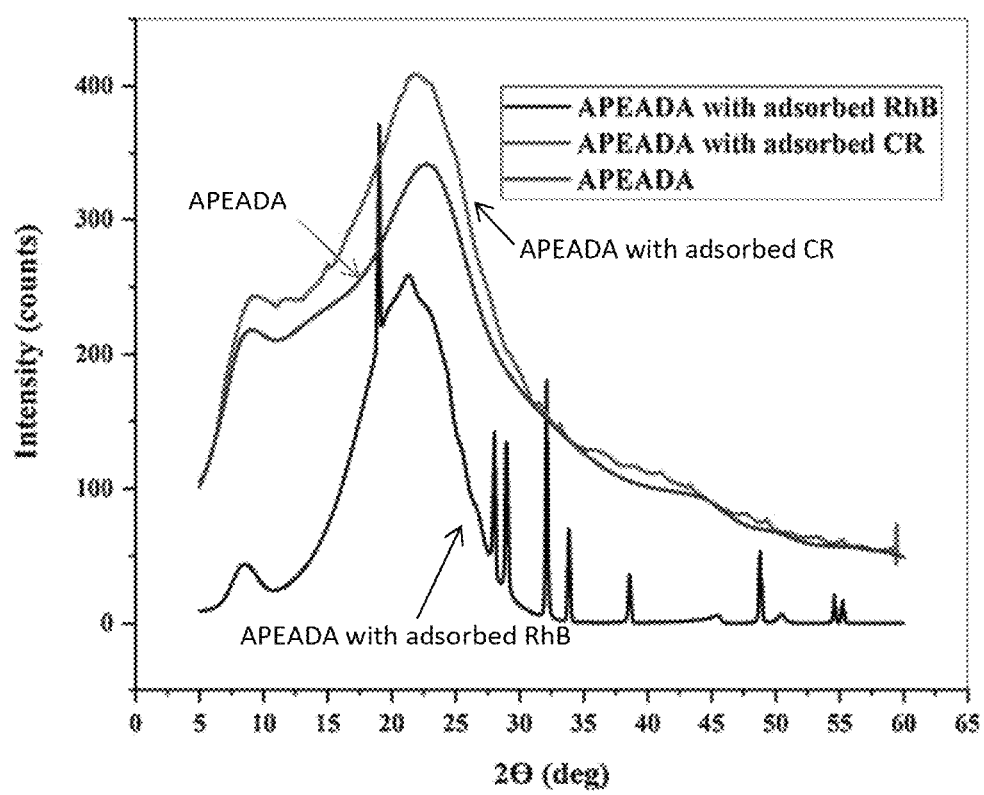
FIG. 5 is an overlay of powder X-ray diffraction (PXRD) patterns of crosslinked polymer APEADA, and after its adsorption of Congo red (CR) and Rhodamine B (RhB), respectively.
Figure 18:
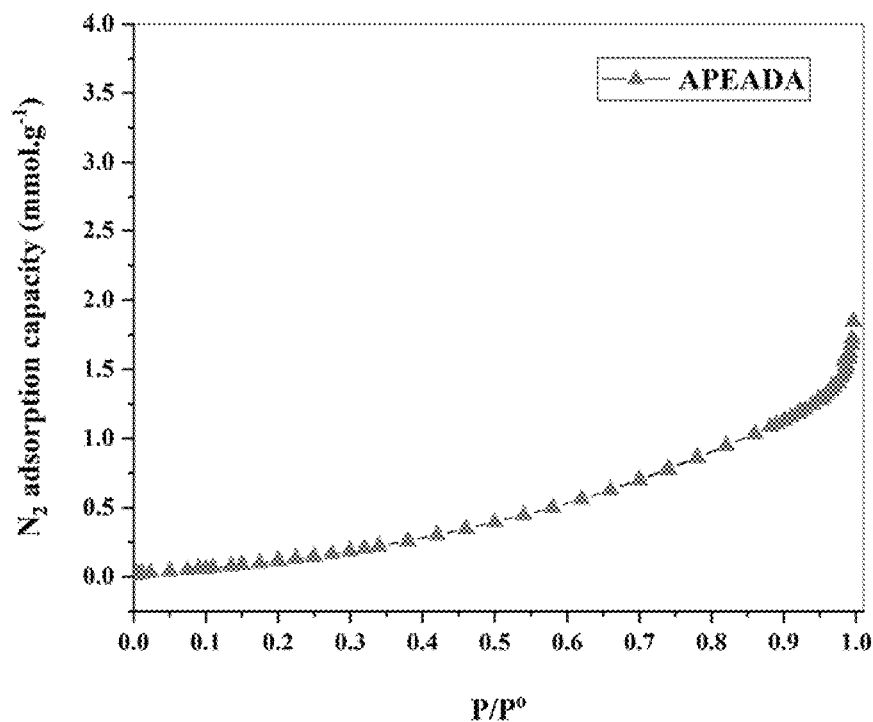
FIG. 18 is BET $N_2$ adsorption-desorption isotherm of crosslinked polymer APEADA at 77 K.
Figure 19:
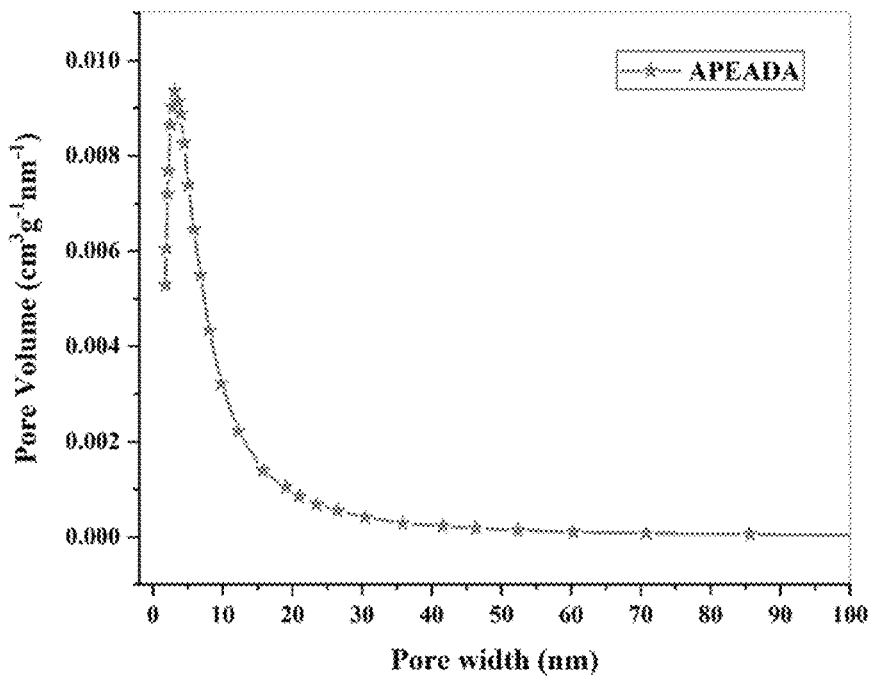
FIG. 19 shows pore size distribution of crosslinked polymer APEADA.

Furthermore, the particle size distribution of the resin was obtained using imageJ software (FIG. 17). As revealed by FIG. S4, average particle diameter of the resin is 6.8 μm. The BET analysis of APEADA showed porous nature of the resin, with a total volume of 0.082 $cm^3 \cdot g^{-1}$ for pores diameter <400 Å at $p/p°$=0.95000. The surface area of the resin was found to be 64.78 $m^2 \cdot g^{-1}$ wherein the microspores contributed 21.6 $m^2 \cdot g^{-1}$ and meso/macropores 43.18 $m^2 \cdot g^{-1}$. BET graph of the resin for nitrogen adsorption-desorption at 77 K is given in FIG. 18 [M. Thommes, K. Kaneko, A. V. Neimark, J. P. Olivier, F. Rodriguez-Reinoso, J. Rouquerol, K. S. W. Sing, Physisorption of gases, with special reference to the evaluation of surface area and pore size distribution (IUPAC Technical Report), Pure Appl. Chem. 87 (2015) 1051-1069]. The pore size distribution indicates that the major contribution to the pore volume is due to meso/macropores (FIG. 19), which in turn allows an easy access of dyes into micropores of the adsorbent, thus enhanced interaction and better removal of the dyes. The XRD profile of APEADA shows semi-crystalline structure (FIG. 5). The crystallinity of APEADA could be attributed to the hydrogen bonding due to the presence of carboxylic and amine groups in the chains which led to an ordered structure [G. Z. Kyzas, P. I. Siafaka, E. G. Pavlidou, K. J. Chrissafis, D. N. Bikiaris, Synthesis and adsorption application of succinyl-grafted chitosan for the simultaneous removal of zinc and cationic dye from binary hazardous mixtures, Chem. Eng. J. 259 (2015) 438-448, incorporated herein by reference in its entirety]. In addition, XRD pattern also revealed amorphous humps at 8° and 20°, which indicated that APEADA was semi-crystalline in nature (FIG. 5) [S. Polizzi, G. Fagherazzi, A. Benedetti, M. Battagliarin, T. Asano, Crystallinity of polymers by x-ray diffraction: a new fitting approach, Eur. Polym. J. 27 (1991) 85-87, incorporated herein by reference in its entirety]. Moreover, adsorption of dyes onto resin led to vanishing peaks due to crystallinity in APEADA, resulting in amorphous XRD patterns. The change in the XRD pattern indicated that adsorption of dyes onto resin possibly decreased the hydrogen bonding interactions present among the chains in APEADA that in turn led to a loss of close packing of the chains responsible for crystallinity in APEADA.

Figure 20:
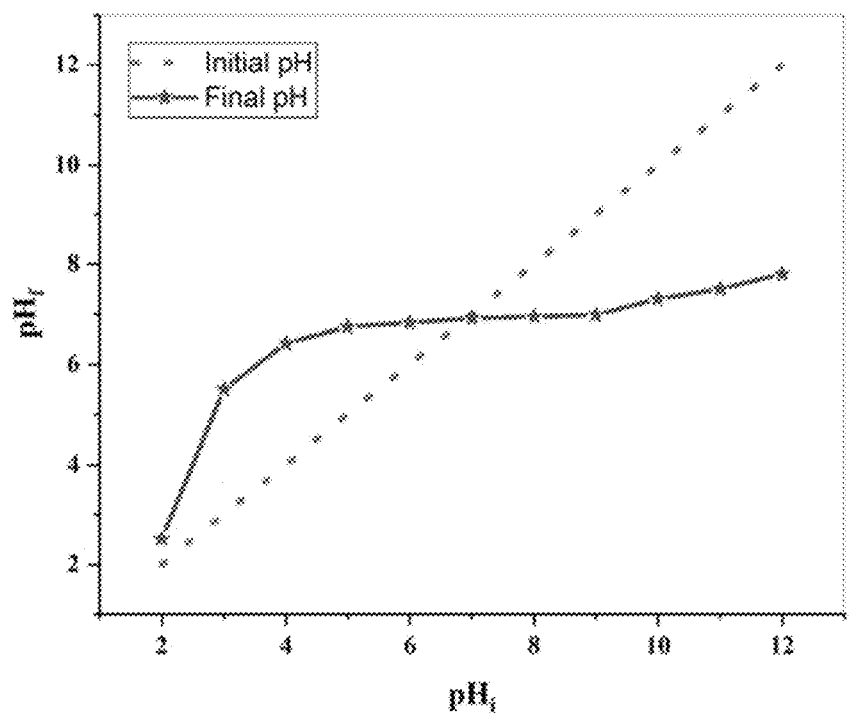
FIG. 20 is a plot for determining point zero charge (PZC) of crosslinked polymer APEADA.

The pH of point zero charge (pHpzc) of the adsorbent, a pH where the surface charge components become equal to zero, was determined by salt addition method (FIG. 20). The value of pHpzc was found to be 6.8. Likewise, the surface oxygen and basic groups of the resin were quantified by Boehm titration which revealed that resin was composed of acidic (0.895 mmol g$^{-1}$) as well as basic sites (0.650 mmol g$^{-1}$) (Table 1).

TABLE 1

Surface chemical characteristics of APEADA resin

| | |
|---|---|
| Carboxylic groups (mmol/g) | 0.750 |
| Lactonic groups (mmol/g) | 0.050 |
| Phenolic groups (mmol/g) | 0.095 |
| Total acid groups (mmol/g) | 0.895 |
| Total basic groups (mmol/g) | 0.650 |
| pH$_{pzc}$ | 6.8 |

Example 10

Effect of pH on Adsorption

Batch adsorption experiments were carried out by varying pH from 2.01 to 10.0, keeping the concentration of dyes solutions at 50.0 mg L$^{-1}$ (RhB) and 100.0 mg L$^{-1}$ (CR) with resin dosage of 0.05 g and 0.025 g, respectively, at 25° C. (FIG. 6).

Figure 6:
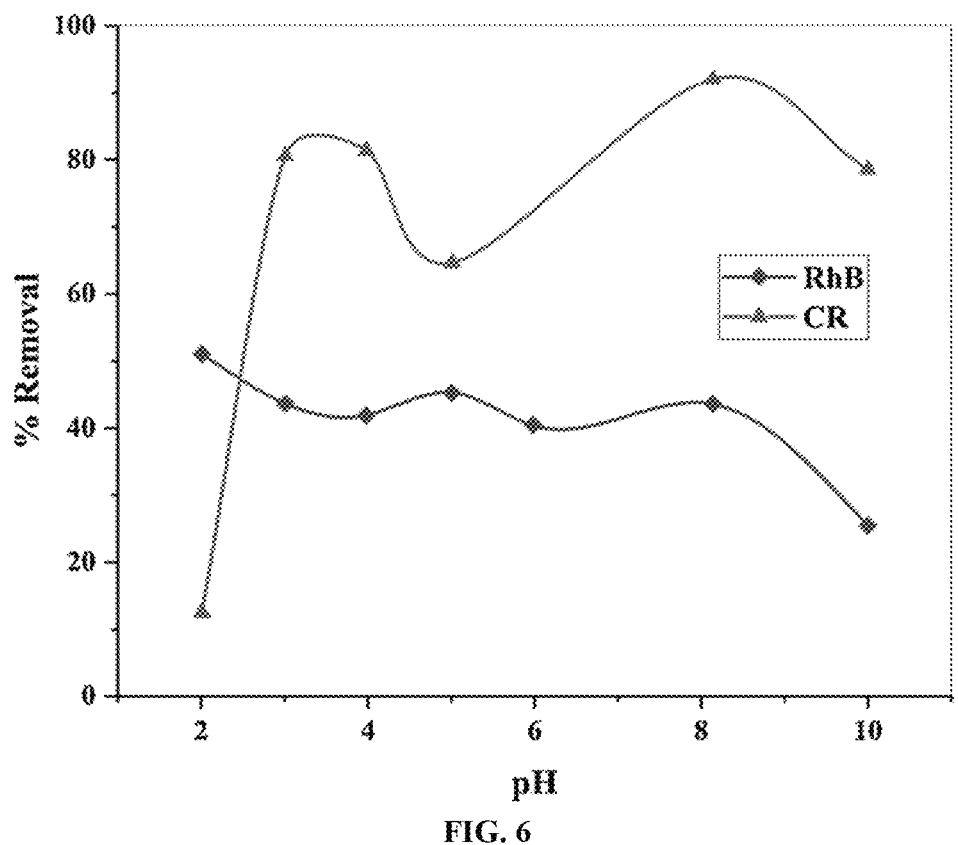
FIG. 6 is a plot illustrating the effect of pH of an aqueous solution on organic dye (i.e., RhB and CR) adsorption capacity of crosslinked polymer APEADA.
Figure 7A:
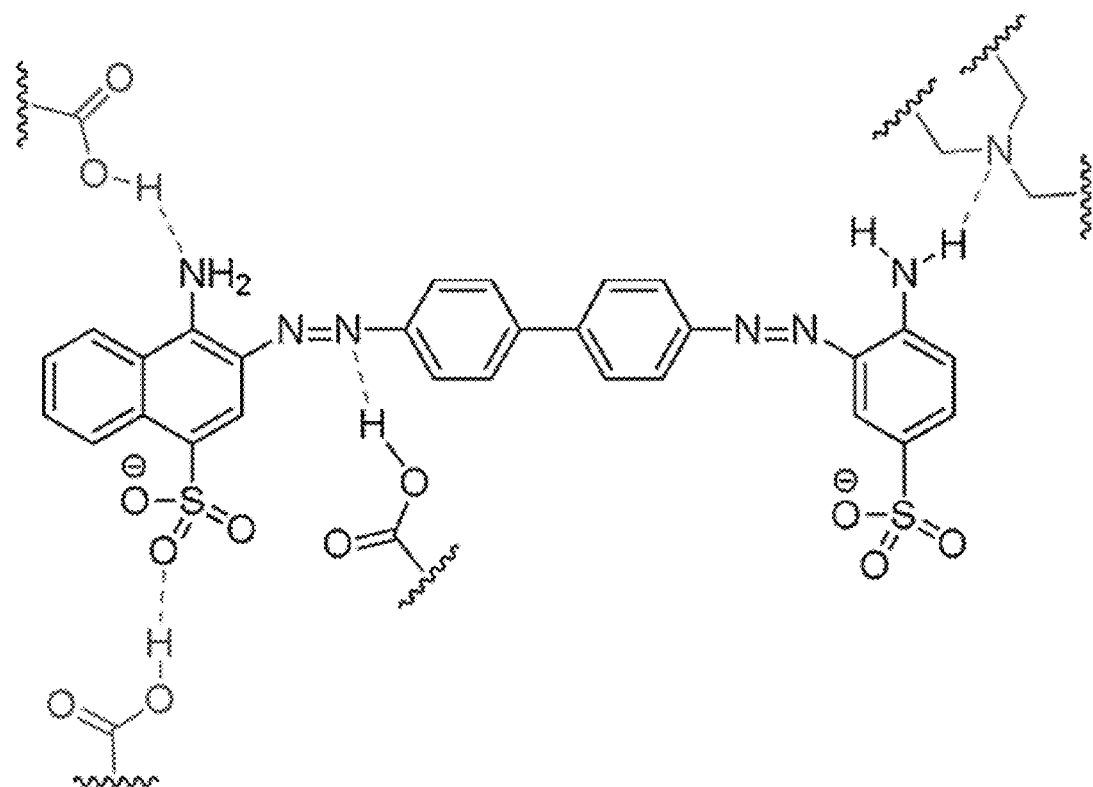
FIG. 7A illustrates proposed mechanism of CR adsorption by crosslinked polymer APEADA at pH 8.14.
Figure 7B:
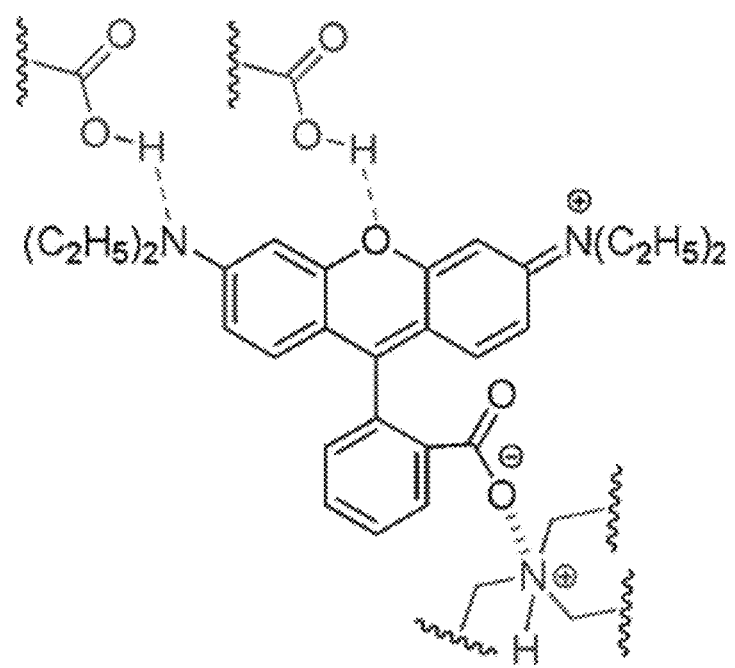
FIG. 7B illustrates proposed mechanism of RhB adsorption by crosslinked polymer APEADA at pH 5.01.

As shown in FIG. 6, % removal of RhB changed in a zig zag manner with increasing pH of the solution. The maximum value of % removal (51.1%) was observed at pH 2.01 which decreased continuously until pH reached 5.01, then an increase (45.3%) was observed above pH 5.01. The acidic/basic character of RhB, as an aromatic amino acid, is highly dependent upon changes in the pH of solution. In acidic pH (<4.2), the amine function of RhB is transformed to tertiary ammonium cation, whereas carboxylic group remains neutral. However, at higher pH (>4.2), RhB acquires a net negative charge. At lower pH (2.01), the adsorption of RhB was found to be the highest (51.09%) despite the fact that at this pH both resin and RhB acquired positive charges. This observation indicated that adsorption might not be governed by electrostatic interaction between adsorbent and adsorbate. Moreover, RhB molecules at pH<4.0 exist in cationic and monomeric forms whereas at solution pH >4.0 these molecules are in zwitterionic form. Electrostatic interaction between the xanthene and carboxyl group of monomer leads to the formation of dimers (bigger molecular form). Hence, smaller monomeric RhB may diffuse into the pores of the resin more easily than the dimer form [M. R. R. Koob, M. K. Dahri, L. B. L. Lim, The removal of rhodamine B dye from aqueous solution using *Casuarina equisetifolia* needles as adsorbent, Cogent Environ. Sci. 2 (2016) 1140553, incorporated herein by reference in its entirety]. Likewise, at pH 5.01, RhB is present in both positively charged (15%) and zwitterionic (82%) forms [M. C. Bruzzoniti, M. Appendini, B. Onida, M. Castiglioni, M. Del Bubba, L. Vanzetti, P. Jana, G. D. Soraru, L. Rivoira, Regenerable, innovative porous silicon-based polymer-derived ceramics for removal of methylene blue and rhodamine B from textile and environmental waters, Environ. Sci. Pollut. Res. 25 (2018) 10619-10629, incorporated herein by reference in its entirety]. Thus, the relatively higher adsorption at this pH may be commanded by electrostatic forces that might have developed between negative charges of carboxyl group in RhB with the positive charges in the resin (pHpzc=6.8) as well as through hydrogen bonding between the adsorbent and adsorbate. On the other hand, CR is an acidic dye containing —NH$_2$ and —SO$_3^-$ (the isoelectric point is near pH 3). At lower pH levels (1-3), CR becomes cationic and results in ammonium rich and azonium rich tautomeric forms, exhibiting A$_{max}$ of 576 nm. π-π* transition of the azo group leads to CR color change from red to blue in such cases [H. N. Tran, S.-J. You, A. Hosseini-Bandegharaei, H.-P. Chao, Mistakes and inconsistencies regarding adsorption of contaminants from aqueous solutions: a critical review, Water Res. 120 (2017) 88-116, incorporated herein by reference in its entirety]. However, at higher pH (pH 12 to 14), stability of choromophoric group is lost and CR changes to a new red color, which is different from the original red color [Y. Wu, H. Luo, H. Wang, Efficient removal of Congo red from aqueous solutions by surfactant-modified hydroxo aluminum/graphene composites, Sep. Sci. Technol. 49 (2014) 2700-2710, incorporated herein by reference in its entirety]. At pH 4.5-5.5, protonation of amino function of CR takes place. In general, percent removal of an anionic dye is increased at lower pH solution due to the enhanced electrostatic attraction between the positively charged resin (pHpzc=6.8) and the anionic dye [M. A. M. Salleh, D. K. Mahmoud, W. A. W. A. Karim, A. Idris, Cationic and anionic dye adsorption by agricultural solid wastes: a comprehensive review, Desalination. 280 (2011) 1-13, incorporated herein by reference in its entirety]. However, several studies have indicated that the relationship between the adsorption of CR with changes in pH of solution was inconclusive; sometimes the results were contradictory with one another. For instance, Abolghasemi et al. have reported that the maximum adsorption of CR on tea waste was found at pH 10 [M. Foroughi-Dahr, H. Abolghasemi, M. Esmaili, A. Shojamoradi, H. Fatoorehchi, Adsorption characteristics of Congo Red from aqueous solution onto tea waste, Chem. Eng. Commun. 202 (2015) 181-193, incorporated herein by reference in its entirety]. However, the decreased adsorption (10.0%) at lower pH (2-3) could be attributed to the electrostatic repulsion between the positively charged surface of polyamine based adsorbent and cationic CR (FIG. 7A). Similarly, the enhanced adsorption (92.03%) at higher pH (8.14) suggested that the adsorption was governed by non-electrostatic forces, presumably by hydrogen-bonding (FIG. 7B).

Figure 21:
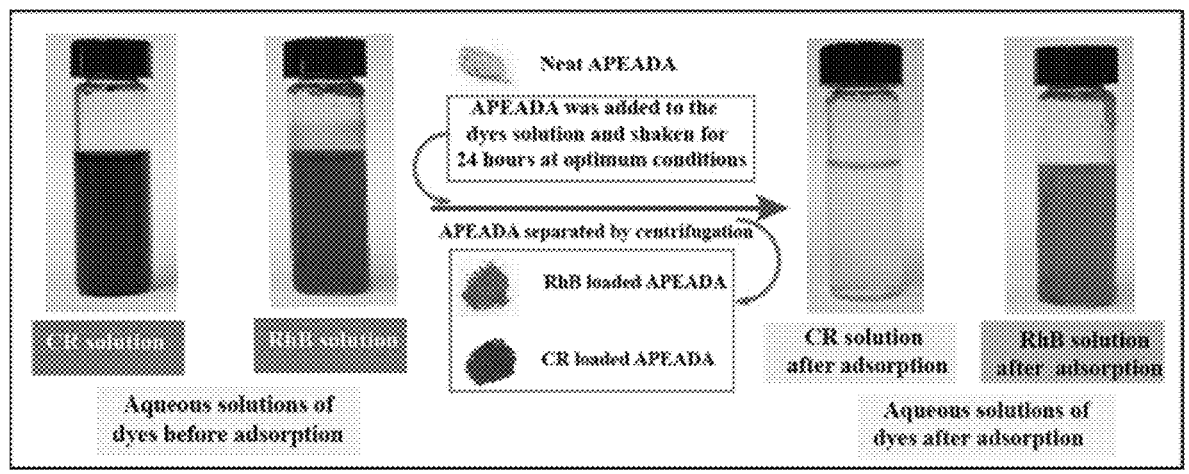
FIG. 21 is a scheme illustrating dye solutions before and after adsorption by crosslinked polymer APEADA.

Finally, optimized values of pH 5.01 and pH 8.14 were selected for RHB and CR, respectively, for further studies. FIG. 21 shows a comparison of the dyes solutions before and after adsorption by resin.

Example 11

Effect of Dosage on Adsorption

Figure 8:
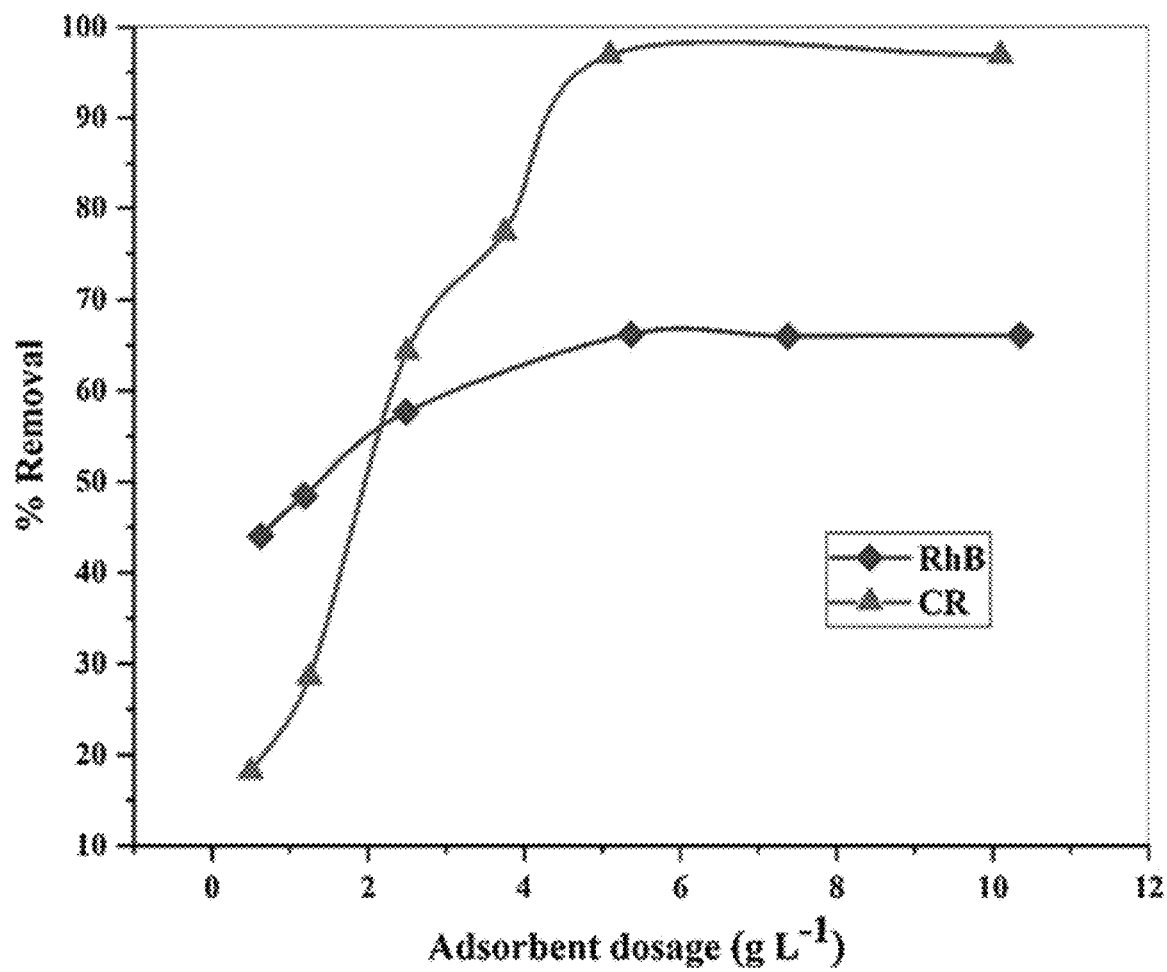
FIG. 8 is a graph illustrating the relationship between adsorbent dosage of crosslinked polymer APEADA and its adsorption capacity of CR and RhB, respectively.

The effect of adsorbent dosage on adsorption of CR and RhB was determined by varying resin dose from 0.20 g L$^{-1}$ to 10.00 g L$^{-1}$ at pH values of 8.14 and 5.01, respectively. An aliquot of 20.0 mL of dye having 50.0 mg L$^{-1}$ (RhB) and 100 mg L$^{-1}$ (CR) of initial concentration was stirred with resin at 150 rpm. As evident from FIG. 8, the percent removal of both RhB and CR remarkably augmented with a rise in the adsorbent dosage. The adsorption of RhB witnessed a relatively gradual increase from 42% to 66% while in the case of CR, a significant increase in the adsorption from 18.2% to 96.9% was observed (FIG. 8). The enormous increase in percent removal of CR with the increase in resin dosage was due to increase in surface availability of adsorbent and increase in the number of adsorption sites [Z. Zhang, L. Zhu, W. Lu, X. Li, X. Sun, R. Lii, H. Ding, Evaluation of functional group content of N-methylimidazolium anion exchange resin on the adsorption of methyl orange and alizarin red, Chem. Eng. Res. Des. 111 (2016) 161-168, incorporated herein by reference in its entirety].

On the other hand, the percentage removal of RhB did not experience appreciable increase and stayed nearly constant upon increasing adsorbent dose greater than 5.4 g L$^{-1}$. This may be linked to increased collision rate between the adsorbent particles at higher doses that led to aggregation or overlapping of active adsorption sites which in turn resulted in the unavailability of vacant adsorption sites [M. R. R. Koob, M. K. Dahri, L. B. L. Lim, The removal of rhodamine B dye from aqueous solution using *Casuarina equisetifolia* needles as adsorbent, Cogent Environ. Sci. 2 (2016) 1140553, incorporated herein by reference in its entirety].

Example 12

Effect of Contact Time on Adsorption

Figure 22:
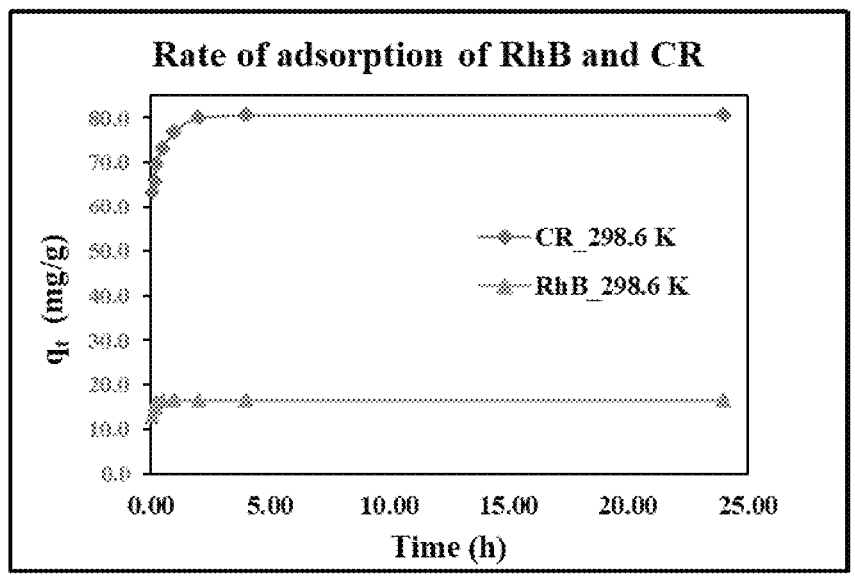
FIG. 22 is a plot illustrating the relationship between contact time and adsorption capacity of CR and RhB, respectively, by crosslinked polymer APEADA.

The influence of time on CR and RhB adsorption onto resin was studied by carrying adsorption experiments for a period of up to 24 h. FIG. 22 demonstrates the effect of contact time on the resin's adsorption capacities of CR and RhB. In the initial adsorption stage (i.e., the first 2 h), adsorption capacities of both CR and RhB exhibited fast increase of 79.97 mg g$^{-1}$ and 16.54 mg g$^{-1}$, respectively. Moreover, the adsorption capacity of CR slightly increased to 80.50 mg g$^{-1}$ with increase of contact time to 4 h, whereas adsorption of RhB remained constant with further increase in contact time (FIG. 22). The rapid increase in the adsorption in the initial stage was linked to the availability of adsorption sites, which were progressively occupied with time, leading to the equilibrium state of adsorption.

Example 13

Adsorption Equilibrium Isotherm

The adsorption process can be understood by applying various models of adsorption isotherms. The adsorption isotherms illustrate how an adsorbent interacts with an adsorbate [M. A. M. Salleh, D. K. Mahmoud, W. A. W. A. Karim, A. Idris, Cationic and anionic dye adsorption by agricultural solid wastes: a comprehensive review, Desalination. 280 (2011) 1-13, incorporated herein by reference in its entirety]. The phase of adsorbent surface may involve monolayer or multilayers. The Langmuir isotherm considers that adsorbent has a definite number of active sites and the solute molecules get adsorbed onto the adsorbent surface as a monolayer. Examples of this type of isotherm are given in FIGS. 9A-B. The Langmuir isotherm is expressed by the following Eq. (3)

$$q_e = \frac{Q_m K_a C_e}{1 + K_a C_e} \quad (3)$$

Here in Eq. (3), $Q_m$ (mg g$^{-1}$) represents the maximum adsorption capacity of the resin that is needed to build a monolayer of the adsorbate per unit mass of the adsorbent, whereas $q_e$ (mg g$^{-1}$) and $C_e$ (mg L$^{-1}$) are the adsorption capacity and dye concentration, respectively, at equilibrium. The $K_a$ denotes Langmuir constant (L mg$^{-1}$) at equilibrium which actually represents the energy for adsorption.

The Freundlich model is valid for multilayer adsorption of the solute molecules onto the heterogeneous surface with a non-uniform distribution of heat of adsorption. Freundlich isotherm is given by the following Eq. (4).

$$q_e = K_f C_e^{1/n} \quad (4)$$

The constant $K_f$ is an approximate indicator of adsorption capacity, while 1/n is a function of strength of adsorption, $C_e$ (mg L$^{-1}$) is adsorbate concentration and $q_e$ (mg g$^{-1}$) is the amount of dye adsorbed at equilibrium [A. T. Saleh, A. M. Muhanunad, S. A. Ali, Synthesis of hydrophobic cross-linked polyzwitterionic acid for simultaneous sorption of Eriochrome black T and chro-mium ions from binary hazardous waters, J. Colloid Interface Sci. 468 (2016) 324-333; and O. Hamdaoui, E. Naffrechoux, Modeling of adsorption isotherms of phenol and chlorophenols onto granular activated carbon Part I. Two-parameter models and equations allowing determination of thermodynamic parameters, J. Hazard. Mater. 147 (2007) 381-394, each incorporated herein by reference in their entirety]. In addition, 1/n being above one indicates a cooperative adsorption, and the greater the value of $K_f$ the higher adsorption capacity [V. Vimonses, S. Lei, B. Jin, C. W. K. Chow, C. Saint, Kinetic study and equilibrium isotherm analysis of Congo Red adsorption by clay materials, Chem. Eng. J. 148 (2009) 354-364; and M. A. M. Salleh, D. K. Mahmoud, W. A. W. A. Karim, A. Idris, Cationic and anionic dye adsorption by agricultural solid wastes: a comprehensive review, Desalination. 280 (2011) 1-13, each incorporated herein by reference in entirety]. Freundlich constants $K_f$ for RhB and CR were 1.627 and 49.06, and rates of adsorption, n, were calculated from the plots and determined to be 1.516 and 2.545, respectively at 298.6 K (Table 2).

TABLE 2

Important parameters of various isotherms at different temperatures for adsorption of RhB and CR onto APEADA resin

| Dye | Langmuir | | | | | | Freundlich | | | |
| --- | --- | --- | --- | --- | --- | --- | --- | --- | --- | --- |
| | $Q_{max}$ mg g$^{-1}$ | $K_a$ L mg$^{-1}$ | Adj. $R^2$ | $R^2$ (COD) | Red. Chi Sq. | n | $K_F$ (mg g$^{-1}$) (L mg$^{-1}$)$^{1/n}$ | Adj. $R^2$ | $R^2$ (COD) | Red. Chi Sq. |
| | | | | | 298.6 K | | | | | |
| RhB | 17.12 | 0.0847 | 0.9899 | 0.9924 | 0.1315 | 1.516 | 1.627 | 0.9709 | 0.9782 | 0.3791 |
| CR | 252.1 | 0.1013 | 0.9871 | 0.9903 | 43.54 | 2.545 | 49.06 | 0.966 | 0.9745 | 90.87 |
| | | | | | 308.6 K | | | | | |
| RhB | 18.98 | 0.0766 | 0.9824 | 0.9868 | 0.2602 | 1.4783 | 1.6427 | 0.9608 | 0.9706 | 0.5802 |
| CR | 262.2 | 0.0896 | 0.9853 | 0.9889 | 39.07 | 2.4653 | 47.18 | 0.9537 | 0.9654 | 122.3 |

TABLE 2-continued

Important parameters of various isotherms at different temperatures
for adsorption of RhB and CR onto APEADA resin 318.6 K

| | | | | | | | | | | |
|---|---|---|---|---|---|---|---|---|---|---|
| RhB | 23.28 | 0.0606 | 0.9884 | 0.9913 | 0.2007 | 1.3954 | 1.6116 | 0.9765 | 0.9825 | 0.407 |
| CR | 280 | 0.0787 | 0.987 | 0.9903 | 34.99 | 2.3261 | 43.84 | 0.9492 | 0.9621 | 136.9 |

328.6 K

| | | | | | | | | | | |
|---|---|---|---|---|---|---|---|---|---|---|
| RhB | 24.95 | 0.0519 | 0.9948 | 0.9961 | 0.0864 | 1.3692 | 1.5215 | 0.9919 | 0.994 | 0.132 |
| CR | 273 | 0.0744 | 0.9837 | 0.9878 | 43.65 | 2.3621 | 44.48 | 0.9499 | 0.9625 | 134.7 |

| | Dubinin-Radushkevich | | | | | Temkin | | | | |
|---|---|---|---|---|---|---|---|---|---|---|
| | $q_s$ (mol·g$^{-1}$) | $K_{DR}$ (mol$^2$ k$^{-1}$J$^2$) | Adj. $R^2$ | $R^2$ (COD) | Red. Chi Sq. | $A_T$ (L g$^{-1}$) | $b_T$ (J mol$^{-1}$) | Adj. $R^2$ | $R^2$ (COD) | Red. Chi Sq. |

298.6 K

| | | | | | | | | | | |
|---|---|---|---|---|---|---|---|---|---|---|
| RhB | 52.97 | 1.534 | 0.9536 | 0.9652 | 0.6044 | 1.886 | 0.3926 | 0.8722 | 0.9041 | 1.666 |
| CR | 2081 | 2.254 | 0.9563 | 0.9834 | 17.3 | 0.9141 | 0.0176 | 0.9919 | 0.9939 | 21.59 |

308.6 K

| | | | | | | | | | | |
|---|---|---|---|---|---|---|---|---|---|---|
| RhB | 65.31 | 1.661 | 0.9617 | 0.9713 | 0.5671 | 1.661 | 0.3552 | 0.8666 | 0.8999 | 1.974 |
| CR | 3050 | 2.599 | 0.9707 | 0.978 | 77.74 | 0.7694 | 0.0165 | 0.9869 | 0.9902 | 34.79 |

318.6 K

| | | | | | | | | | | |
|---|---|---|---|---|---|---|---|---|---|---|
| RhB | 93.11 | 1.897 | 0.9506 | 0.963 | 0.8563 | 1.668 | 0.3342 | 0.8447 | 0.8834 | 2.692 |
| CR | 5491 | 3.132 | 0.9858 | 0.9894 | 38.19 | 0.6059 | 0.0151 | 0.9871 | 0.9885 | 41.19 |

328.6 K

| | | | | | | | | | | |
|---|---|---|---|---|---|---|---|---|---|---|
| RhB | 97.26 | 1.956 | 0.9303 | 0.9477 | 1.1457 | 1.668 | 0.3433 | 0.8282 | 0.8712 | 2.824 |
| CR | 4475 | 2.95 | 0.9778 | 0.9833 | 59.83 | 0.6516 | 0.0156 | 0.9847 | 0.9903 | 34.9 |

The high values of $K_f$ and the values of n of greater than 1 for both of the dyes indicated a favorable nature of adsorption. Another isotherm, namely Temkin model describes the possible effects that arise because of the interaction of the dye molecules with the resin [M. I. Temkin, V. Pyzhev, Kinetic of Ammonia synthesis on promoted Iron catalyst, Acta Phys. Chem, URSS 12 (I 940) 327-356, incorporated herein by reference in its entirety]. This model proposes that as the resin surface gets covered with dye molecules (e.g., CR and RhB), the heat of adsorption (as a function of temperature) of the molecules decreases linearly rather than logarithmically disregarding the effect of the extremely small and large concertation values. The reason for this is that the interaction between dye molecules (CR and RhB) and resin [C. Aharoni, M. Ungarish, Kinetics of activated chemisorption. Part 2.-theoretical models, J. Chem. Soc. Faraday Trans. 1 Phys. Chem. Condens. Phases. 73 (I 977) 456, incorporated herein by reference in its entirety]. Furthermore, this isotherm assumes the uniform distribution of adsorbate. The non-linear form of Temkin equation is given as Eq. (5).

$$q_e = \frac{RT}{b_T} \ln A_T C_e \tag{5}$$

In this equation, R is the molar gas constant (8.314 J mol$^{-1}$K$^{-1}$), is temperature in Kelvin (K), $A_T$ is the equilibrium binding constant (L g$^{-1}$) corresponding to maximum binding energy, and $b_T$ represents the heat of adsorption (J mol$^{-1}$).

The physical or chemical nature of adsorption process was determined by applying Dubinin-Radushkevich (D-R) Isotherm Model. The D-R model is given by Eq. (6).

$$q_e = (q_s) \exp(-K_{DR} \varepsilon^2) \tag{6}$$

where $q_e$ (mg g$^{-1}$) is the amount of adsorbate adsorbed per gram of the adsorbate, $q_s$ (mol g$^{-1}$) maximum adsorption capacity, is helpful in estimating the porosity of the resin and the apparent energy of adsorption E [S. A. Ali, I. W. Kazi, N. Ullah, New chelating ion-exchange resin synthesized via the cyclopolymerization protocol and its uptake performance for metal ion removal, Ind. Eng. Chem. Res. 54 (2015) 9689-9698, incorporated herein by reference in its entirety], $C_e$ (g L$^{-1}$) is the equilibrium concentration of dyes, R is molar gas constant, and K is absolute temperature in Kelvin. $K_{DR}$ (mol$^2$K$^{-1}$J$^{-2}$) is Dubinin-Radushkevich isotherm constant related to the free energy of sorption per mole of the sorbate, $\varepsilon$ is Polanyi potential given by Eq. (7)

$$\varepsilon = RT \ln\left(1 + \frac{1}{C_e}\right) \tag{7}$$

These equations can be used to calculate the mean free energy of adsorption via (Eq. 8)

$$E = \frac{1}{(2B_D)^{1/2}} \tag{8}$$

Figure 9A:
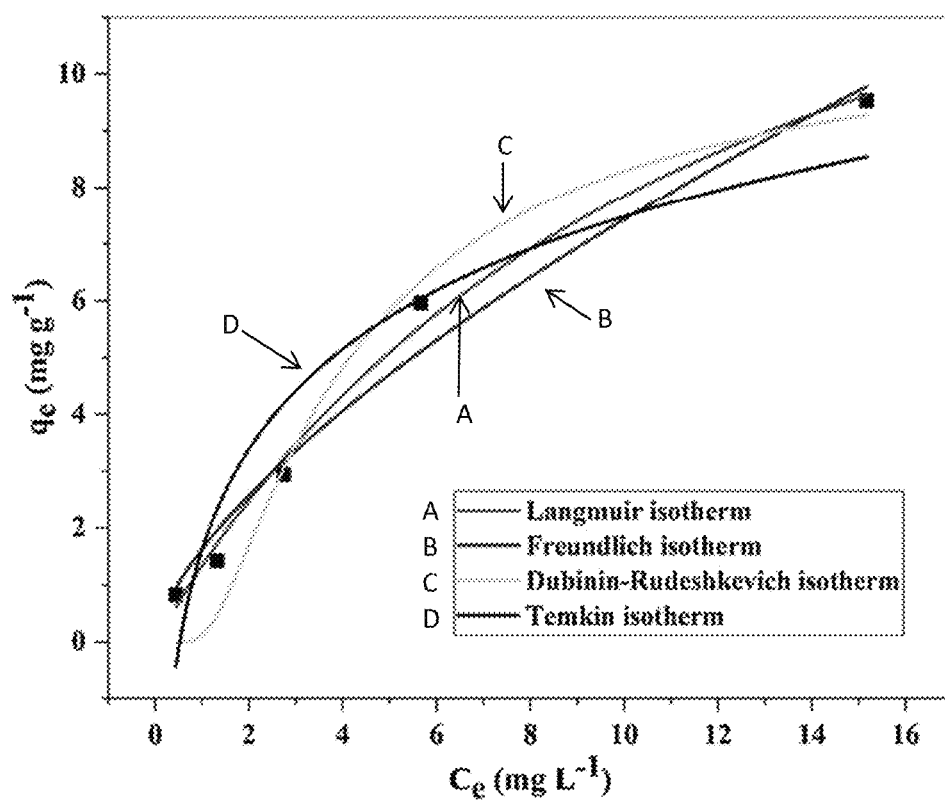
FIG. 9A is an overlay of Langmuir, Freundlich, Dubinin-Radushkevich, and Temkin adsorption isotherms for RhB removal by crosslinked polymer APEADA.
Figure 9B:
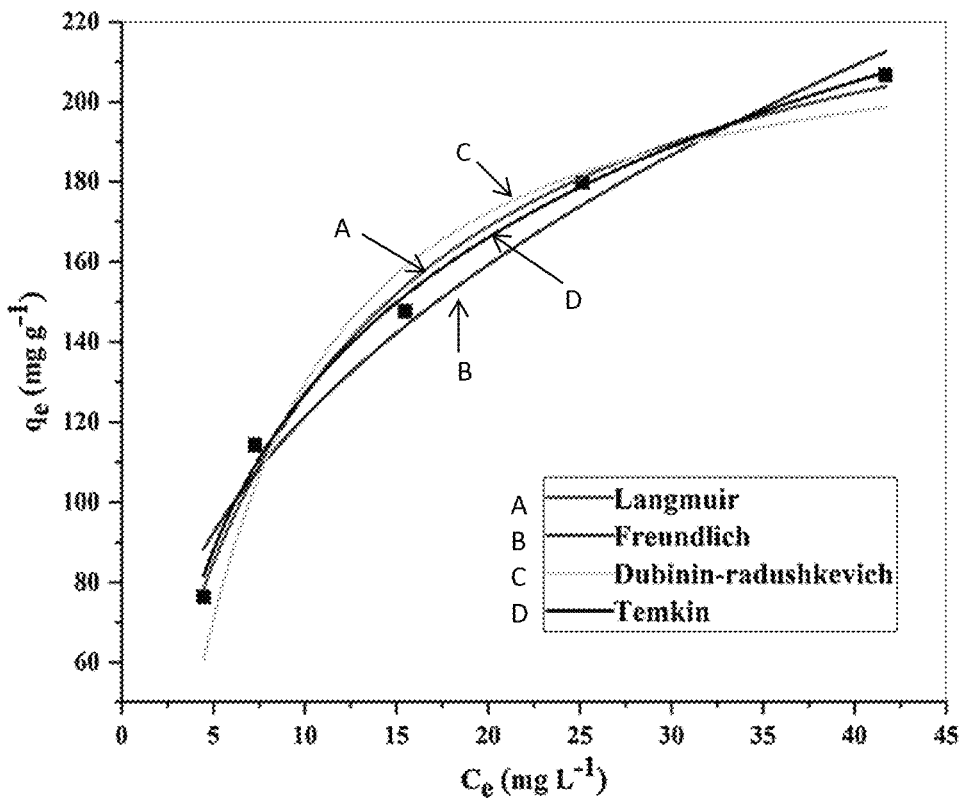
FIG. 9B is an overlay of Langmuir, Freundlich, Dubinin-Radushkevich, and Temkin adsorption isotherms for CR removal by crosslinked polymer APEADA.

All of the aforementioned models have been established by non-linear curve fitting method (FIGS. 9A and 9B for RhB and CR, respectively). Four adsorption models were compared and optimized for the coefficient of determination (COD) (Eq. 9) between the isotherms and experimental data, using non-linear curve fitting option in OriginPro 2018.

$$r^2 = \frac{\Sigma(q_m - \overline{q}_e)^2}{\Sigma(q_m - \overline{q}_e)^2 + \Sigma(q_m - q_e)^2} \quad (9)$$

Figure 23:
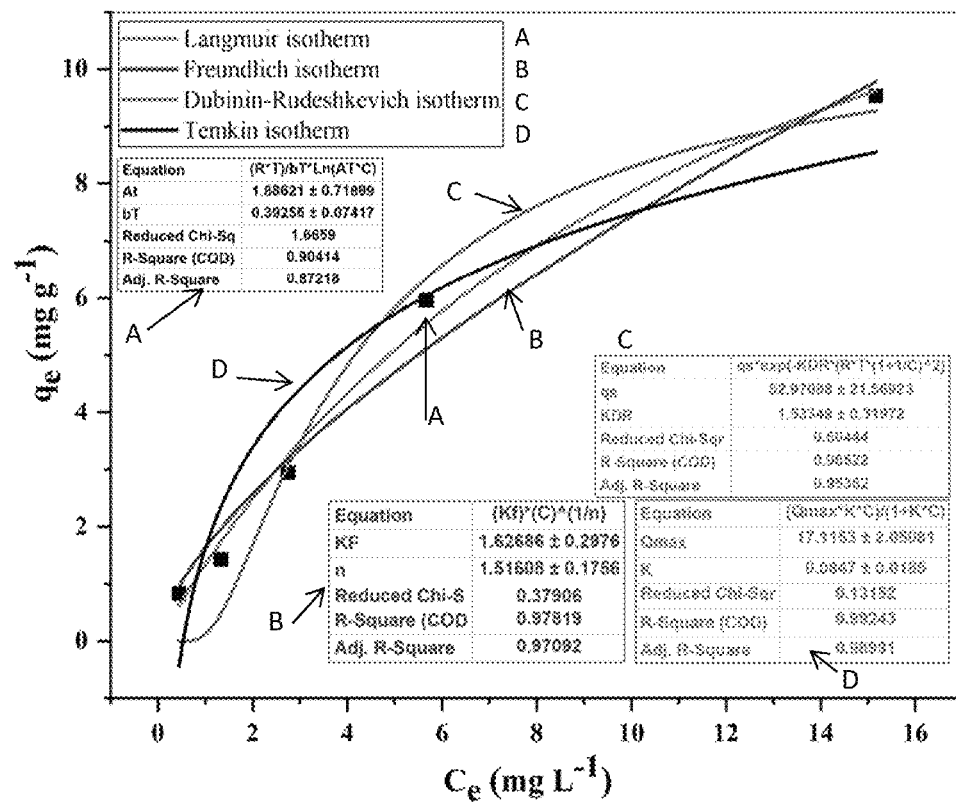
FIG. 23 is an overlay of Langmuir, Freundlich, Dubinin-Radushkevich, and Temkin adsorption isotherms for RhB adsorption by crosslinked polymer APEADA.
Figure 24:
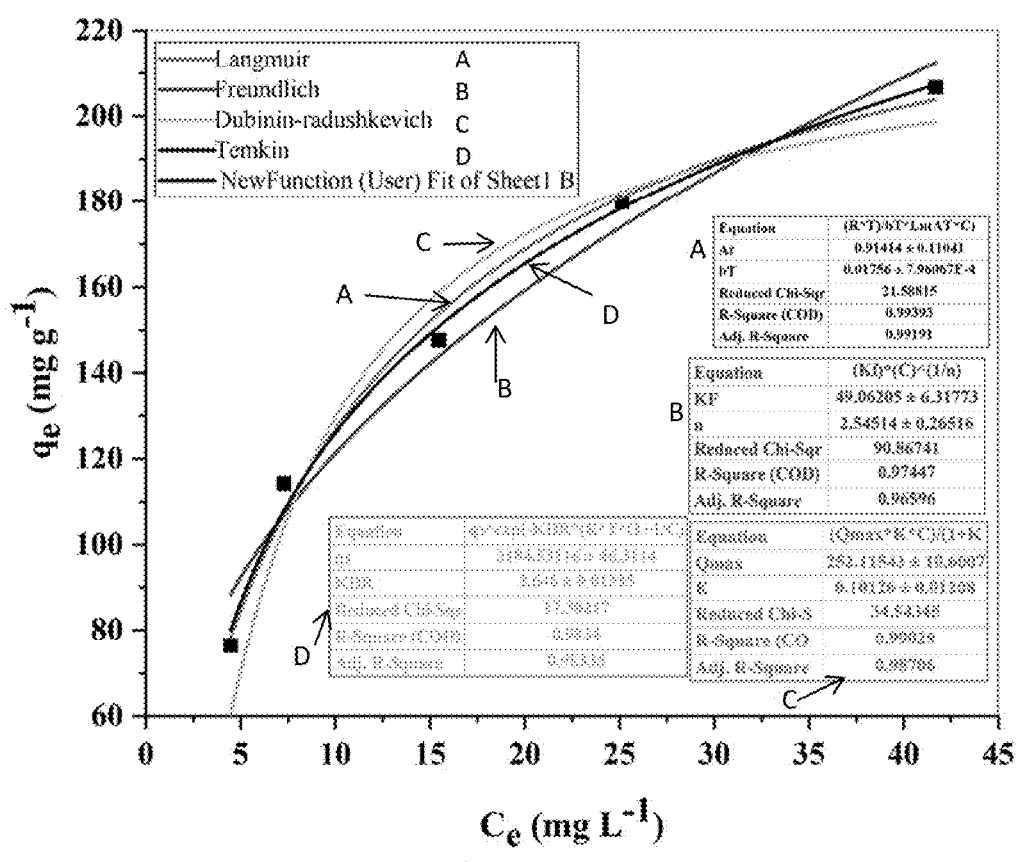
FIG. 24 is an overlay of Langmuir, Freundlich, Dubinin-Radushkevich, and Temkin adsorption isotherms for CR adsorption by crosslinked polymer APEADA.
Figure 25A:
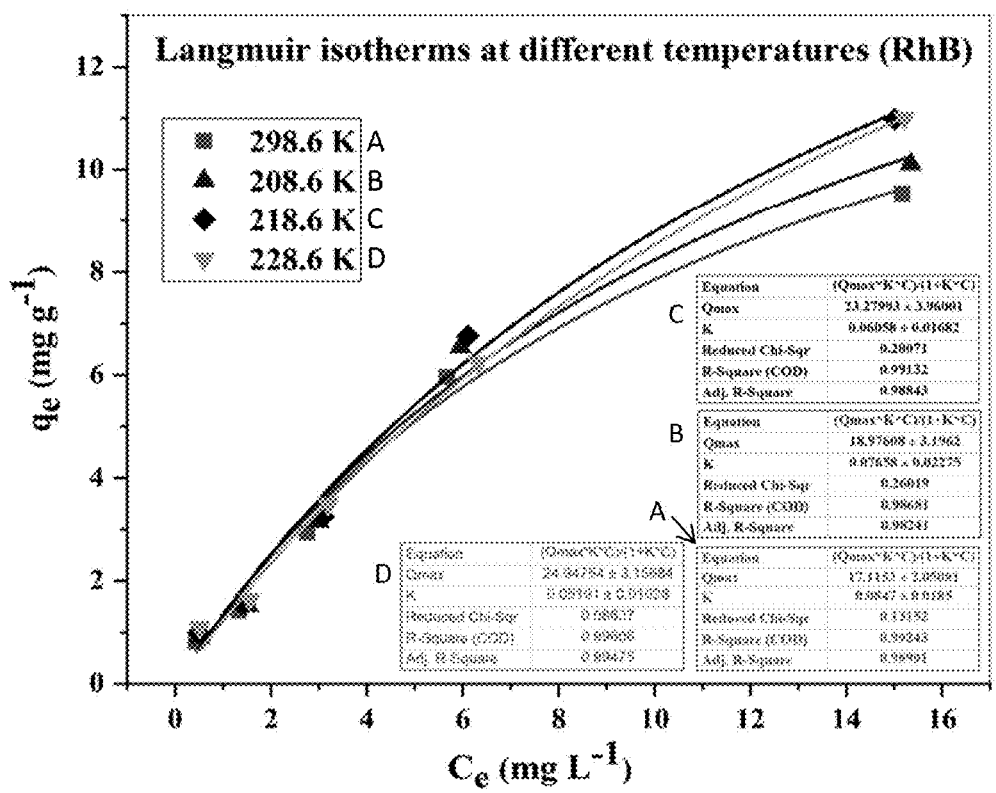
FIG. 25A is an overlay of Langmuir adsorption isotherms for RhB adsorption by crosslinked polymer APEADA at various temperatures.
Figure 25B:
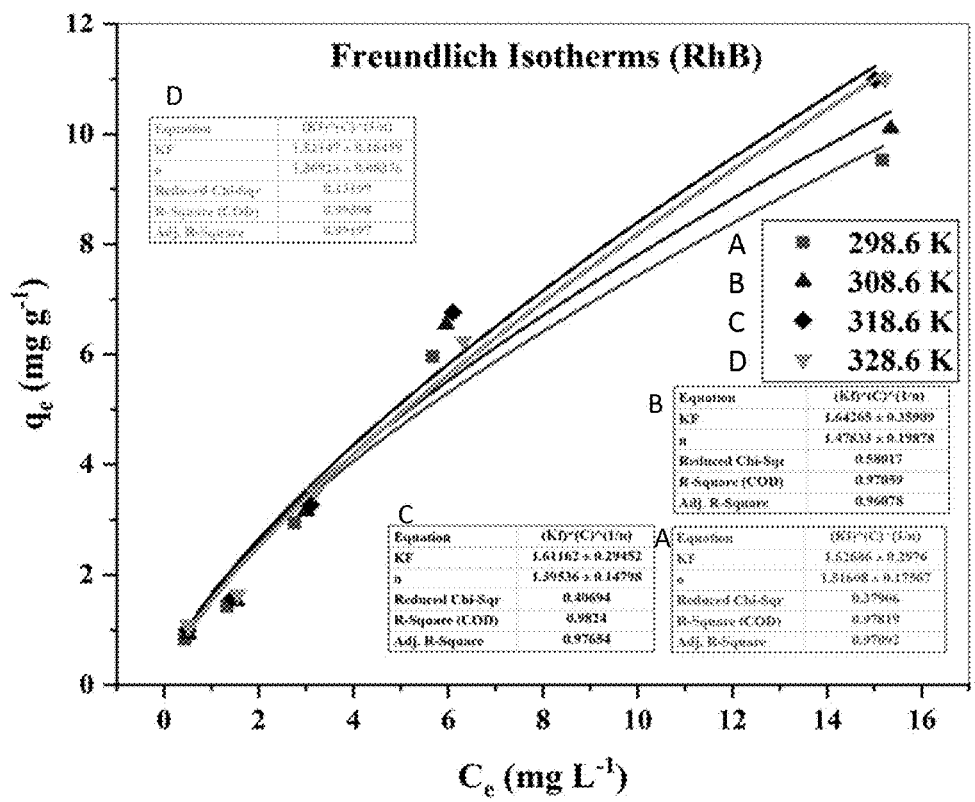
FIG. 25B is an overlay of Freundlich adsorption isotherms for RhB adsorption by crosslinked polymer APEADA at various temperatures.
Figure 26A:
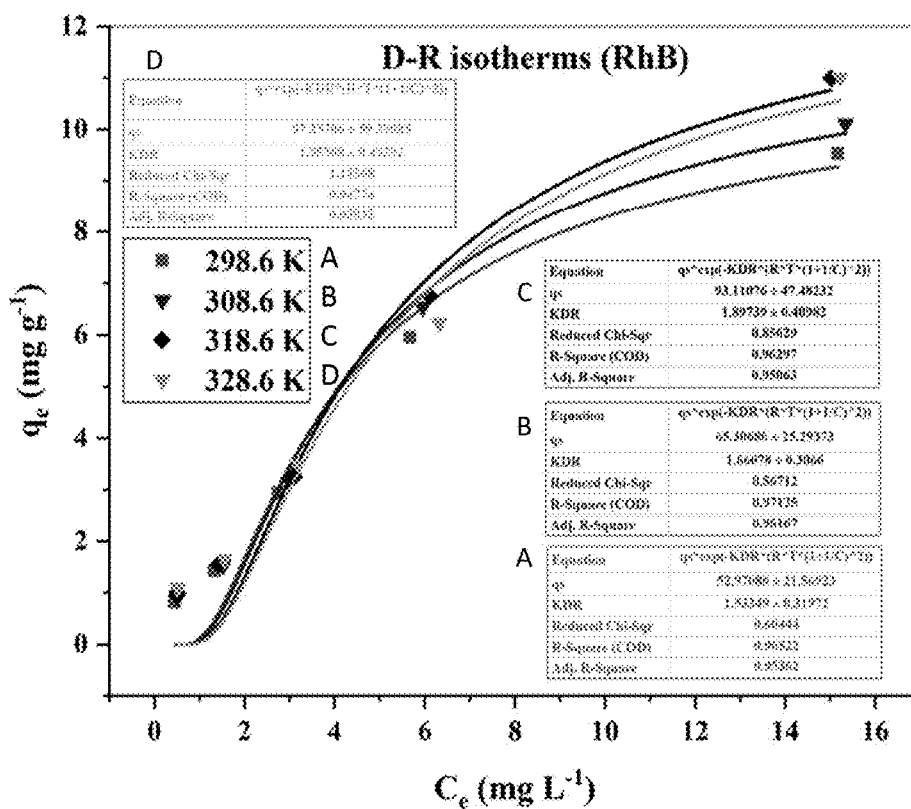
FIG. 26A is an overlay of Dubinin-Radushkevich adsorption isotherms for RhB adsorption by crosslinked polymer APEADA at various temperatures.
Figure 26B:
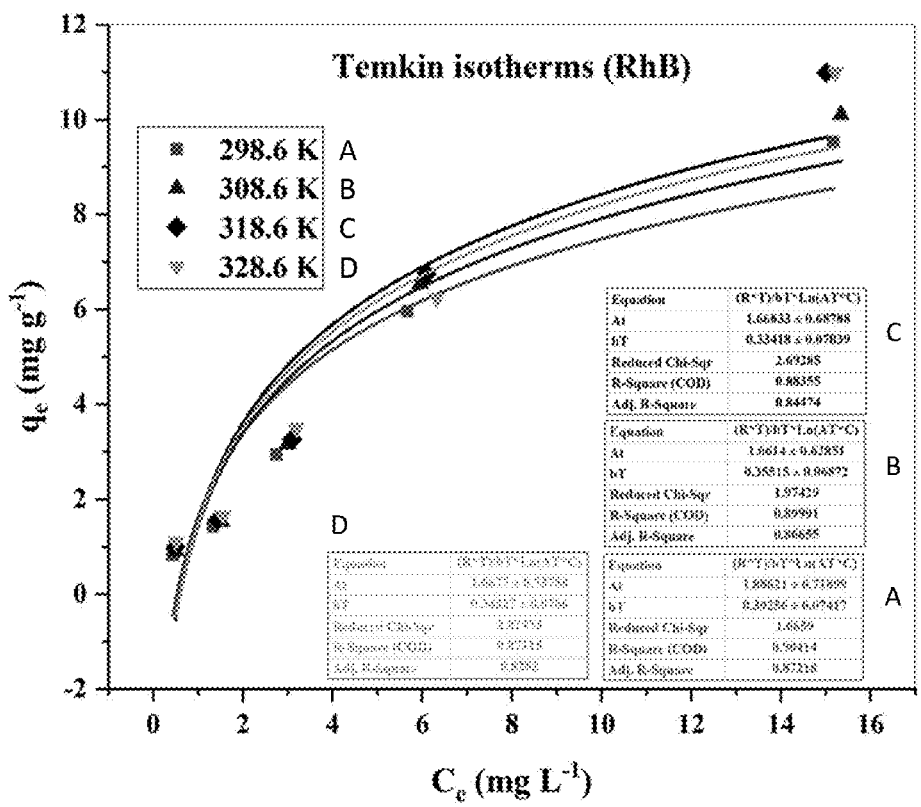
FIG. 26B is an overlay of Temkin adsorption isotherms for RhB adsorption by crosslinked polymer APEADA at various temperatures.
Figure 27A:
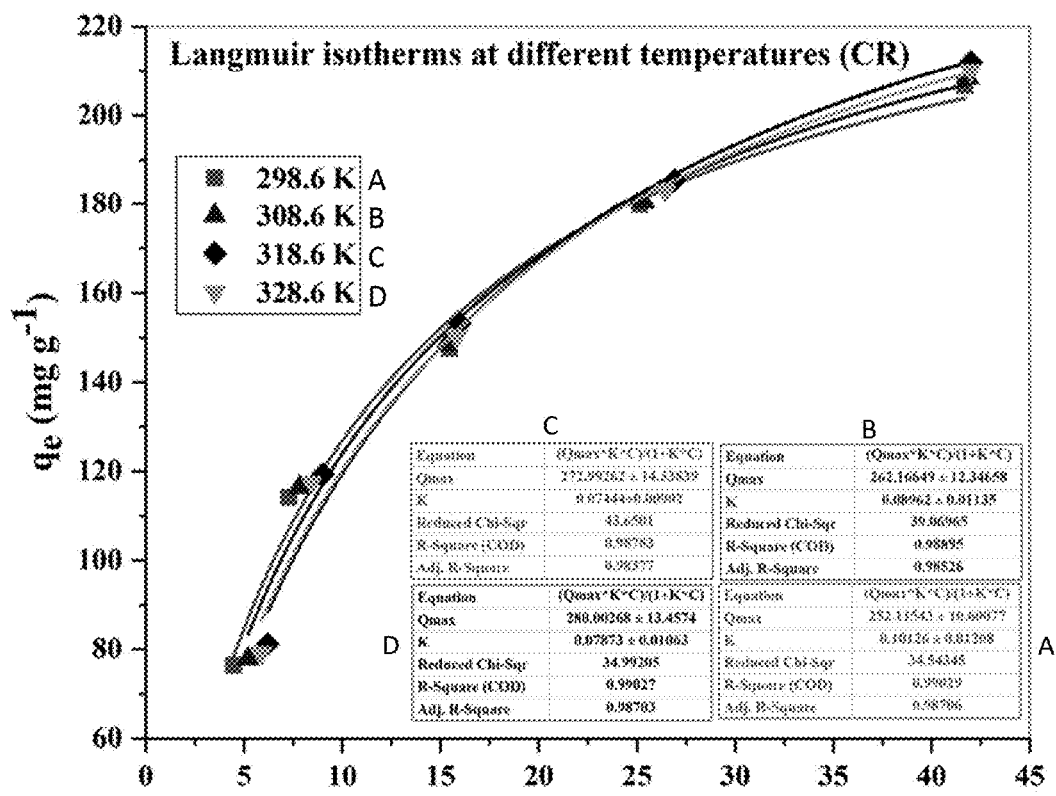
FIG. 27A is an overlay of Langmuir adsorption isotherms for CR adsorption by crosslinked polymer APEADA at various temperatures.
Figure 27B:
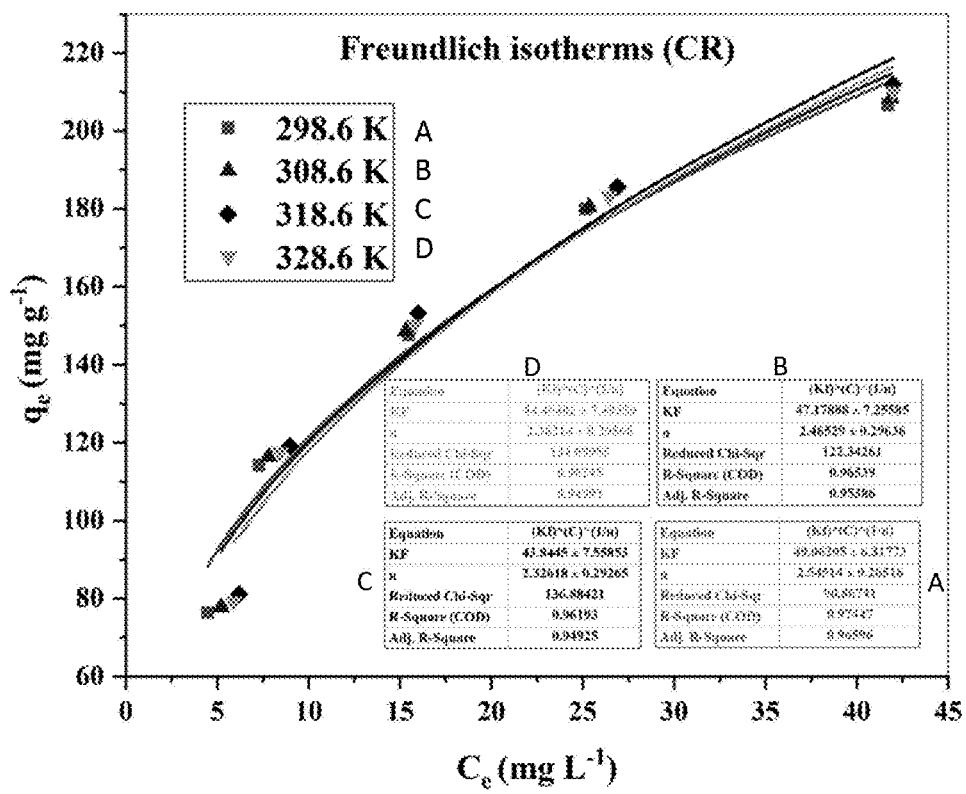
FIG. 27B is an overlay of Freundlich adsorption isotherms for CR adsorption by crosslinked polymer APEADA at various temperatures.
Figure 28A:
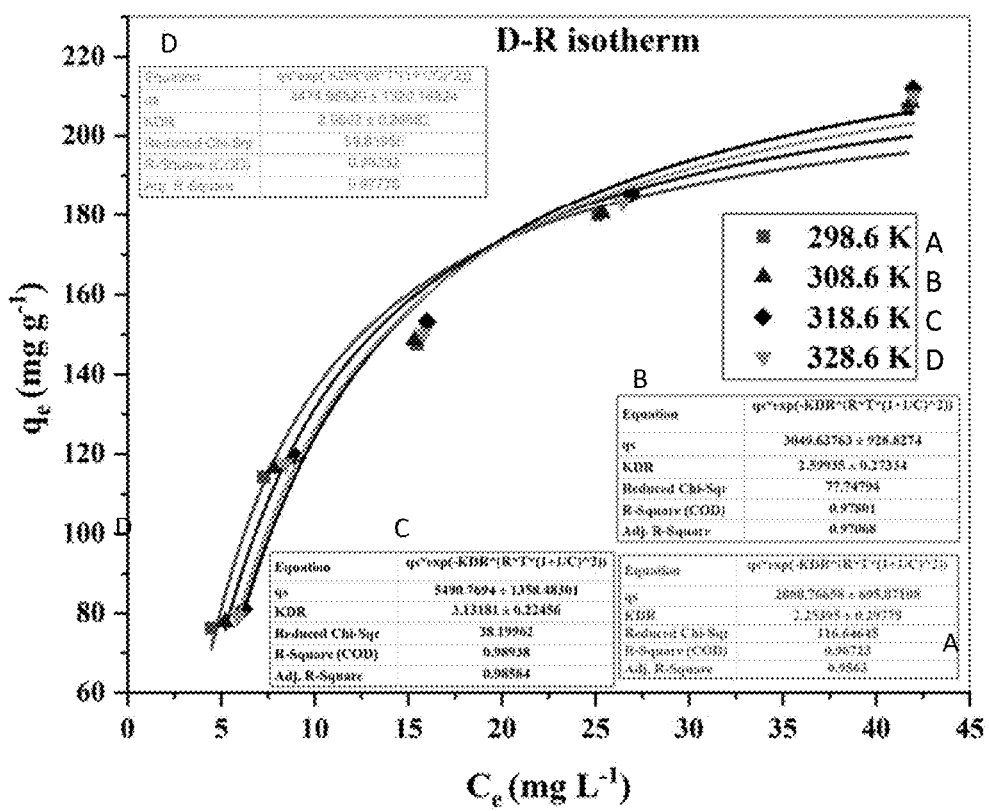
FIG. 28A is an overlay of Dubinin-Radushkevich adsorption isotherms for CR adsorption by crosslinked polymer APEADA at various temperatures.
Figure 28B:
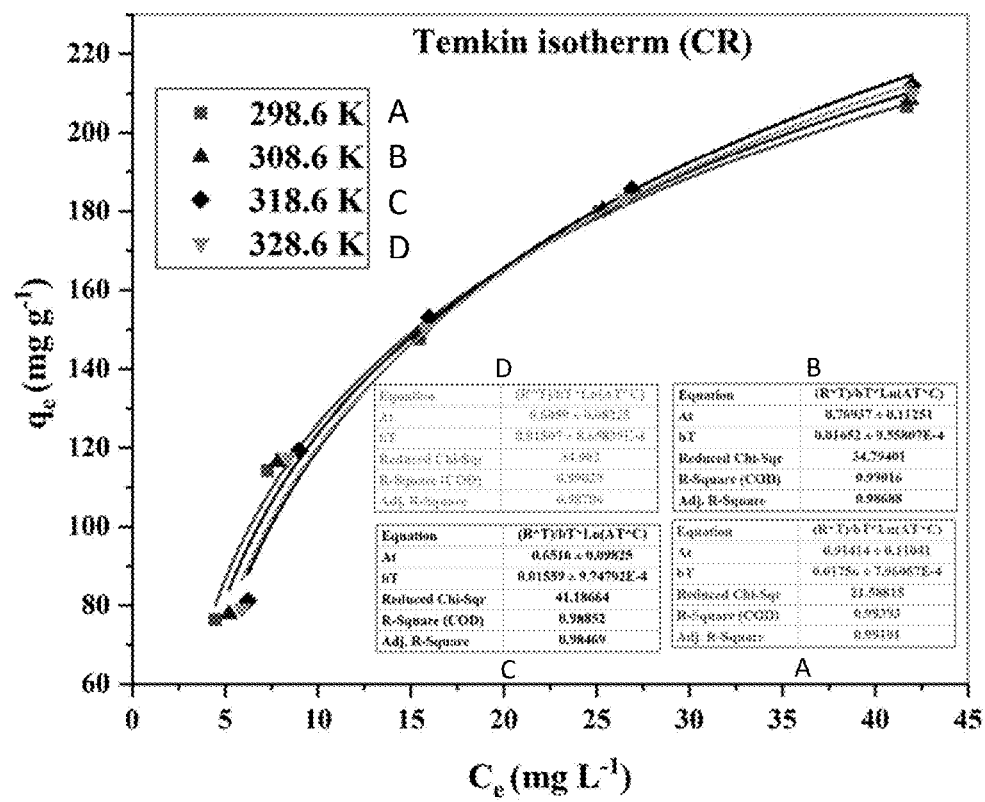
FIG. 28B is an overlay of Temkin adsorption isotherms for CR adsorption by crosslinked polymer APEADA at various temperatures.

In addition, other statistical analysis method such as chi-square was used to determine the best fitting model of the four isotherms employed. The detailed figures showing all four isotherms for RhB and CR along with their parameters, the COD and reduced chi-square values are shown in FIGS. 23 and 24, respectively. The graphs for the adsorption of RhB and CR onto resin were plotted as dyes adsorbed per unit mass of the resin, $q_e$, against the concentration of the dye remaining in the solution, $C_e$. Table 2 shows a comparison of adjusted $R^2$ values for the adsorption of RhB and CR by the resin. The data revealed that the isotherms fit for adsorption of RhB in the following order, Langmuir>Freundlich>Dubinin-Radushkevich>Temkin. Likewise, in case of CR the order was Temkin≥Langmuir>Dubinin-Radushkevich>Freundlich. Various adsorption isotherms plotted for RhB and CR are given in FIGS. 9A and 9B whereas figures containing detailed information for each isotherm are given in FIGS. 23 and 24.

Table 2 shows values of all relevant parameters of four isotherms at four different temperatures (298.6 K, 308.6 K, 31 8.6 K, and 328.6 K) obtained by non-linear optimization using OriginPro 2018. The initially selected values of parameters were allowed to change in order to determine a converging fit of the isotherm with the experimental data (FIGS. 25A-B, 26A-B, 27A-B, 28A-B) show all the parameters along with their COD and adjusted $R^2$ for four isotherm models at temperatures ranging from K to 328.6 K). Temperature had a noticeable effect on the adsorption capacity of the resin. The maximum adsorption capacity of sorbent for RhB at 328.6 K was 24.95 mg·g$^{-1}$ and 280.0 mg·g$^{-1}$ for CR at 318.6 K.

Example 14

Thermodynamic Studies

Figure 10A:
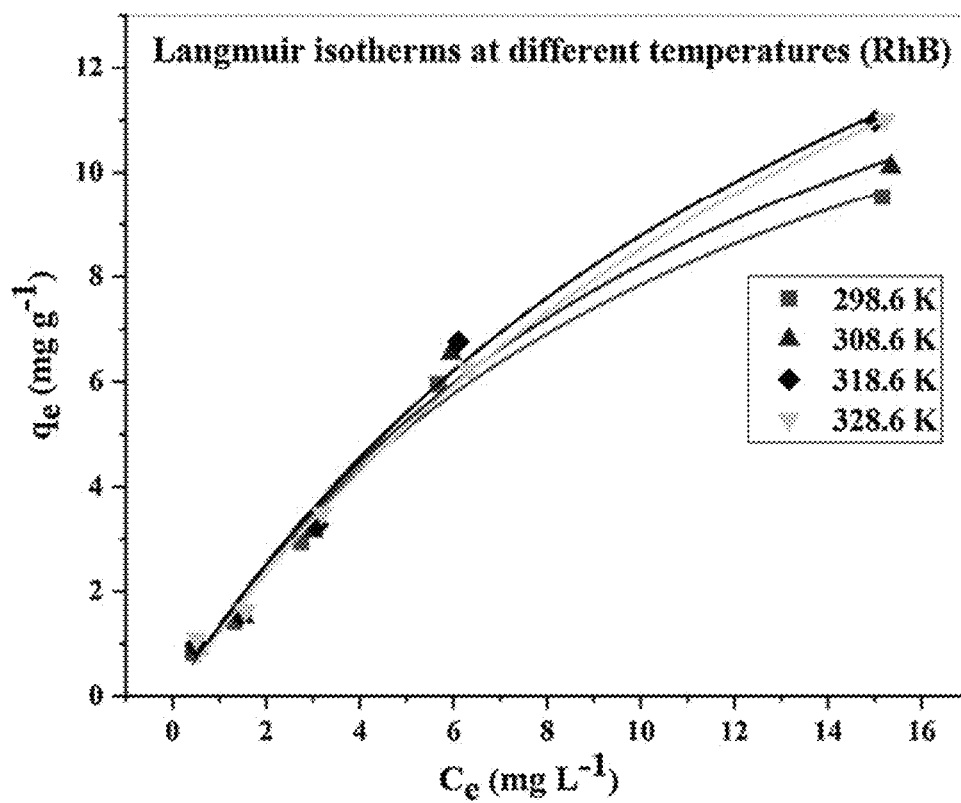
FIG. 10A is an overlay of Langmuir adsorption isotherm for RhB removal by crosslinked polymer APEADA at temperatures of 298.6 K, 308.6 K, 318.6 K, and 328.6 K.
Figure 10B:
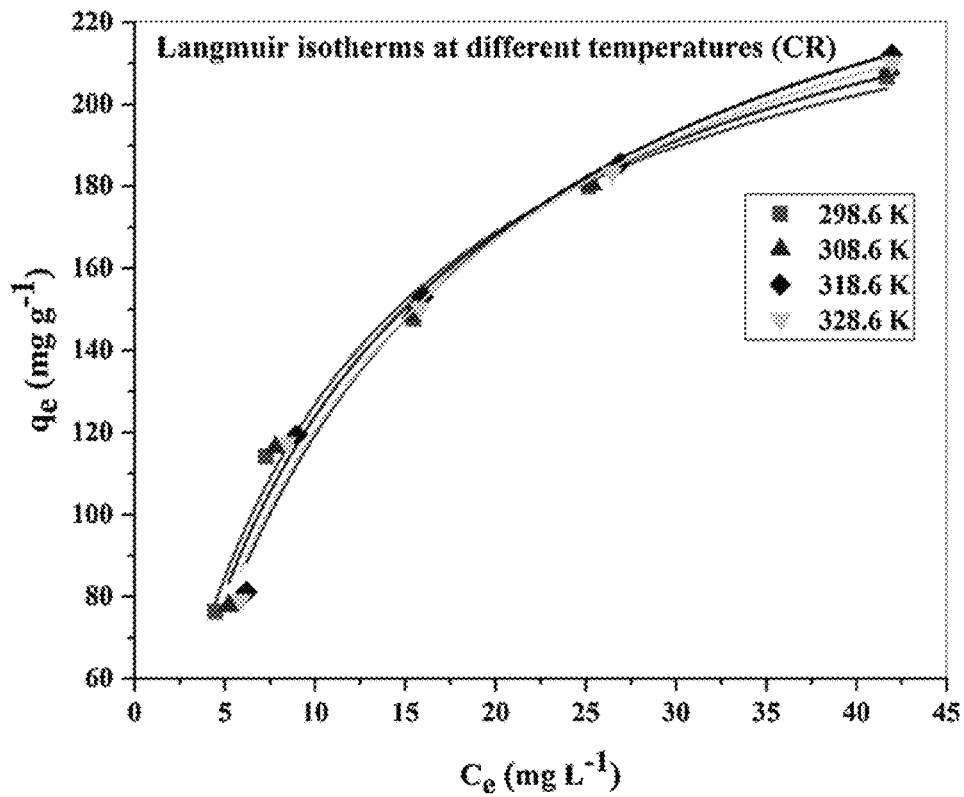
FIG. 10B is an overlay of Langmuir adsorption isotherm for CR removal by crosslinked polymer APEADA at temperatures of 298.6 K, 308.6 K, 318.6 K, and 328.6 K.

Temperature is an important parameter to be considered for adsorption studies of resin, since most dyes are released to the waste lines at relatively high temperatures from industrial processes. Since Langmuir isotherm was found to be the best fit for both dyes at four different temperatures (FIGS. 10A-B), the thermodynamic parameters were calculated from Langmuir equilibrium constant ($K_a$) (Table 2) by employing non-linear method wherein the values of $K_a$ was first made dimensionless. Substituting these values in Eq. (10) determined ΔG° values.

$$\Delta G° = -RT \ln(K_a) \quad (10)$$

According to the 3$^{rd}$ principle of thermodynamics $$\Delta G° = \Delta H' - T\Delta S° \quad (11)$$

Combining Eqs. (10) and (11), Vant Hoff's Eq. (12) is obtained [E. C. Lima, A. Hosseini-bandegharaei, J. C. Moreno-pirajan, I. Anastopoulos, A critical review of the estimation of the thermodynamic parameters on adsorption equilibria. Wrong use of equilibrium constant in the Van't Hoof equation for calculation of thermodynamic parameters of adsorption, J. Mal. Liq. 273 (2019) 425-434; E. C. Lima, M. A. Adebayo, F. M. Machado, Kinetic and equilibrium models of ad-sorption, in: C. Bergmann, F. Machado (Eds.), Carbon Nanomaterials as Adsorbents for Environmental and Biological Applications. Carbon Nanostructures, Springer, Cham, 2015, pp. 33-69; Y. Liu, Is the free energy change of adsorption correctly calculated? J. Chem. Eng. Data 54 (2009) 1981-1985; and H. Xu, Y. Liu, Mechanisms of Cd$^{2+}$, Cu$^{2+}$ and Ni$^{2+}$ biosorption by aerobic granules, Sep. Purif. Technol. 58 (2008) 400-411, each incorporated herein by reference in their entirety].

$$\ln K_a = \frac{-\Delta H°}{R} \cdot \frac{1}{T} + \frac{\Delta S°}{R} \quad (12)$$

A plot of ln $K_a$ vs 1/T gave slope and intercept which was used to calculate enthalpy ΔH° and entropy ΔS° [D. Panagopoulos, A. Jahnke, A. Kierkegaard, M. Macleod, Temperature dependence of the organic carbon/water partition ratios K, Environ. Sci. Technol. Lett. 4 (2017) 240-245, incorporated herein by reference in its entirety].

Figure 11:
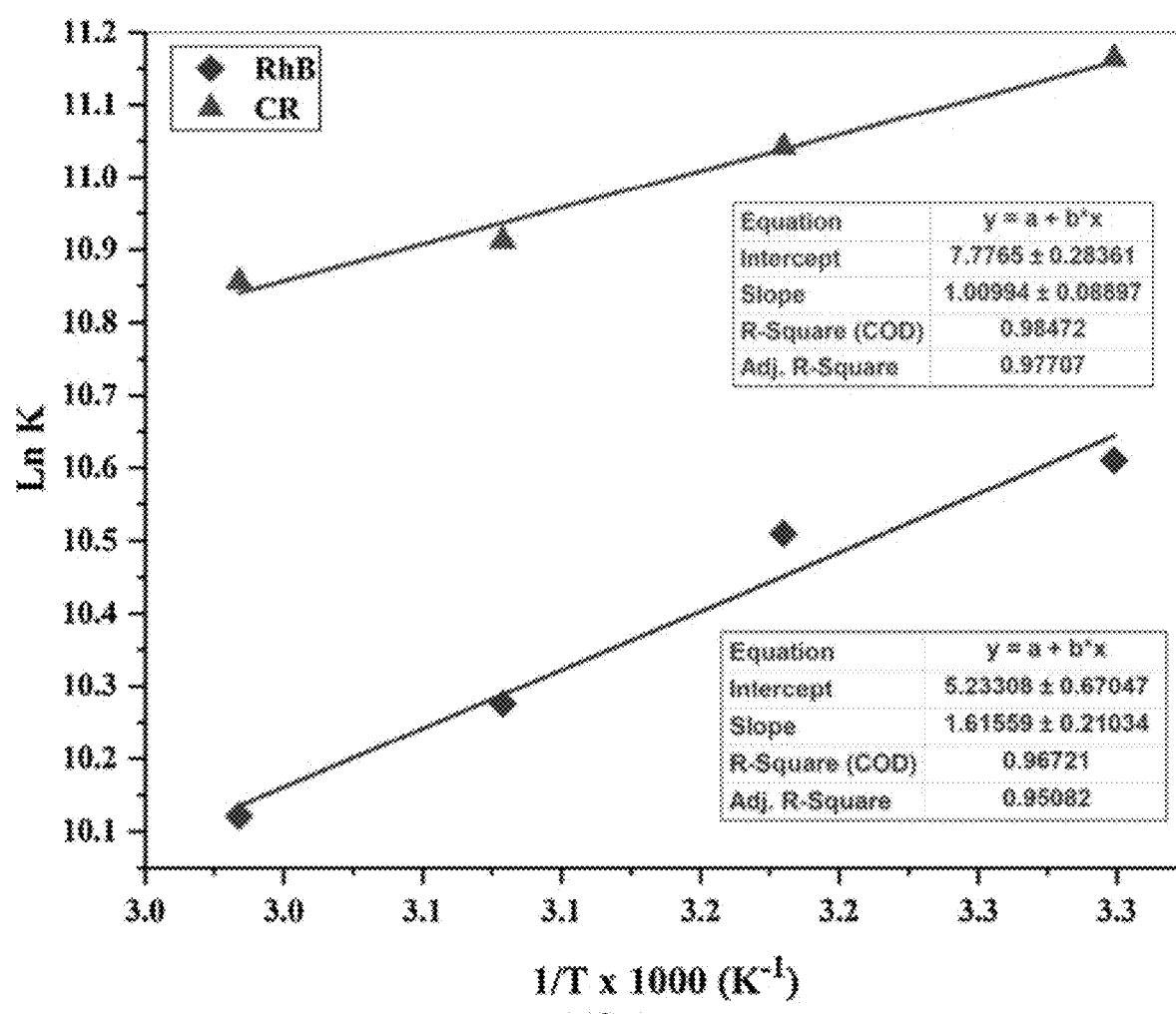
FIG. 11 is an overlay of Van't-Hoff plots for calculating thermodynamic parameters of RhB and CR adsorptions, respectively, by crosslinked polymer APEADA.

The Vant Hoff's plots for adsorption of dyes are shown in FIG. 11. The thermodynamic parameters calculated from Eq. 12 are given in Table 3.

TABLE 3

Thermodynamic parameters for adsorption of CR and RhB at different temperatures

| Dye | Temp (K) | ΔG° (kJ mol$^{-1}$) | ΔH° (kJ mol$^{-1}$) | ΔS° (J K$^{-1}$ mol$^{-1}$) | $R^2$ |
|---|---|---|---|---|---|
| RhB | 298.6 | −26.34 | −13.41 | 43.51 | 0.9509 |
|  | 308.6 | −27.05 |  |  |  |
|  | 318.6 | −27.21 |  |  |  |
|  | 328.6 | −27.70 |  |  |  |
| CR | 298.6 | −27.71 | −8.400 | 64.65 | 0.9771 |
|  | 308.6 | −28.42 |  |  |  |
|  | 318.6 | −28.99 |  |  |  |
|  | 328.6 | −29.74 |  |  |  |

The negative values of ΔG° suggested that the adsorption process was spontaneous. Moreover, values of ΔH° of −13.4 kJ mol$^{-1}$ and −8.4 J mol$^{-1}$ for RhB and CR, respectively, indicated that the adsorption process was exothermic and physical in nature [B. Meroufel, O. Benali, M. Benyahia, Y. Benmoussa, M. A. Zenasni, Adsorptive removal of anionic dye from aqueous solutions by Algerian kaolin: characteristics, isotherm, kinetic and thermodynamic studies, J. Mater. Environ. Sci. 4 (3) (2013) 482-491; and P. S. Thue, A. C. Sophia, E. C. Lima, A. G. N. Wamba, W. S. de Alencar, G. S. dos Reis, F. S. Rodernbusch, S. L P. Dias, Synthesis and characterization of a novel organic-inorganic hybrid clay adsorbent for the removal of acid red 1 and acid green 25 from aqueous solutions, J. Clean. Prod. 171 (2018) 30-44, each incorporated herein by reference in their entirety]. In view of chemical structure of the resin containing aromatic, amine, and carboxylate functionalities, secondary forces of attraction (hydrogen bonding, π-π interaction, and other van der Waals forces) [A. J. Leite, Carmalin Sophia A, P. S. Thue, G. S. dos Reis, S. L. Dias, E. C. Lima, J. C. Vaghetti, F. A. Pavan, W. S. de Alencar, Activated carbon from avocado seeds for the removal of phenolic compounds from aqueous solutions, Desalin. Water Treat. 71 (2017) 168-181, incorporated herein by reference in its entirety] between the resin and the dyes lead to the effective adsorption. The exothermic adsorption of CR and RhB on other adsorbents has been reported previously [A. Roy, B. Adhikari, S. B. Majumder, Equilibrium, kinetic, and thermodynamic studies of azo dye adsorption from aqueous solution by chemically modified lignocellulosic jute fiber, Ind. Eng. Chem. Res. 52 (2013) 6502-6512; M. I. Khan, S. Akhtar, S. Zafar, A.

Shaheen, M. A. Khan, R. Luque, A. Ur Rehman, Removal of Congo Red from aqueous solution by anion exchange membrane (EBTAC): adsorption kinetics and themodynamics, Materials (Basel) 8 (2015) 4147-4161; and Y. Han, W. Li, J. Zhang, H. Meng, Y. Xu, X. Zhang, Adsorption behavior of Rhodamine B on nanoporous polymers, RSC Adv. 5 (2015) 104915-104922, each incorporated herein by reference in their entirety]. In addition, positive values of $\Delta S°$ (Table 3) indicated that the randomness of dyes molecules was enhanced at the solution-solid interface during the adsorption process. These positive values also hinted possible structural changes in both adsorbate and adsorbent during adsorption process [U. F. Alkaram, A. A. Mukhlis, A. H. AI-Dujaili, The removal of phenol from aqueous solutions by adsorption using surfactant-modified bentonite and kaolinite, J. Hazard. Mater. 169 (2009) 324-332, incorporated herein by reference in its entirety].

Example 15

Adsorption Kinetics Studies

Figure 12A:
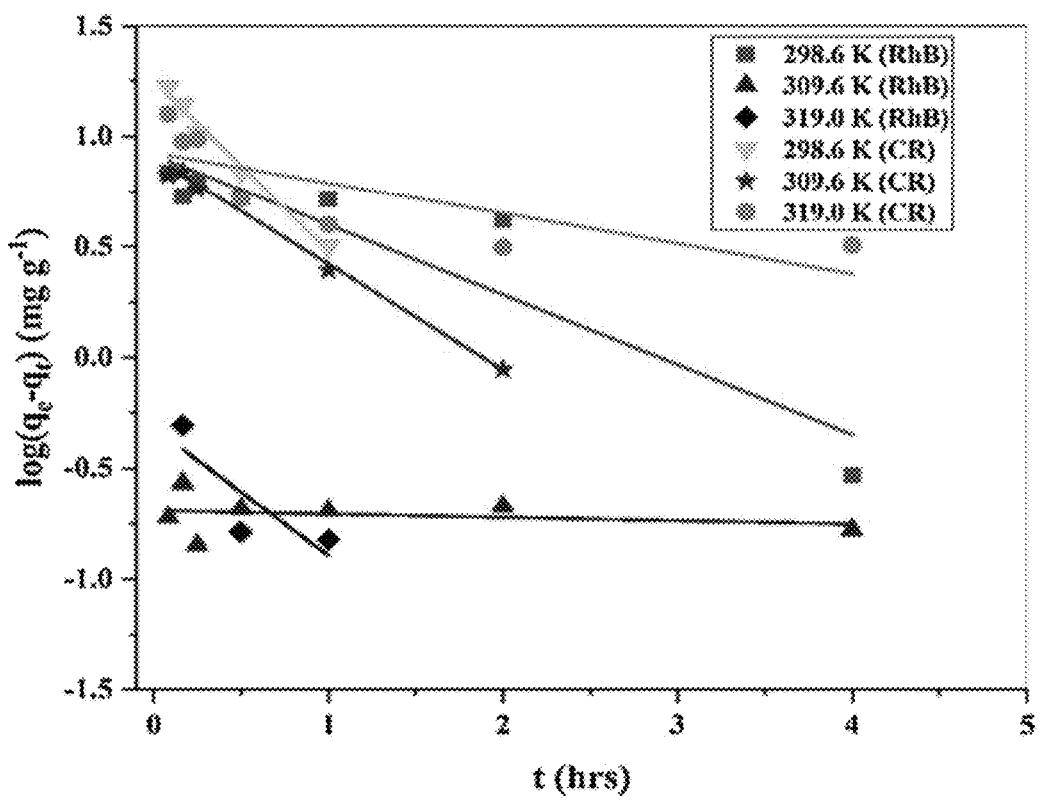
FIG. 12A is an overlay of kinetic plots fitted by Lagergren pseudo $1^{st}$-order model depicting RhB and CR adsorptions, respectively, by crosslinked polymer APEADA at various temperatures.
Figure 12B:
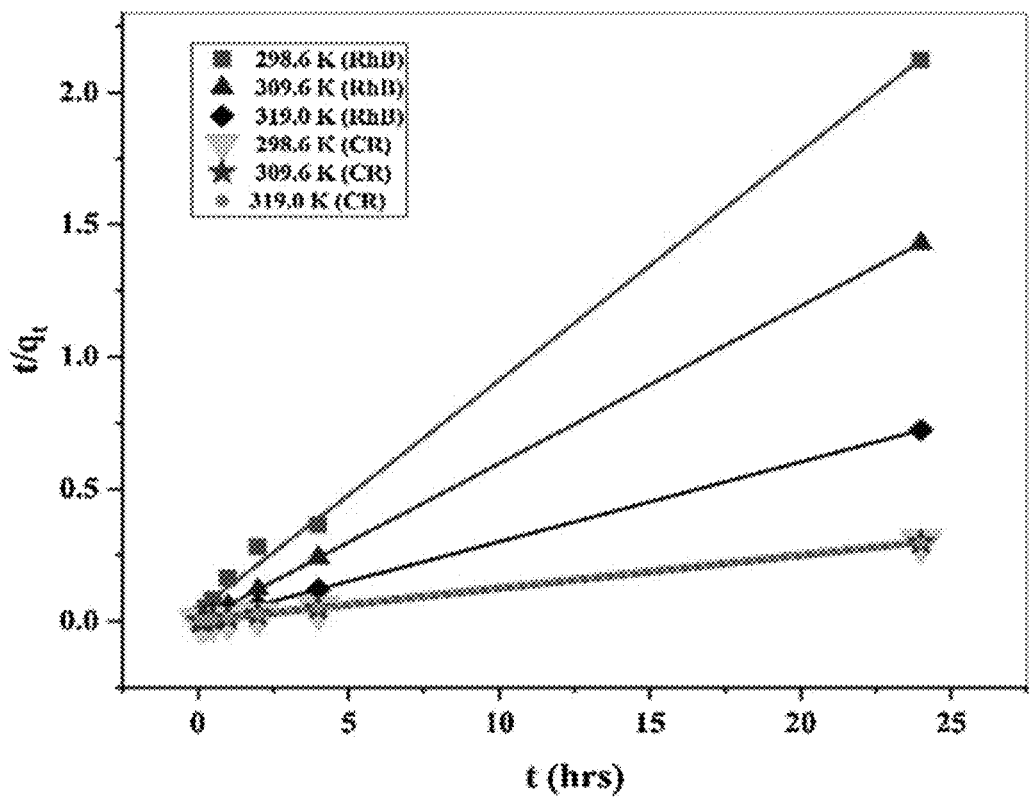
FIG. 12B is an overlay of kinetic plots fitted by Lagergren pseudo $2^{nd}$-order model depicting RhB and CR adsorptions, respectively, by crosslinked polymer APEADA at various temperatures.

Lagergren pseudo-$1^{st}$ (Eq. 13) and pseudo-$2^{nd}$ (Eq. 14) order kinetic models were applied to explore the kinetic properties of the adsorption of RhB and CR by APEADA (FIGS. 12A and 12B).

$$\text{Log}(q_e - q_t) = \log q_e - \frac{k_1 \, t}{2.303} \quad (13)$$

$$\frac{t}{q_t} = \frac{1}{k_2 q_e^2} + \frac{t}{q_e} \quad (14)$$

Where $k_1 = 1^{st}$ order rate constant, and $k_2 = 2^{nd}$ order rate constant, while $q_t$ and $q_e$ are adsorption capacities of the resin at time t and equilibrium, respectively.

$R^2$ values indicated that the experimental data was not fitted with the $1^{st}$-order while the significantly low value of $q_e$ has been demonstrated by pseudo-$1^{st}$ order model compared to the experimentally determined value, which highlighted the inapplicability of this model. The Lagergren's $2^{nd}$-order kinetic model fitted for both RhB and CR gave better regression ($R^2$) values, and their values of $q_{e\ (calc.)}$ were quite close to the $q_{e\ (expt.)}$ (Table 4) [A. Ramesh, H. Hasegawa, T. Maki, K. Ueda, Adsorption of inorganic and organic arsenic from aqueous solutions by polymeric Al/Fe modified montmorillonite, Sep. Purif. Technol. 56 (2007) 90-100, incorporated herein by reference in its entirety].

Example 16

Intra-Particle Diffusion Model

Figure 12C:
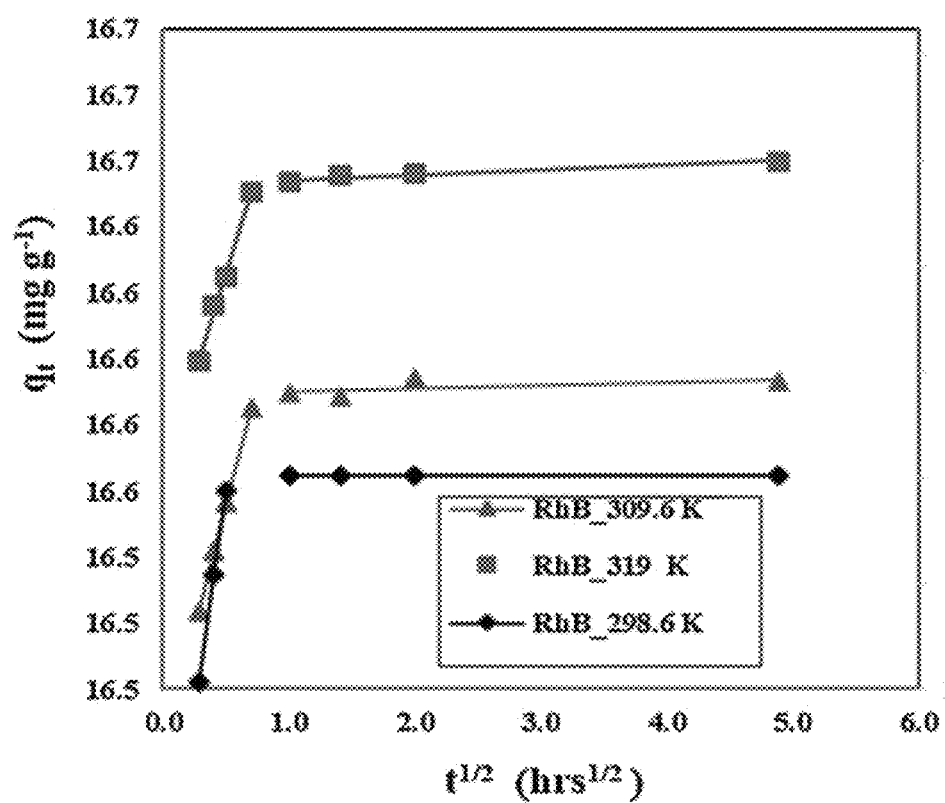
FIG. 12C is an overlay of intra-particle diffusion plots depicting RhB adsorption by crosslinked polymer APEADA at various temperatures.
Figure 12D:
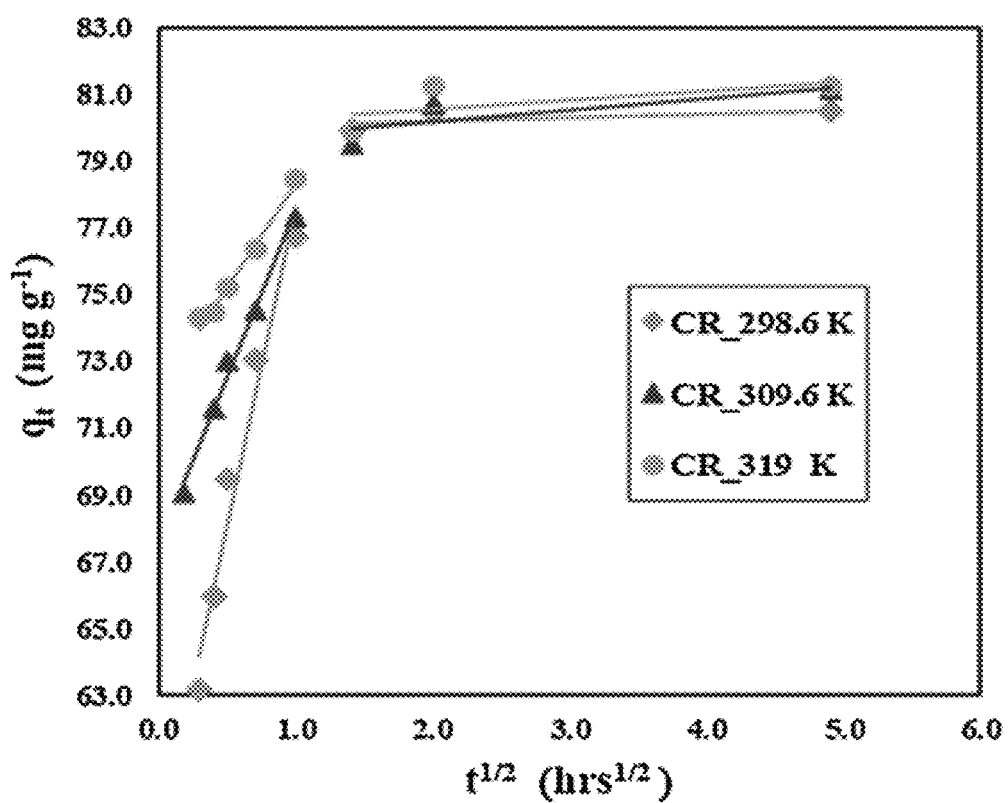
FIG. 12D is an overlay of intra-particle diffusion plots depicting CR adsorption by crosslinked polymer APEADA at various temperatures.

The mechanism of uptake of the dye molecules by the adsorbent comprises of three consecutive steps (1) film diffusion, (2) intra-particle diffusion, and (3) mass action. An intra-particle diffusion is given by the following relation which narrates a relationship between uptake of dye at time interval t ($q_t$) vs time t Eq. (15), where $k_p$ is a rate constant [W. J. Weber, J. C. Morriss, Kinetics of adsorption on carbon from solution, J. Saint. Eng. Div. Am. Soc. Civ. Eng. 89 (1 963) 31-60, incorporated herein by reference in its entirety].

$$q_t = x_i + k_p t^{0.5} \quad (15)$$

Where $x_i$ indicates the thickness of the boundary layer [D. Kavitha, C. Namasivayam, Experimental and kinetic studies on methylene blue adsorption by coir pith carbon, Bioresour. Technol. 98 (2007) 14-21, incorporated herein by reference in its entirety]. The plots of $q_t$ vs $t^{0.5}$ (FIGS. 12C and D) have given positive values of intercept ($x_i \neq 0$). If $x_i = 0$, it means that the adsorption process is controlled by intra-particle diffusion [F.-C. Wu, R.-L. Tseng, R.-S. Juang, Initial behavior of intraparticle diffusion model used in the description of adsorption kinetics, Chem. Eng. J. 153 (2009) 1-8, incorporated herein by reference in its entirety], while positive values (Table 5) of the intercept suggest that an instantaneous adsorption is apparently taking place at t=0 through film diffusion. Hence, the adsorption process is governed by both quicker film and slower intra-particle diffusion for adsorptions of CR and RhB.

TABLE 5

Intra-particle diffusion model

| Dyes | Temp (K) | $k_p$ mmol $g^{-1}$ $h^{-1/2}$ | $x_i$ (mmol $g^{-1}$) | $q_e$ (mmol $g^{-1}$) | $R_i$ | $R^2$ |
|---|---|---|---|---|---|---|
| RhB | 298.6 | 17.068 | 7.7128 | 16.553 | 0.5340 | 0.9999 |
|  | 309.6 | 0.1461 | 16.482 | 16.593 | 0.0067 | 0.9988 |
|  | 319 | 0.1207 | 16.565 | 16.660 | 0.0057 | 0.998 |
| CR | 298.6 | 18.925 | 58.695 | 80.502 | 0.2709 | 0.9601 |
|  | 309.6 | 10.034 | 67.48 | 81.137 | 0.1683 | 0.9895 |
|  | 319 | 6.115 | 72.213 | 81.271 | 0.1115 | 0.9806 |

TABLE 4

Kinetic parameters of Lagergren models

| | | | Lagergren Pseudo 1st order | | | Lagergren Pseudo 2nd order | | | |
|---|---|---|---|---|---|---|---|---|---|
| Dyes | Temp (K) | $q_{e,\ (expt.)}$ (mg $g^{-1}$) | $k_1$ (min$^{-1}$) | $q_{e,\ (calc.)}$ (mg $g^{-1}$) | $R^2$ | $k_2$ g mg$^{-1}$ min$^{-1}$ | $q_{e,\ (calc.)}$ (mg $g^{-1}$) | $R^2$ | $E_a$ (kJ mol$^{-1}$) |
| RhB | 298.6 | 16.55 | −1.344 | 0.5300 | 0.9944 | 6.538 | 16.56 | 1.0000 | 133.3 |
|  | 309.6 | 16.59 | −1.358 | 0.0400 | 0.9786 | 199.7 | 16.59 | 1.0000 | |
|  | 319.0 | 16.66 | −0.590 | 0.0200 | 0.9345 | 129.2 | 16.66 | 1.0000 | |
| CR | 298.6 | 80.50 | −2.031 | 21.99 | 0.9471 | 0.3769 | 80.63 | 1.0000 | 15.21 |
|  | 309.6 | 81.14 | −0.8402 | 10.14 | 0.7811 | 0.3884 | 81.24 | 1.0000 | |
|  | 319.0 | 81.27 | −2.069 | 14.18 | 0.3605 | 0.5572 | 81.35 | 1.0000 | |

The initial adsorption factor ($R_i$) is given by the following expression, where $R_i$ is expressed in the form $x_i$ (Eq. 16):

$$R_i = 1 - \frac{x_i}{q_e} \quad (16)$$

A larger value of $x_i$ for RhB than that for CR suggested that film diffusion mainly controlled the overall rate-limiting step for RhB (Table 1).

Example 17

Activation Energy of Adsorption

Figure 13A:
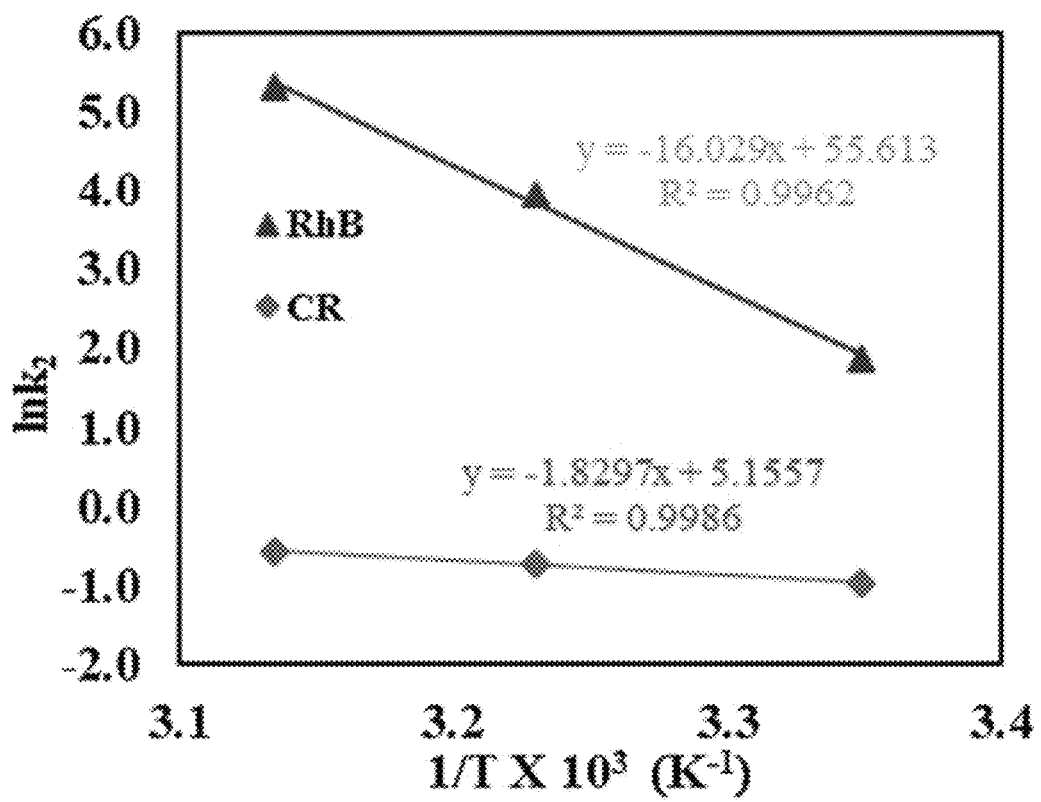
FIG. 13A is an overlay of Arrhenius plots for calculating thermodynamic parameters of RhB and CR adsorptions, respectively, by crosslinked polymer APEADA.

The plots of ln $k_2$ vs 1/T were drawn by considering the values of $2^{nd}$-order rate constant ($k_2$) at three different temperatures (FIG. 13A). As per Arrhenius Eq. 17, activation energy ($E_a$) values for the adsorption of RhB and CR were found to be 133.3 and 15.2 kJ mol$^{-1}$, respectively (Table 4). The relatively smaller $E_a$ values indicated a favorable adsorption process [S. Veli, B. Pekey, Removal of copper from aqueous solution by ion exchange resins, Fresenius Environ Bull. 13 (2004) 244-250, incorporated herein by reference in its entirety].

$$\ln k_2 = -\frac{E_a}{2.303 RT} + \text{constant} \quad (17)$$

Figure 13B:
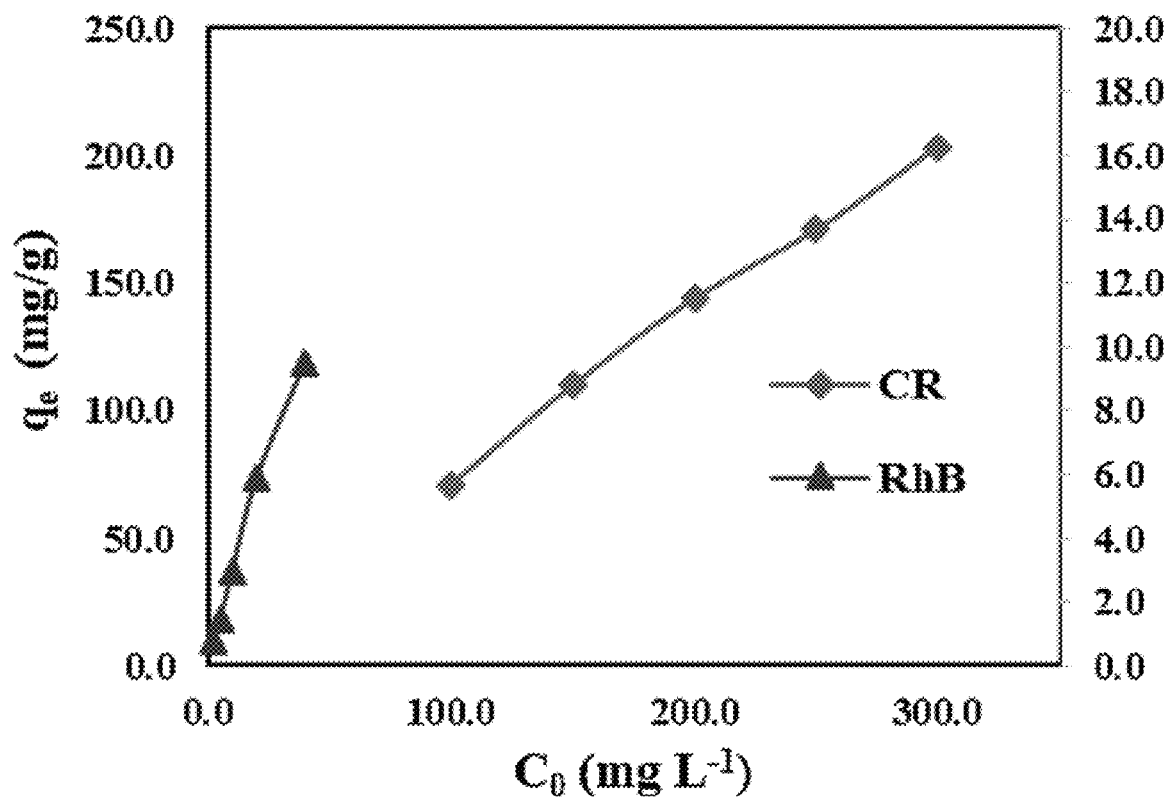
FIG. 13B is a plot illustrating the relationship between initial concentrations of RhB and CR, respectively, and adsorption capacity of crosslinked polymer APEADA.

FIG. 13B indicates that the adsorption capacity $q_e$ for both dyes increased with increasing dyes concentration. This trend suggests that the adsorbent can efficiently remove CR and RhB from water. APEADA was applied for the removal of dyes from synthetic dyes effluents. The composition of the effluents is given in Table 6.

TABLE 6

Chemical composition of synthetic effluents

| Dyes | $\lambda_{max}$ (nm) | Concentration (mg · L$^{-1}$) |
|---|---|---|
| Congo red | 661 | 100 |
| Rhodamine B | 554 | 100 |
| Methyl orange | 507 | 100 |
| Bromophenol blue | 406 | 100 |

| Other Elements | µg · L$^{-1}$ |
|---|---|
| Al | 327 |
| Cr | 11.1 |
| Fe | 557 |
| Co | 7.22 |
| Ni | 60.6 |
| Cu | 6.12 |
| Sn | 6.55 |
| pb | 0.345 |

The resin showed efficient removal efficiency (80.13%) for dyes in simulated effluents which demonstrated its utility and effectiveness in industrial waste water treatment (Table 7).

TABLE 7

A comparative adsorption capacities of APEADA with other types of adsorbents

| Adsorbents | $Q_m$ RhB (mg · g$^{-1}$) | $Q_m$ CR (mg · g$^{-1}$) | Ref. |
|---|---|---|---|
| Polar-modified post-cross-linked resin PDTpc | 578.2 | — | [a] |
| Polar-modified post-cross-linked resin PDBpc | 328.7 | — | [a] |
| Sodium montmorillonite | 42.19 | — | [b] |
| Hypercrosslinked polymeric adsorbent functionalized with formaldehyde carbonyl groups, HJ-1 | 72.99 | — | [c] |
| Tannic acid functionalized graphene nanocomposite (TA-G) | 201.2 | — | [e] |
| Amberlite resin of IRA-400 | — | 204.1 | [f] |
| XG-g-PAM/SiO2 nanocomposite | — | 209.2 | [g] |
| Chitosan Beads | — | 77.55 | [h] |
| Chitosan Beads Impregnated with CTAB | — | 94.39 | [i] |
| Magnetic chitosan composite microparticle | — | 181.8 | [j] |
| Chitosan/organomontmorillonite nanocomposites (CTS/OMMT) | — | 290.8 | [k] |
| Maranta arundinacea activated carbon (MAC) | 88.41 | 79.31 | [l] |
| Diacrylamidobenzoic acid based hyper-cross-linked resin | 23.28 | 280.0 | This work |

REFERENCES

[a] X. Jiang, J. Huang, Adsorption of Rhodamine B on two novel polar-modified post-cross-linked resins: equilibrium and kinetics, J. Colloid Interface Sci. 467 (2016) 230-238; [b] P. P. Selvam, S. Preethi, P. Basakaralingam, N. Thinakaran, A. Sivasamy, S. Sivanesan, Removal of rhodamine B from aqueous solution by adsorption onto sodium montmorillonite, J. Hazard. Mater. 155 (2008) 39-44; [c] J. H. Huang, K. L Huang, S. Q. Liu, A. T. Wang, C. Yan, Adsorption of Rhodamine B and methyl orange on a hypercrosslinked polymeric adsorbent in aqueous solution, Colloids Surf. A Physicochem. Eng. Asp. 330 (2008) 55-61; [d] K. Liu, H. Li, Y. Wang, X. Gou, Y. Duan, Adsorption and removal of rhodamine B from aqueous solution by tannic acid functionalized graphene, Colloids Surf. A Physicochem. Eng. Asp. 477 (2015) 35-41; [e] S. Sinha, S. S. Behera, S. Das, A. Basu, R. K. Mohapatra, B. M. Murmu, N. K. Dhal, S. K. Tripathy, P. K. Parhi, Removal of Congo Red dye from aqueous solution using Amberlite IRA-400 in batch and fixed bed reactors, Chem. Eng. Commun. 205 (2018) 432-444; [f] S. Ghorai, A. K. Sarkar, A. B. Panda, S. Pal, Effective removal of Congo red dye from aqueous solution using modified xanthan gum/silica hybrid nanocomposite as adsorbent, Bioresour. Technol. 14 4 (2013) 485-491; [g] S. Rouf, M. Nagapadma, R. Ramakoteswara, Removal of harmful textile dye congo red from aqueous solution using chitosan and chitosan beads modified with CTAB, J. Eng. Res. Appl. 5 (2015) 75-82; [h] P. Wang, T. Yan, L Wang, Removal of Congo red from aqueous solution using magnetic chitosan composite microparticles, BioRes. 8 (4) (2013) 6026-6043; [i] L. Wang, A. Q. Wang, Removal of Congo red from aqueous solution using a chitosan/organo-montmorillonite nanocomposite, J. Chem. Technol. Biotechnol. 82 (2007) 711-720; [j] M. Ilayaraja, N. P. Krishnan, R. S. Kannan, Adsorption of Rhodamine-B and Congo red dye from aqueous solution using activated carbon: kinetics, isotherms, and thermodynamics, J. Environ. Sci. Toxicol. Food Technol. 5 (2013) 79-89, each incorporated herein by reference in their entirety.

Example 18

As disclosed herein, a highly crosslinked, beaded and thermally stable polyamine based resin was synthesized. The effect of temperature on adsorption of dyes of the resin was evaluated. Thermodynamic parameters of the adsorption process were calculated from the best fit model where the values of the equilibrium constants were made dimensionless. The optimum adsorption condition was determined by varying adsorption parameters including pH of aqueous solution, contact time, temperature, and dosage of the adsorbent.

The presently disclosed resin showed efficient removal of CR and moderate adsorption of RhB from water. The effect of initial pH, adsorbent dosage, and contact time on adsorption of CR and RhB was investigated. The resin exhibited efficient % removal for CR (92.03%) at pH 8.14, and moderate adsorption for RhB at pH 5.01. At 318.6 K, the resin demonstrated $Q_{max}$ values of 280.0 mg g$^{-1}$ and 23.28 mg g$^{-1}$ for CR and RhB, respectively. Adsorption experiments at different pH indicated that adsorption phenomena in CR were governed by non-electrostatic forces, presumably by hydrogen-bonding whereas adsorption of RhB was commanded by electrostatic forces. The thermodynamic parameters revealed that the nature of adsorption of both CR and RhB were exothermic and spontaneous. Moreover, APEADA showed efficient removal efficiency (80.13%) for dyes in simulated effluents which demonstrated its utility and effectiveness in industrial waste water treatment.

The invention claimed is:

1. A method for removing a pollutant from an aqueous solution, the method comprising:
    contacting the aqueous solution having an initial concentration of the pollutant with a crosslinked polymer to form a mixture; and
    filtering the mixture to obtain an aqueous solution having a reduced concentration of the pollutant compared to the initial concentration,
    wherein the crosslinked polymer comprises reacted units of
    a first monomer of formula (I)

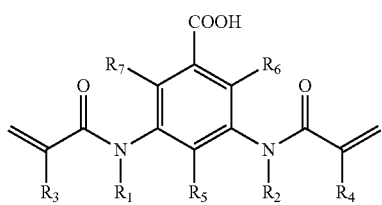

(I)

or a salt thereof, a solvate thereof, a tautomer thereof, a stereoisomer thereof, or a mixture thereof; and
a second monomer of formula (II)

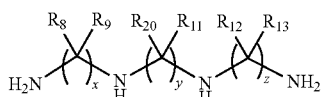

(II)

or a salt thereof, a solvate thereof, a stereoisomer thereof, or a mixture thereof;

wherein:
$R_1$, $R_3$ and $R_4$ are independently selected from the group consisting of a hydrogen, an optionally substituted alkyl, an optionally substituted cycloalkyl, an optionally substituted arylalkyl, and an optionally substituted aryl;
$R_5$, $R_6$ and $R_7$ are independently selected from the group consisting of a hydrogen, an optionally substituted alkyl, an optionally substituted cycloalkyl, an optionally substituted arylalkyl, a carboxy, a hydroxy, and a halogen;
$R_8$, $R_9$, $R_{10}$, $R_{11}$, $R_{12}$ and $R_{13}$ are independently selected from the group consisting of a hydrogen, an optionally substituted alkyl, an optionally substituted cycloalkyl, an optionally substituted arylalkyl, and an optionally substituted aryl; and
x, y, and z are independently an integer in a range of 1 to 6.

2. The method of claim 1, wherein the pollutant is an organic dye, a heavy metal, or both.

3. The method of claim 2, wherein the pollutant is an organic dye, and wherein the organic dye is at least one selected from the group consisting of Congo red, Rhodamine B, methyl orange, and bromophenol blue.

4. The method of claim 1, wherein the aqueous solution has a pH in a range of 2 to 10.

5. The method of claim 1, wherein the initial concentration of the pollutant in the aqueous solution is in a range of 10 to 1,000 mg Li.

6. The method of claim 1, wherein the crosslinked polymer is present in a concentration ranging from 0.1 to 10 g per liter of the aqueous solution during the contacting.

7. The method of claim 1, wherein the crosslinked polymer is contacted with the aqueous solution at a temperature in a range of 10° C. to 80° C. for 0.1 to 24 hours.

8. The method of claim 1, wherein greater than 50% of a total mass of the pollutant is removed from the aqueous solution.

9. The method of claim 1, wherein the crosslinked polymer $R_1$, $R_2$, $R_3$, and $R_4$ are independently a hydrogen, or an optionally substituted $C_1$-$C_6$ alkyl.

10. The method of claim 1, wherein the crosslinked polymer $R_1$, $R_2$, $R_3$, and $R_4$ are hydrogen.

11. The method of claim 1, wherein the crosslinked polymer $R_5$, $R_6$, and $R_7$ are hydrogen.

12. The method of claim 11, wherein the crosslinked polymer $R_8$, $R_9$, $R_{10}$, $R_{11}$, $R_{12}$, and $R_{13}$ are hydrogen.

13. The method of claim 1, wherein the crosslinked polymer x and z are 3, and y is 2.

14. The method of claim 1, wherein the crosslinked polymer the first monomer of formula (I) is

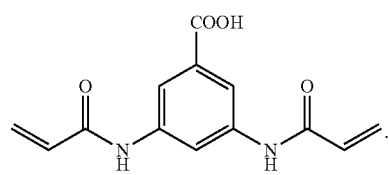 [SMILES: C=CC(=O)Nc1cc(NC(=O)C=C)cc(C(=O)O)c1]

15. The method of claim 1, wherein the crosslinked polymer the second monomer of formula (II) is

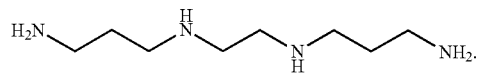 [SMILES: NCCCNCCNCCCN]

16. The method of claim 1, wherein the crosslinked polymer a molar ratio of the first monomer of formula (I) to the second monomer of formula (II) is in a range of 2:1 to 8:1.

17. The method of claim 1, wherein the crosslinked polymer is in the form of spherical particles with an average particle diameter in a range of 2 to 20 μm.

18. The method of claim 1, wherein the crosslinked polymer which is porous with a BET surface area in a range of 50 to 120 m$^2$/g.

19. The method of claim 1, wherein the crosslinked polymer exhibits a semi-crystalline structure.

* * * * *